United States Patent
Azaroff

(10) Patent No.: US 11,609,749 B1
(45) Date of Patent: *Mar. 21, 2023

(54) GRAND UNIFIED PROCESSOR WITH ADAPTIVE PROCESSING FEATURES

(71) Applicant: HM Health Solutions Inc., Pittsburgh, PA (US)

(72) Inventor: Andre K. Azaroff, Mount Joy, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/465,981

(22) Filed: Sep. 3, 2021

Related U.S. Application Data

(63) Continuation of application No. 16/788,899, filed on Feb. 12, 2020, now Pat. No. 11,113,038, which is a continuation-in-part of application No. 16/273,963, filed on Feb. 12, 2019, now Pat. No. 10,802,801, which is a continuation of application No. 15/613,442, filed on Jun. 5, 2017, now Pat. No. 10,203,937.

(60) Provisional application No. 62/345,136, filed on Jun. 3, 2016.

(51) Int. Cl.
| | |
|---|---|
| *G06F 8/34* | (2018.01) |
| *G06F 8/33* | (2018.01) |
| *G06F 8/20* | (2018.01) |
| *G06F 8/38* | (2018.01) |

(52) U.S. Cl.
CPC ............... *G06F 8/34* (2013.01); *G06F 8/20* (2013.01); *G06F 8/33* (2013.01); *G06F 8/38* (2013.01)

(58) Field of Classification Search
None
See application file for complete search history.

(56) References Cited

U.S. PATENT DOCUMENTS

| | | |
|---|---|---|
| 10,203,937 B1 | 2/2019 | Azariff et al. |
| 2007/0168926 A1 | 7/2007 | Rajah et al. |
| 2011/0289479 A1 | 11/2011 | Pletter et al. |
| 2012/0174064 A1 | 7/2012 | Polly et al. |
| 2013/0046799 A1 | 2/2013 | Hale et al. |
| 2016/0306637 A1 | 10/2016 | Klemenz et al. |

OTHER PUBLICATIONS

Balasubramanian et al., "Developing Applications Using Model-Drive Design Environments," Feb. 2006,IEEE, pp. 33-40 (Year: 2006).
U.S. Appl. No. 16/273,963 to Azaroff et al., "Grand Unified Processor", filed Feb. 12, 2019, now U.S. Pat. No. 10,802,801.

*Primary Examiner* — Qing Chen
(74) *Attorney, Agent, or Firm* — Michael D. Lazzara; Leech Tishman Fuscaldo & Lampl

(57) ABSTRACT

Computer processes are provided which can be executed without business or commercial context, independent of the kind of data or other content associated with the computer processes. In one embodiment, a computer process can be broken down into functional units, and the metadata associated with the functional units can be extracted. Each functional unit can then be represented by an interface and also coded with computer-readable instructions to use one or more configuration sets which have been defined by the metadata. The computer process can then be implemented by programming the functional units to execute based on a configuration set determined by predefined operating parameters. Artificially intelligent algorithms may be used to analyze and self-configure the processing flow or business rules aspects of different events associated with the computer process.

21 Claims, 42 Drawing Sheets

FIG. 2

Data Service Configuration Manager

Figure 1:
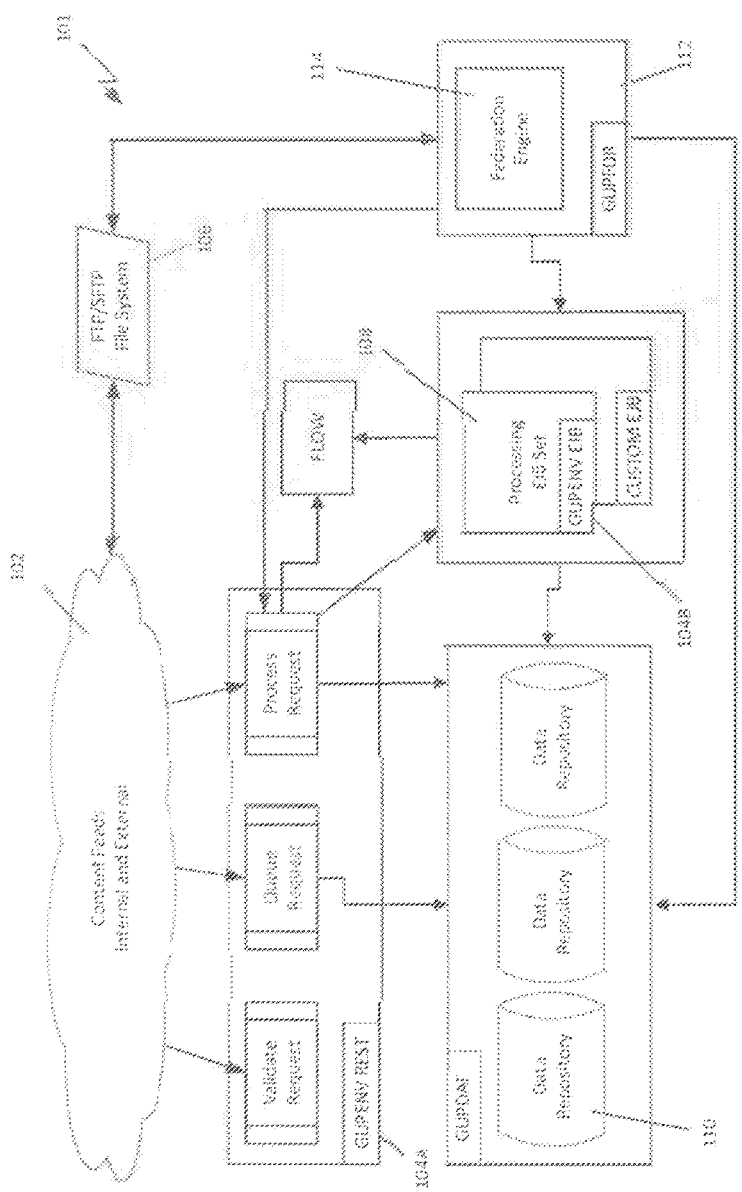

| Identifier | Storage Type | Expiration Date | |
|---|---|---|---|
| com.chipmunk.app.default.user.emailBox/ServiceDefaults.properties | File | Sun Aug 17 02:12:55 EST 292278994 | Remove Entry |
| appServiceDefaults.properties | File | Sun Aug 17 02:12:55 EST 292278994 | Remove Entry |
| appReadGetConfiguration.properties | File | Sun Aug 17 02:12:55 EST 292278994 | Remove Entry |
| appReadPutConfiguration.properties | File | Sun Aug 17 02:12:55 EST 292278994 | Remove Entry |
| TestFederationBean.properties | File | Sun Aug 17 02:12:55 EST 292278994 | Remove Entry |
| appReadDeleteConfiguration.properties | File | Sun Aug 17 02:12:55 EST 292278994 | Remove Entry |
| appdefaultJdbcAdapter.properties | File | Sun Aug 17 02:12:55 EST 292278994 | Remove Entry |
| appConfigManagementResource.properties | File | Sun Aug 17 02:12:55 EST 292278994 | Remove Entry |
| appReadPostConfiguration.properties | File | Sun Aug 17 02:12:55 EST 292278994 | Remove Entry |
| appdataService.properties | File | Sun Aug 17 02:12:55 EST 292278994 | Remove Entry |

GRAND UNIFIED PROCESSOR WITH ADAPTIVE PROCESSING FEATURES

CROSS-REFERENCE TO RELATED APPLICATIONS

The present application is a continuation of U.S. patent application Ser. No. 14/788,899, filed on Feb. 12, 2020, and now issued as U.S. Pat. No. 11,113,038, which is a continuation-in-part application claiming priority to co-pending U.S. patent application Ser. No. 16/273,963, filed on Feb. 12, 2019, and now issued as U.S. Pat. No. 10,802,801, which is a continuation of U.S. patent application Ser. No. 15/613,442, filed on Jun. 5, 2017, and now issued as U.S. patent Ser. No. 10/203,937, which claims priority to U.S. Provisional Patent Application Ser. No. 62/345,136, filed on Jun. 3, 2016, and the entirely of all the foregoing applications are incorporated herein by reference.

BACKGROUND

Computer systems provide essential commercial lifeblood for the operation of any business entity which relies on processing, analyzing, or managing data. However, maintaining and implementing changes in computer systems can be a daunting task in view of the complexities of providing computer architecture and software functionality capable of adequately meeting business needs and demands. Computer systems and the elements which form the component parts of their platforms (e.g., software and hardware) often need to be reconfigured in response to dynamically changing data communication methods and external data sources.

However, programming even basic computer tasks into computer-readable instructions can involve a significant expenditure of time and resources. Likewise, modifications to computer architecture or hardware can be expensive to design, implement, and test to validate that satisfactory computing results have been achieved after the modifications have been implemented.

What are needed, therefore, are enhanced tools, techniques, and computer framework elements which can reduce computer system maintenance and programming, efforts associated with designing and executing various computer-based tasks, while improving the processing efficiency of the computer system.

SUMMARY

In various embodiments, the present invention provides computer processes which can be programmed for execution without business or commercial context, independent of the kind of data or other content associated with the computer processes. In one embodiment, a computer process can be broken down into functional units, and the metadata associated with the functional units can be extracted. Each functional unit can then be represented by an interface and also coded with computer-readable instructions to use one or more configuration sets which have been defined by the metadata. The computer process can then be implemented by programming the functional units to execute based on a configuration set determined at runtime by a predefined operating parameter or parameters.

In various embodiments, the invention also provides a configurable computer-based platform for processing data and computer-based events which can be embodied as a combination of multiple self-contained frameworks and an interface layer. Each underlying framework can be configured to function individually or to work cooperatively in combination to enable the platform to provide an almost entirely configuration driven data processing platform. The platform may be configured to provide: a common path for all data entering the system regardless of source or format; a common way to validate format as well as content of the data; a common way to apply business rules; integration with external work flow management systems; a common way to store and retrieve the data from various data repositories; event processing; and/or, business process management capabilities.

In certain embodiments, various kinds of artificially intelligent (AI) algorithms may be configured to analyze and self-configure the processing flow or business rules at runtime, for example, based on an event type, action, source domain, and data content, among other attributes of the event.

BRIEF DESCRIPTION OF TUE FIGURES

FIG. 1 illustrates an example of a computer system architecture structured in accordance with various embodiments of the invention.

Figure 2:
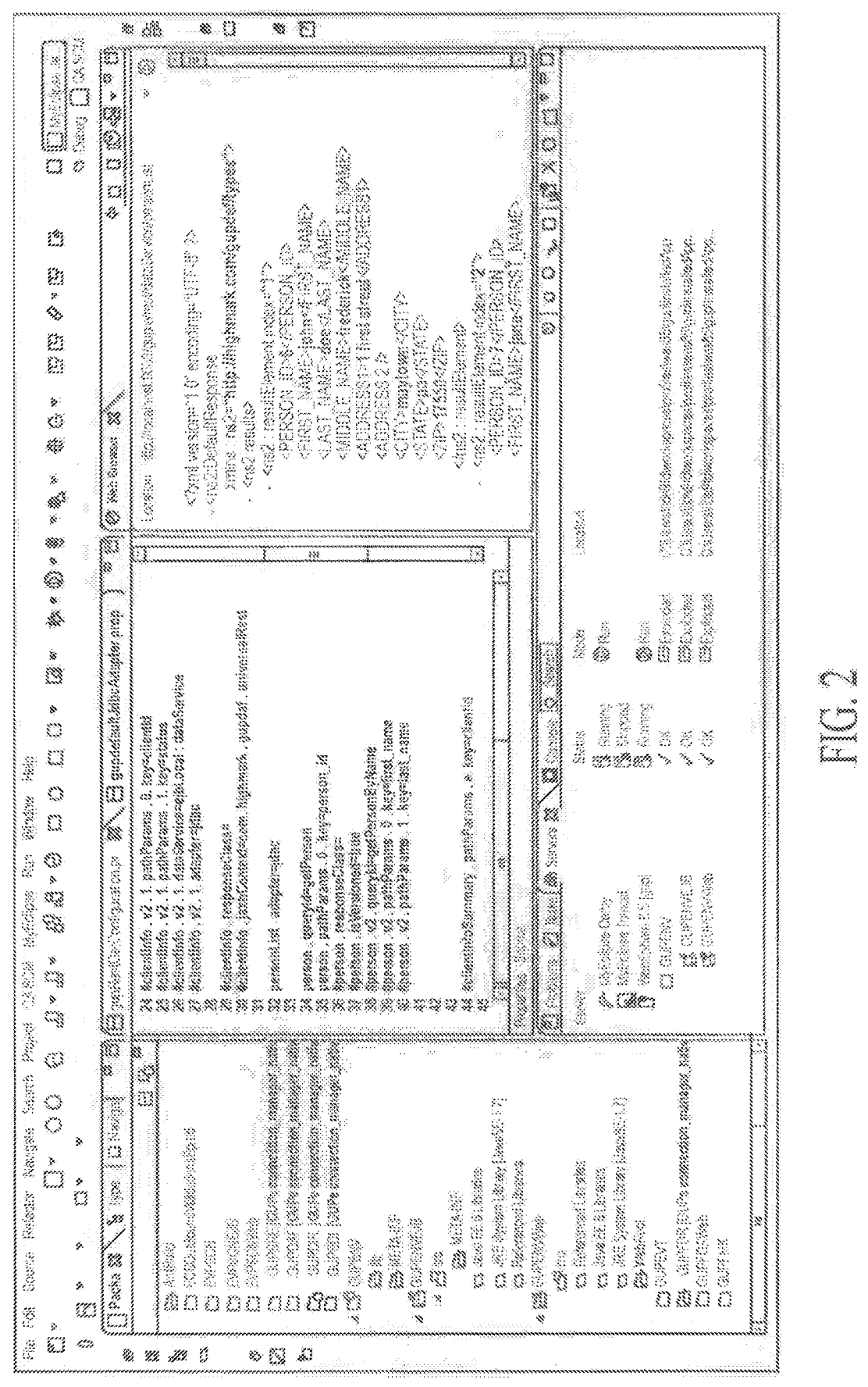

FIG. 2 includes screen displays illustrating an example of computer system work space associated with an employee activity record (EAR) project.

Figure 3:
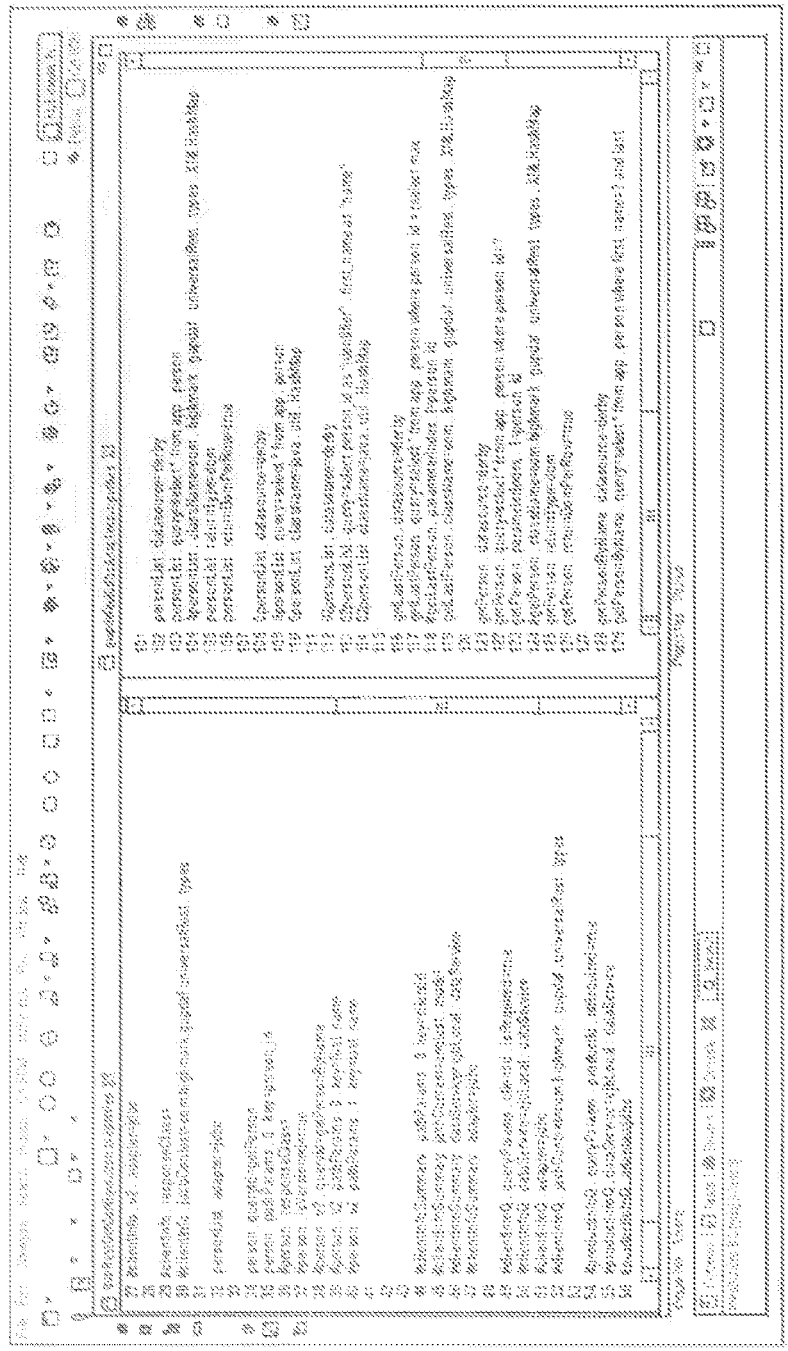
Figure 4:
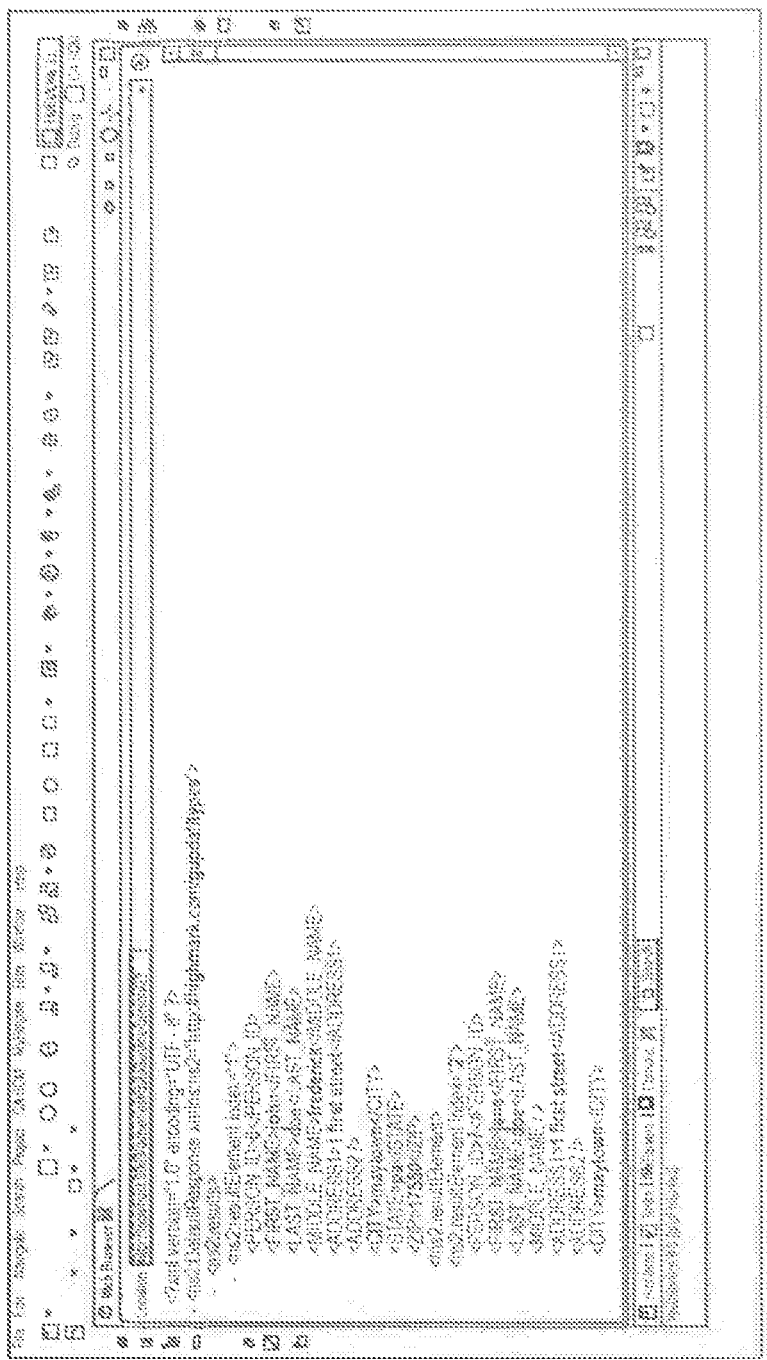
Figure 5:
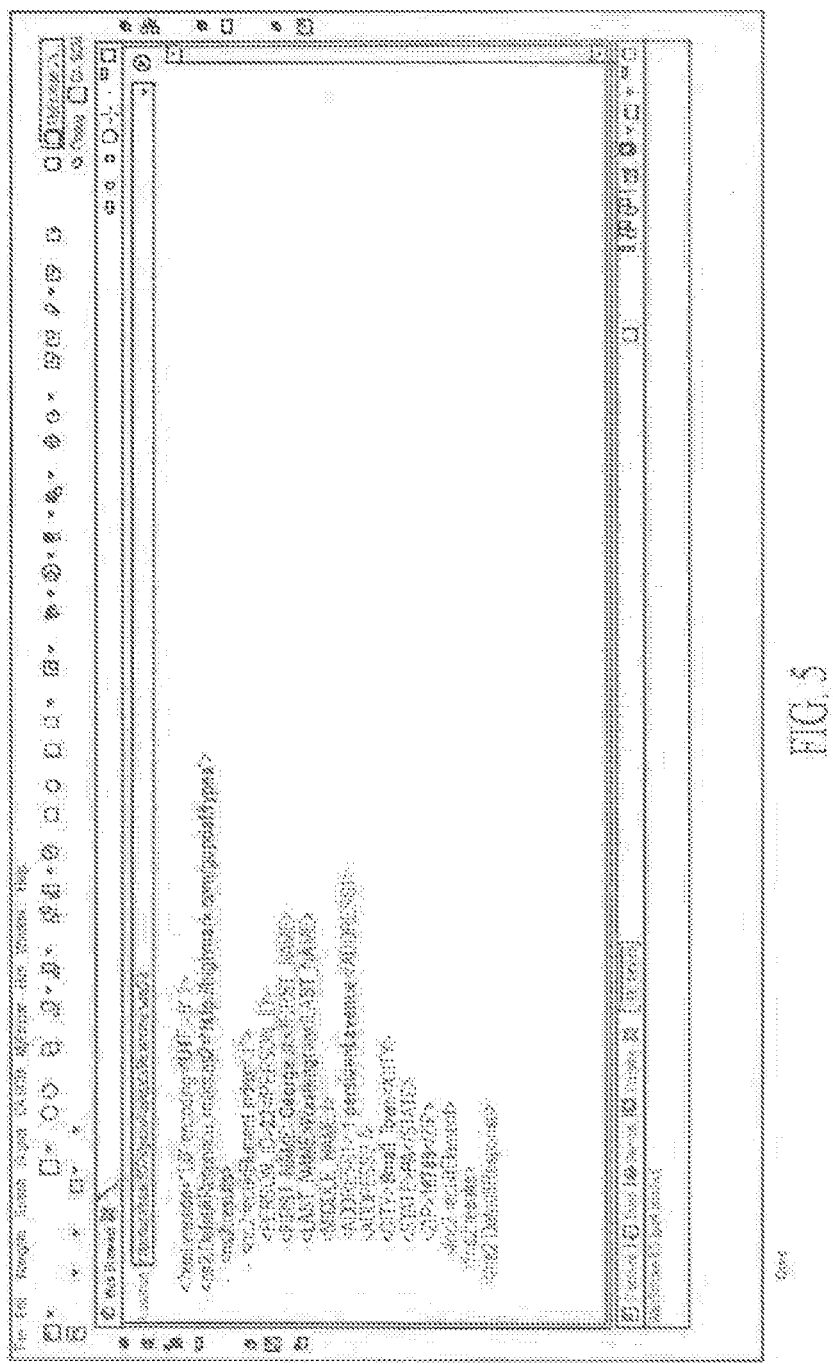

FIG. 3 incudes screen displays illustrating examples of configuration tales used to enable the web services involved in the example shown in FIG. 2, FIG. 4 incudes a screen display illustrating an example of the results returned as a result of a call to a service in connection with the example shown in FIG. 2, FIG. 5 incudes a screen display illustrating an example of the results returned as a result of a call to a service in connection with the example shown in FIG. 2.

Figure 6:
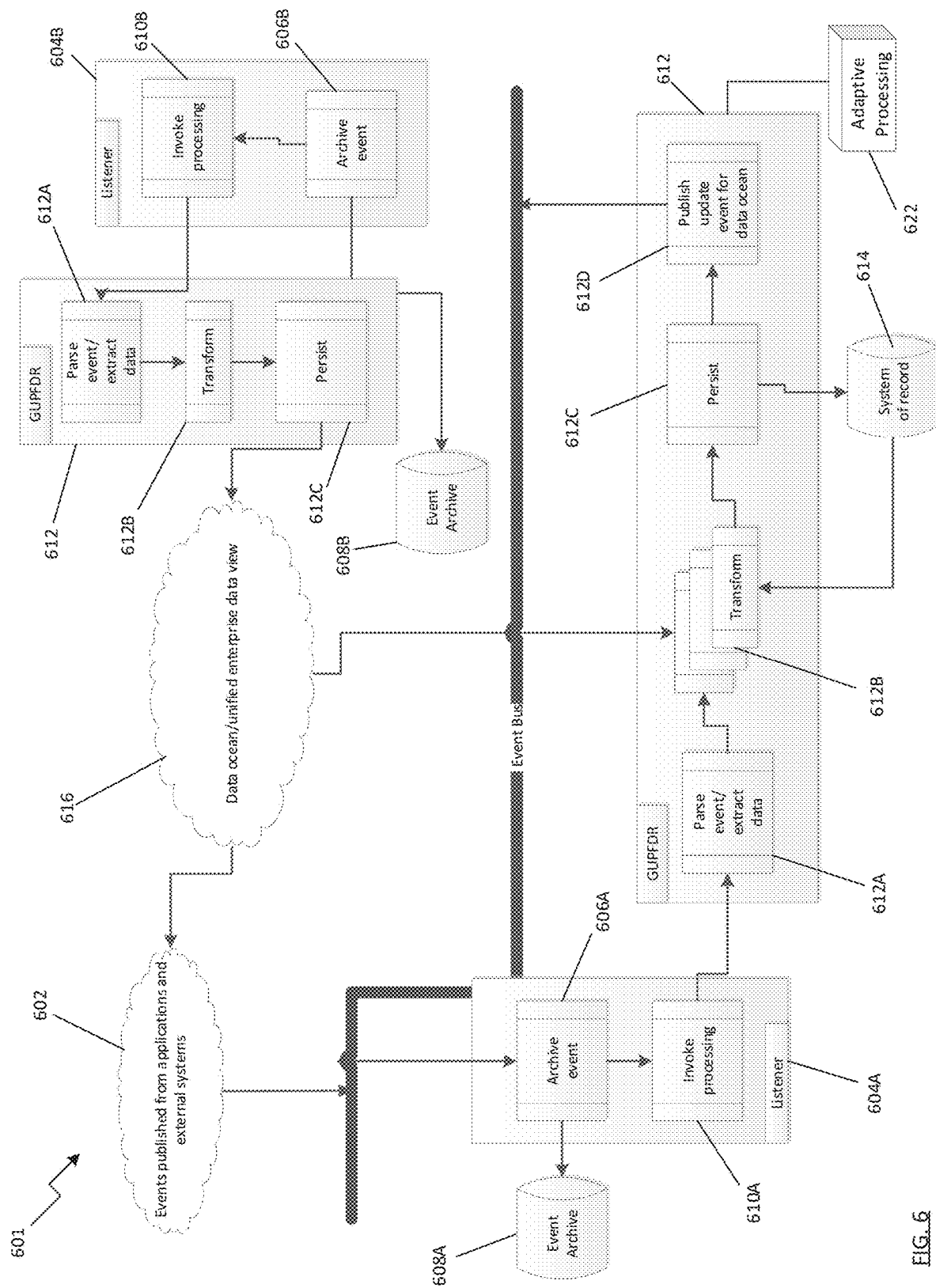

FIG. 6 illustrates an example of a computer system architecture structured in accordance with various embodiments of the invention and illustrating various aspects of the computer-based processing performed by these embodiments.

FIGS. 7 through 42 include screen displays which demonstrate various examples of the computer-based processing and tasks which can be performed by certain embodiments of the invention.

DETAILED DESCRIPTION

Various embodiments of computer architectures, computer platforms, and associated computer-executed processes may be referred to herein at times as "grand unified processor" (or "GUPe"). In developing the invention, the inventors have acknowledged that content should be the primary focus of the data processing performed in a computing environment. Dependency on the structure of computer architecture should be reduced or made irrelevant, because even minor changes to such structure can require significant programming, testing, or implementation resources. In certain implementations of a GUPe platform, computer-executed processes need only to be coded once to use a common data type/structure or document object model (DOM). Once content is able to be processed in this common data type/structure, then any new source (e.g., data source or other information source) for the content becomes a fairly straightforward structure mapping/transformation process that does not require accounting for changes to other parameters of the computer system such as structural changes in computer architecture, for example. Those skilled in the art will readily appreciate how reducing system maintenance, reducing programming effort, and improving processing efficiency of the computer system can be realized as benefits of employing, embodiments of the present invention.

In addition, the inventors have employed metadata driven design (MDD) to develop certain embodiments of the invention. In certain aspects, processes can be executed or evaluated without business or commercial context, regardless of whether data or other content is derived from business, manufacturing, or technical operations, for example. A computer process can be broken down into functional units, and the metadata associated with the functional units can be extracted. Each functional unit can be represented by a relatively simple interface and also coded with computer-readable instructions to use a set or sets of configurations defined by the metadata. A computer process can then be implemented by configuring the functional units to execute based on a configuration set determined at runtime by a predefined operating parameter or parameters.

In various embodiments, the present invention provides a configurable computer-based platform for processing data and computer-based events which can be embodied as a combination of multiple self-contained frameworks and an interface layer. Each underlying framework can be configured to function individually or to work cooperatively in combination to enable the platform to provide an almost entirely configuration driven data processing platform. The platform may be configured to provide: a common path for all data entering the system regardless of source or format; a common way to validate format as well as content of the data; a common way to apply business rules such as those using ajsr94 compliant business rules engines like DROOLS/jess, for example; integration with external work flow management systems like PEGA; a common way to store and retrieve the data from various data repositories; event processing; and/or, business process management ("BPM") capabilities.

With reference to FIG. 1, a system diagram illustrates one example of a GUPe platform or computer system 101 structured and configured in accordance with certain embodiments of the invention. As shown, one or more content feeds 102 from various data sources enter the system 101 through a GUPENV REST sub-module 104A of a GUPENV module 104 and/or through an FTP/SFTP file transfer process 106. The content feeds 102 may include medical records data, manufacturing data, or customer data, for example, and/or a variety of other business or commercial information. The GUPENV module 104 may include the GUPENV REST sub-module 104A and a GUPENV FIB sub-module 104B, which are configured to function cooperatively within the system 101. In various embodiments, the GUPENV module 104 provides an interface layer to the processing frameworks; provides external facing representational state transfer ("REST") services; provides java API via a default set of processing Enterprise JavaBeans (EJBs) 108; processes arbitrary data content and structure; and, orchestrates the basic platform flow. It can be seen that the system 101 can be configured to validate input structure and structure can be translated to a common transaction format. Likewise, content can be validated by range/bounds checking and defaulting of missing values, for example, among other content validation techniques. The EJBs can be executed to perform the transaction and to store data in the repository among other tasks. In one embodiment, an optional interface with an external workflow system may be executed after each processing step to record progress and any errors that need to be manually addressed.

In various embodiments, a GUPDAF module 110 may be included in the system 101 to provide a data access framework for facilitating configuration driven data access which enables a zero code or near zero code data access object (DAO) layer for multiple repository types. The GUPDAF module may also provide transaction management and may be configured to handle multiple protocols (e.g., RDBMS via JPA or JDBC; Web service using REST and SOAP; JMS/MQ; Jsr94 Business rules engine; and Bluedevel, among others). The section herein entitled "GIRe Data Access Framework" (see below) provides more detailed examples associated with the structure and function of different embodiments of the GUPDAF module 110. The data access framework embodied by the GUPDAF module 110 may be configured to provide a single, convenient user interface for all data access regardless of its source and to assist a software developer, for example, with managing transactions. In the examples and description provided herein, it can be seen that use of such a data access framework can decrease software development time and decrease maintenance or other downtime for the system 101.

It can be appreciated that the data access framework is preferably meta data driven in that each request contains a reference or identifier to a set of meta data defining the interaction. The data access framework can also be request/response driven to the extent that each request contains a reference to a set of meta data along with any data necessary for completion of the interaction. A response can be returned for each processed request which contains any data the remote system returned. The data access framework can also be transaction-based to the extent that a user is allowed to create a list of requests and pass the list to a data service for processing, for example.

In one embodiment, a DataService element can be configured to manage transactions wherein each list of requests can be processed as a single transaction, and it can apply pre/post processing rules to each transaction. The DataService element may also determine which adapter to use for processing and route requests to the proper adapter for processing. The DataService element may be configured to examine return codes for commit rollback, for example, and each method call may be treated as a single transaction with commit on successful processing of all requests in the list. As the main interface used by a software developer or another user, in one embodiment the DataService element may include two methods, for example: processRequest (DataServiceRequest request); and, processTransaction (List<DataServiceRequest> requestList).

In various embodiments, adapters can be provided in the data access framework which are configured for processing requests including connecting to remote computer systems, executing, the request, and returning the response. Adapters may also apply pre/post processing rules to each request, and may derive data from and properly format the request for the remote system. In various adapter embodiments, four standard operation types may be represented by the four HTTP operation types: get(DataServiceRequest request); put(DataServiceRequest request); post(DataServiceRequest request); and, delete(DataServiceRequest request). Adapters may support various repository protocols such as JPA, MBC, REST, SOAP, JMS, BlueDevel, and JSR94 compliant business rules engine, among others.

In one example of operation of the data access framework, a DataServiceRequest element can be provided which represents a single interaction with a remote system and contains all information necessary for the framework to route the request and interact with the remote system. In another example, a DataServiceResponse element can be provided which contains any information that the remote system returned and contains any status information as to the outcome of the interaction.

In another example, a ComponentFactory element can be configured to be responsible for creating any components used by the framework and can be configurable for each component. Factories can be mixed into different configurations, including, JNDI-uses global JNDI namespace for lookup; JNDILocal—uses local MTH namespace for lookup; Class—uses no argument constructor to instantiate class; and Spring—uses spring application context for lookup, among other factories.

In another example, a CacheProxy element can be provided for allowing caching of request results so the next request will not query a remote system, and for filtering capabilities the cache mechanism provides a filter object to allow filtering of cached data sets. In another example, an ObjectProcessor element can provide an interface for pre-processing and post-processing and allow manipulation of request (pre-processor) and response (post-processor) of different interactions. A CollectionFilter element is an example of an element configured to provide an interface for filtering cached data for which a developer may implement actual matching criteria.

In various embodiments, the DataService element can be used to configure defaults and adapters as shown in the following example:
the transaction proxy class
transactionProxyClass=com.highmark.base.dataservice.transaction.WebsphereTransactionProxy
the default adapter to use if no adapter is specified in the request
default.adapter=jpa
the default cache policy to use if none is provided for an adapter
default.cachePolicy=true
the default factory class to use if none is configured for an adapter
default.factoryClass=com.highmark.base.dataservice.componentfactory.JndiComponentFactory
adapter configurations.
adapter.jpa.factoryClass=com.highmark.base.dataservice.componentfactory.JndiComponentFactory
adapter.jpa.reference=ejblocal:DefaultP AAdapter
adapter.jdbcfactoryClass=com.highmark.base.dataservice.componentfactory.ClassComponentFactory
adapter.jdbc.reference=com.highmark.base.dataservice.adapter.DefaultJdbcAdapter
adapter.jdbc.cachePolicy=false
end of configuration
In another embodiment, an adapter can be configured to configure defaults and repositories as shown in the following example:
the transaction proxy class
transactionProxyClass=com.highmark.base.dataservice.transaction.WebsphereTransactionProxy
the default adapter to use if no adapter is specified in the request
default.adapter=jpa
the default cache policy to use if none is provided for an adapter
default.cachePolicy=true
the default factory class to use if none is configured for an adapter
default.factoryClass=corrthighmark.base.dataservice.componentfactory.JndiComponentFactory
adapter configurations.
adapter.jpafactoryClass=com.highmark.base.dataservice.componentfactory.JndiComponentFactory
adapter.jpa.reference=ejblocal:DefaultJPAAdapter
adapter.jdbc.factoryClass=com.highmark.base.dataservice.componentfactory.ClassComponentfactory
adapter.jdbc.reference=com.highmark.base.dataservice.adapter.DefaultJdbcAdapter
adapter.jdbc.cachePolicy=false
end of configuration
In another embodiment, an adapter can be configured to configure query meta data as shown in the following example:
leisValidateClient.datasource=oracle xa
leisValiclateClient.queryType=callable
leisValidateClient.query={call mkt.ICIS_VALIDATE_CLIENT(?,?,?,??,?,?,?,?,?,?)}
leisValidateClient.parameterIndex.1=p_UserType
leisValidateClient.parameterIndex.2=p__EntityId
leisValidateClient.parameterIndex.3=p_EntityType
leisValidateClient.parameterIndex.4=p_ProductId
leisValidateClient.parameterindex.5=p_CascadeGrps
leisValidateClent.parameterindex.6=p_Section
leisValidateClient.parameterIndex.7=p_EffDate
leisValidateClient.parameterIndex.8=p_User
leisValidateClientparameterIndex.9=p_DataSetID
leisValidateClient.parameterIndex.10=p_WFPhase
leisValidateClient.parameterIndex.11=o_PassFail
leisValidateClientparameterIndex.11.direction=OUT
leisValidateClient.parameterIndex.11.type=NUMERIC
leisValidateClient.postProcessor.componentFactoryClass=com.highmark.base.dataservice.componentfactory.ClassComponentFactory
leisValidateClient.postProcessor reference=com.highmark.cItdcc.record.processor.ValidationPrePostProcessor In various embodiments, client interaction can be facilitated in the form of instructions that allow a client to create requests and submit them to the data service as shown in the following example:
Map dataMap=new HashMap( );
dataMap.put("clientStatus","A")
DataServiceRequest request=new DataServiceRequest ("jpa", GET, "getClientsByStatus", dataMap);
DataServiceResponse response=dataService.processRequest(request)
In another example, the client examines or uses data in responses returned from the data service as shown in the following example:
List clientList=(List) response.getData( )
In various embodiments, set filtering functionality may be accessible through the system 101 as an extension to the standard java collections API, for example, to allow for more convenient filtering of data in large sets. The set filtering functionality may support both filter inclusion and exclusion in the returned data set and may include a regular expression filter implementation. Custom filters can be written by implementing a simple one method interface. This type of functionality embodies the concept of a controller pattern leveraging the data access framework. It allows content update requests to be consolidated to be run all at once; provides static methods to load properties tiles from the tile system or a database; caches properties files to improve performance; and can be used with a variety of applications, regardless of type or platform.

In various embodiments, the system 101 may include a GUPFDR module 112 which comprises a federation engine 114 or event processing engine, among other components. The federation engine 114 may be configured as an event driven high speed engine which is configurable while requiring no coding and with no hard ties to any source, destination or data layout. The federation engine 114 can be configured as a process workflow by changing federation types; it can provide read/transform/write capabilities; and it can support multiple repository types, such as Rdbms, Jms File/FTP, and Webservice, among others. The federation engine 114 may be configured with a relatively fast processing speed (e.g., configured to copy data at a rate of about 3000 elements per minute for each thread, e.g., 20 ms/transaction). In addition, it can be programmed in certain embodiments for executing multiple threads as needed with little or no processing overlap.

A web application may be built into the system 101 to facilitate users managing the jobs and schedules executed with the federation engine 114. The configuration of the engine 114 can be considered meta data driven to the extent that each federation type can be configured using a set of meta data defining the source and destination interactions. The engine 114 may be configured to run through the internal WAS scheduler, and control, source, and destination can be in different locations for each federation or federation type employed by the engine 114. The functions of the engine 114 can be readily extended by implementing federation interface for any new federation type, and configurations executed through the engine 114 can be stored in properties files or database tables, for example.

In various embodiments, a number of framework elements may be employed and executed in association with the federation engine 114. For example, a WebSphere internal scheduler may be provided which can be configured in a manner similar to other server resources like dynacache. A scheduler interface can be implemented as a web-based interface tool for managing jobs which has the ability to add, remove, pause, restart, or enable any federation or federation type. Each job may have its own schedule so different jobs can be run at different intervals.

In various embodiments, a federation process bean may be configured as a main entry point for all federation processes. The process bean may be connected to a control table to manage control records to avoid or reduce overlap in processing (e.g., will not allow a federation request to be processed more than once), and it can examine control records and delegate tasks to individual federators. In various embodiments, different aspects of the federation operation are configurable, such as the layout and location of the control table; the type and number of federations to perform in a single execution; and updates for success and failure, among others.

With respect to other framework elements, different federators can be configured for different combinations of source/destination. Federators can accept control information from the federation process bean and execute the copy command, for example. Federators allow configuration of different aspects of the copy process. Among other tasks, federators can be configured to read data from a source (e.g., can be any type of source not just an RDBMS); transform data; write data to destination (e.g., can be any type of destination not just an RDBMS); and manage transactions.

In another example of a framework element, a work manager can be embodied as a thread pool used by the federator to run federators. The work manager can be configured by a WAS administrator in a manner similar to the scheduler. In certain embodiments, if no custom work manager is configured, a default work manager which is shared by other WAS processes can be used.

The benefits of the federation engine 114 as described herein include owner control of jobs. The owner of the application can have total control over the federation jobs, and there is no need to send requests to pause/restart/add/remove jobs to the ESP scheduling group. Access can be controlled by standard web based security backed by LDAP, and administrative users can be granted access by submitting a SARA request, for example, to add the proper LDAP groups to their profile. The federation engine 114 also embodies a zero or near zero deployment model. By using a database to store configurations allows for a zero-deployment model where adding new federations of an existing type does not require a new deployment, just a database update. It can be seen that this can result in lower maintenance costs and enhanced software development efficiencies. Various illustrative examples of the structure, configuration, and operation of certain aspects of the federation engine 114 are included in the section entitled "GUPe Federation Engine" (see below).

In various embodiments, the system 101 may include a GUPEDI module which can be programmed to provide configuration driven data translation functionality, with little or no coding or software programming, required. The GUPEDI module may be programmed to supports multiple input types, such as file-fixed length/delimited (e.g., as a string or input stream/reader); Pojo; and Map, among others. Likewise, the GUPEDI module may be programmed to support multiple output types such as file-fixed length/delimited; Pojo; Map; XML; and JSON, among others. Various illustrative examples of the structure, configuration, and operation of certain aspects of the GUPEDI module can be seen in the description of the section entitled "GUPe EDI Framework" (see below).

In various embodiments, the system 101 may include a GUPBRE module programmed for use in association with various business rules which may be applied in connection with the tasks and functions performed by the system 101. The GUPBRE module may provide a jsr94 compliant business rules engine, for example, and may provide a common user interface to create/store business rules. The GUPBRE module may be configured to support multiple storage locations for rule repositories including database and file storage media, for example.

FIGS. 2 through 5 illustrate different aspects of one example of the use and operation of the system 101 in the context of exposing two web services without having to expend software development time and without writing any code. FIG. 2 shows an example of a work space associated with an employee activity record (EAR) project. As can be seen in the left pane of the screen display, there is no source code in any of the three deployed projects (i.e., GUPENV, GUPENVEJB, and GUPENVWeb), and the application is deployed and running.

FIG. 3 illustrates two main configuration files which are programmed to enable the two web services in this example. On the left side of the screen display is the REST interface definition which shows that two services have been configured, personList and person. The REST configurations are linked by name to the actual repository interactions (in this case a database) in the configuration file on the right side of the screen display. In the configuration on the right, the personList service can be seen directly mapped to the personList configuration, but the person service is mapped (via queryId) to the getPerson configuration. When either of these services is invoked, the mapped repository interaction is performed and data is returned. Note that the person query requires an extra path parameter (person_id), which is one of the attributes of the person resource.

FIG. 4 illustrates the results of the first call to the personList service which returns a list of all persons in the database. All of the attributes of a person are returned in the list. Note that there is a person_id attribute that is unique to each and every person. This is the value which is used in the person service as the path parameter. FIG. 5 shows the results of a call to the second service to retrieve the details for person #22. This service returns only a single person as opposed to the entire list of people.

GUPe Data Access Framework—Data Access Framework Overview. The data access framework sets out to simplify for the developer the details of data access by providing a simple, easy to use interface that encapsulates best practices by forcing the developer to think in terms of units of work. By providing a set of abstractions to represent the building blocks of a coherent unit of work, it promotes the cleanest and most efficient method of access with the least amount of resource consumption. The most relevant components are the data service, component factories, adapters, object processors, request, response, and transaction proxies. The configuration of each will be covered in this document.

Component factories are classes that provide the lookup and/or creation of the framework components. Object processors encapsulate business logic that should be applied to the objects that are passed into and out of the framework. Transaction proxies allow access to the underlying transaction systems. Cache proxies allow access to any cache implementation employed by the application. DataService—the top level component is an implementation of the DataService interface and provides transactional support. Adapters provide the actual connection to the underlying data storage technology. An adapter may connect to any type of back end from a database to a web service.

Data Access Framework Configuration Overview. Configuration of the data access framework requires that there be a configuration file created for most components of the framework that are used. The configuration files for the provided components are standard java properties files in which the configuration data is entered. Configuration for each of the provided components will be covered starting with the supporting factory and proxy classes. Each component that requires configuration includes a setter method to set the configuration file name either programmatically or via dependency injection. Note-certain provided components that can be configured will accept a comma separated list of configuration file names. In this case each of the configuration files will be read, in order, and the configurations contained within are added to the master configuration file. Please take care not to duplicate any configuration entries since the last value read in for an entry will be the one that is used. These configuration files can be placed in any location but care should be taken to either place them at the root of the class hierarchy (especially when using the default file names) or the name can be fully qualified using a "/" instead of a "0.11 as a package separator (e.g., /com/highmark/myproj/config.properties to specify the config.properties file in the com.highmark.myproj package of one of the projects.

Component factories provide a common interface for obtaining the components used within the framework. A component factory should have a no argument constructor and implement the com.highmark.gupdaf.dataservice.componentfactoty.ComponentFactoryInterface. The reference that is passed into the createComponent method is implementation specific. The framework currently provides four component factory implementations. The reference that is configured in conjunction with a factory will depend on the implementation used. The four provided types are:

com.highmark.gupdaf.dataservice.componentfactory.JndiComponentFactory
com.highmark.gupdaf.dataservice.componentfactory.JndilocalComponentFactory
com.highmark.gupdaf.dataservice.componentfactory.ClassComponentFactory
com.highmark.gupdaf.dataservice.componentfactory.SpringComponentFactory The Jndi component factory does a Jndi lookup of the provided reference. The reference provided should be the fully qualified Jndi name of the object from the root of the initial context. The Jndi local component factory does a Jndi lookup of the provided reference relative to the local namespace Uava:comp/env). The name should be the relative name from the local componentnamespace. The class component factory instantiates the classes using the Class.forName(reference).newInstance( ) method where the reference is the fully qualified class name of the component. Note that this factory may be configured to only work with components that have a no argument constructor. The spring component factory uses the context aware interface to provide a reference to lookup the component in a spring context. The reference is the configured name in the springcontainer. Object processors provide a way to apply business logic to a set of data before (pre) or after (post) a request has been processed. These processors should have a no argument constructor and implement the com.highmark.gupdaf.dataservice.ObjectProcessor interface. This interface includes a single method-process (AbstractDataServiceMessage request). In the case of a preprocessor, the current request and its attributes (including responses of previous requests) are passed into the processor. In the case of a postprocessor, the response of the current request is passed into the processor.

Transaction proxies provide an implementation of a standardized interface for the Data Service to utilize the underlying transactional system if necessary. If the data service implementation uses container managed transactions then a transaction proxy should not be necessary. A transaction proxy should contain a no argument constructor and implement the TransactionProxyinterface. This interface includes a single method-getUserTransaction( ) which returns ajavax.transaction.UserTransaction object. A transaction proxy may be provided as follows: com.highmark.gupdaf.dataservice.transaction.WebsphereTransactionProxy The Websphere transaction proxy provides access to the user transaction within a WebSphere application server.

Cache proxies provide an implementation of a standardized interface for a cache access. If the data service implementation does not use caching then a cache proxy should not be necessary. A cache proxy should contain a no argument constructor and implement the CacheProxyinterface. This interface includes several methods for managing the cache and data contained in the cache. A cache proxy can be provided as follows: com.highmark.gupdaf.dataservice.cache.DynaCacheProxy. The DynaCacheProxy cache proxy provides access to a Dynacache instance running in a websphere application server. This proxy is able to proxy multiple instances of dynacache simultaneously. The DynaCacheProxy is configured by a properties file named "DynaCacheProxy.properties" (case sensitivity is system specific). An alternate configuration file name may be passed into the jvm so it can be read by a call to the System.get-Property ("DynaCacheConfiguration") method call (e.g., DdynaCacheConfiguration=MyDynaCacheConfig.properties. This will use the MyDynaCacheConfig.properties file instead of the default file. The configurations may be spread across several files. To accomplish this, the value for the filename should be a comma separated list of files (e.g., DdynaCacheConfiguration=MyDynaCacheConfig.properties, MyDynaCacheConfig1.properties. This will use both the MyDynaCacheConfig.properties and MyDynaCacheConfig1.properties files. There are two sections to the configuration file for the DynaCacheProxy: global—contains global configuration parameters; and, instance declaration—holds a listing of the dyna cache instances managed by this proxy.

There may be only three global configurations for the DynaCache proxy, none of which may be required:
    cache.default.jndiName—specifies the default cache to use if none is specified
    cache.notFoundPolicy—defines the action to take if the requested data is not found.
There are currently two values for this parameter (default is null): null—specifies that the proxy return a null if no data is found; and exception—specifies that the proxy throw an exception if the data is not found.
    cache.instanceSearchPolicy—This is the search policy for the request. There are currently two possible values for this parameter (default is named): named—only the named (or default) cache will be searched for the requested data; all—all managed cache instances will be searched for the requested data. The data will be returned on a first found basis if it is stored in more than one cache instance.

Instance declaration is where the managed instances are configured. Each instance is given an abstract name that is used in configuration files of other components that utilize caching. Each instance requires a single configuration line of the form cache.reference.jndiName—the jndi name of the configured dyna cache instance. The reference part of the key is the abstract name that is then used later in the adapter configuration files. The jndiName is the full JNDI name as configured in the admin console of the Websphere server.

Below is a sample configuration file that configures two managed cache instances, instance_one with the default search policy (named) and not found policy (null) and instance_two with the default search policy (named) and an exception not found policy.
the DynaCacheProxy configuration file
cache.instanceSearchPolicy=named
cache.notfoundPolicy=null
cache.default.jndiName=services/cache/instanceone
cache.instance_one.jndiName=services/cache/instance_one
cache.instance_two.jndiName=services/cache/instance_two
cache.instance_two.notFoundPolicy=exception
end of configuration Data Service—DefaultDataService Configuration Overview. The data service bean is configured by a properties file name "DefaultDataService.properties" (case sensitivity is system specific). An alternate configuration file name may be passed into the jvm so it can be read by a call to the System.getProperty ("dataServiceConfiguration") method call (e.g., DdataServiceConfiguration=MyDataServiceConfig.properties). This will use the MyDataServiceConfig.properties file instead of the default file named DataService.properties. The configurations may be spread across several files. To accomplish this, the value for the file name should be a comma separated list of files DdataServiceConfiguration=MyDataServiceConfig.properties, MyDataServiceConfig1.properties). This will load both the MyDataServiceConfig.properties and the MyDataServiceConfig1.properties.

There are two sections to the data service bean configuration: the global section contains defaults and adapter level configurations; and the adapters section contains the configurations for each adapter that can utilized. There may be only three global configuration parameters. This section should contain at a minimum the transactionProxyClass and the default.adapter configuration lines:
    transactionProxyClass—The fully qualified class name of the transaction proxy implementation.
    default.adapter—The name of the adapter to be used if there is more than one adapter configured and none is specified in the request.
    defaultfactoryClass—The factory class to use if none is specified in the configuration for a particular component.
If not using WebSphere the user can supply a transaction proxy implementation based on whatever transaction management system is in use. Seethe transaction proxy section described herein for further information.

There are three configuration parameters for each adapter. These are repeated for each adapter configured. This section should contain at least one adapter configuration.
    adapter.reference.componentFactoryClass—The fully qualified name of the component factory class.
    adapter.reference.reference—The identifier of the component needed to lookup or create the adapter.
    adapter.re/erence.cachePolicy—The cache policy used by this adapter. This value will override the default cache policy discussed in the "Global Configurations" section. The cache policy for an adapter refers to whether the adapter will be cached by the data service bean and not re-created (or looked up) each time it will be used.
The "reference" part of the key is the abstract reference, defined by the user, that will be used in requests to identify the proper adapter.

Below is a sample configuration for a data service bean that uses the WebsphereTransactionProxy with two adapters named jpa and jdbc. The jpa adapter is obtained via the JndiComponentFactory while the jdbc adapter is obtained via the ClassComponentFactory.
the data service configuration file
the transaction proxy class
transactionProxyClass=com.highmark.gupdaf.dataservice.transaction.WebsphereTransactionProxy
the default adapter to use if no ad adapter is specified in the request
default.adapter=jpa
the default cache policy to use if none is provided for an adapter defaultcachePolicy=true
the default factory class to use if none is configured for an adapter
defaultfactoryClass=com.highmark.gupdaf.data.service.componentfactory.JndiComponemfactory
adapter configurations.
adapter.jpa.factoryClass=com.highmark.gudaf.dataservice.componentfactory.JndiComponentFactory
adapter.jpa.reference=ejblocal:jpaAdapter.
adapter.jdbc.factoryClass=com.highmark.gupdaf.data-service.componentfactory.ClassComponent Factory
adapter.jdbc.reference=com.highmark.gupdaf.dataservice.adapter.DefaultJdbcAdapter
adapter.jdbc.cachePolicy=false
end of configuration Adapters—DefaultJpaAdapter Configuration. The DefaultJpaAdapter is configured with a properties file named "DefaultJpaAdapter.propeities" (case sensitivity is system specific). An alternate configuration file name may be passed into the jvm so it can be read by a System.get-Property( ) method call, using the key "jpaAdapterConfiguration" (e.g., jpaAdapterConfiguration=MyJpaAdapterConfig.properties). This will use the MyJpaAdapterConfig.properties file instead of the DefaultJpaAdapter.properties file. There are three sections to the default JPA adapter configuration: global—contains defaults and adapter level configurations; persistence units—contains the configurations for the persistence units; and, query—contains custom query configurations and aliases for the named queries. There are several default settings that can be entered:

- defaultcomponentFactory—This is the default component factory to be used if none is configured.
- default.queryType—This is the default query type to use if none is configured.
- default.persistenceUnit—This is the default persistence unit to use if none is configured.
- default.cacheProxyClass—This is the cache proxy to use if none is specified for the persistence unit and caching is enabled.
- default.cacheInstance—This is the name of the cache instance to use if none is specified for a persistence unit. A cache instance for the jpa adapter is used to cache out query results.

Below is an example of the global configurations for the DefaultJpaAdapter which declares the JNDI component factory, named query, EJBExamplePuOne and DynaCache proxy with cache instance two as the defaults, e.g.:

start of config file snippet
default.componentfactory=com.highmark.gupdaf.dataservice.componentfactory.JndiComponentFactory
default.queryType=named
default.persistenceUnit=EJBExamplePuOne
default.cacheProxyClass=com.highmark.gupdaf.dataservice.cache.DynaCacheProxy
default.cacheinstance=instance_two
end of config file snippet The DefaultJpaAdapter can be configured to handle multiple persistence units. Each unit is given an abstract name at deployment which is referenced in the configuration file. The default persistence unit is specified using the "default.persistenceUnit" property and is the persistence unit that will be used if none is specified in the configuration file for the query identifier, if only one persistence unit is configured this unit will always be returned regardless of what is specified in a query, configuration. Also, if no query type is specified the default of "named" will be used to invoke a pre-configured named ejb query.

- persistenceUnits.reference.factoryClass—This is the name of the factory class to create the persistence unit.
- persistenceUnits.reference.reference—This is the reference identifier of the persistence unit.
- persistenceUnits.reference.cacheProxyClass—This is the implementation class for the cache proxy.
- persistenceUnits.reference.cacheInstance—This is the name of the configured cache instance for this persistence unit to use if none is configured for a particular query.

In the above "reference" is an abstract name given to the persistence units that will be used in the query configurations described later in this section. Below is an example of persistence unit configuration. It configures two persistence units EJBExamplePuOne and examplePuTwo. Note that the examplePuTwo persistence unit uses the default settings for the component factory, cache proxy and cache instance defined in the Global Configurations section, e.g., start of config file snippet
persistenceUnits.EJBExamplePuOne.factoryClass=com.highmark.gupdaf.dataservice.componentfactory.JndiComponentFactory
persistenceUnits.EJBExamplePuOne.reference=java:comp/env/jpa/entityManagers/EJBExamplePuOne
persistenceUnits.EJBExamplePuOne.cacheProxyClass=com.highmark.gupdaf.dataservice.cache.Dyna.CacheProxy
persistenceUnits.EJBExamplePuOne.cacheInstance=instance_one
persistenceUnits.examplePuTwo.reference=java:comp/env/jpa/entityManagers/examplePuTwo
end of config file snippet There are many configurable properties for each query identifier. If using the default type of "named" and the default persistence unit with no pre or post processing (the majority of cases) then no entries are required at all. When in a multi persistence unit environment then the persistenceUnit configuration will be required if not using the default (see Default Configurations section). The basic parameters are:

- queryId—The actual name of a configured query. If this configuration entry exists, this queryId is treated as an alias to another query. The value of this configuration property will be used as the actual queryId. Any other properties defined by this identifier will override the properties of the actual query pointed to by this alias.
- queryId.persistenceUnit—The name of the persistence unit to be used for the query.
- queryId.preProcessor—A class containing pre-processing logic to be applied to the request prior to execution.
- queryId.postProcessor—A class containing post-processing logic to be applied to the results of the request.
- queryId.queryType—The type of the query. Currently "named", "native", "provided" are supported. Each query type has a separate set of configuration parameters discussed below.
- queryId.useCache—Specifies whether the results are placed in the cache for future lookup.
- queryId.affectsCache—Specifies whether this query will affect the contents of the cache. Works in conjunction with the query/d.cacheKeys entry to ensure the cache is maintained.
- queryId.cacheKeys—A comma separated list of query identifiers whose cached data sets are affected by the execution of this query identifier. If affectsCache is set to true for this query identifier then the identifiers in the list will have their cache entries invalidated so the next access attempt will reload that query identifier's data set into cache.
- queryId.cacheInstance—Specifies the cache instance to use if caching is enabled.

In the above "queryId" is an abstract name used to uniquely identify a particular database operation or interaction. This usually results in executing a query to retrieve data or processing a set of entity objects to update/insert/delete data in the database. This identifier is used by the programmers when creating requests to be processed by the framework.

In this example, there are three types of jpa query types supported, named, native, and provided. Each type has its own set of configuration properties. Named queries are standard named JPA queries that are configured either in a JPA mapping file or via the @NamedQuery annotation embedded in the entity object. They require no additional configuration with the exception of the persistenceUnit if the query is not part of the default persistence unit. Provided queries are identical to named queries except that the query is passed into the adapter in the parameter map under the key queryId.providedQuery. Native queries are standard SQL queries that can be executed and subsequently mapped to a pojo by the WA framework. These queries provide extreme flexibility but lack the ability to push updates back to the database via the POJO. There are several properties that are used with native queries.

queryId.className—the class to map the result set to. Note that care should be taken to ensure that the column names returned by the result set match the POJO attributes exactly. If the columns of the database do not match the POJO attributes then the columns should be aliased so that they do match.

quetyId.parameterIndex.?—This configuration value is the key value for the parameter at index ? (where ? is the integer index of the substitution parameter in the query). There should be one entry for each substitution parameter with the first index being 1.

```
#native query configuration file snippet EJBExamplePuOne
GetEntityDetails.persistenceUnit=EJBExamplePUOne
GetEntityDetails.queryType=native
GetEntityDetails.nativeQuery=SELECT client_Id, client_Name, clientNumber,
client_status, client_Type FROM client WHERE client status=?
GetEntityDetails.useCache=false
GetEntityDetails.className=com.company.model.Client
GetEntityDetails.parameterIndex.1=primaryRecStatus
#native query configuration file snippet end
```

The DefaultJdbcAdapter is configured with a properties file named "DefaultJdbcAdapter.properties" (case sensitivity is system specific). An alternate configuration file name may be passed into the jvm so it can be read by a System.getProperty( ) method call, using the key "jdbcAdapterConfiguration" e.g., DjdbcAdapterConfiguration=MyJdbcAdapterConfig.properties. This will use the MyJdbcAdapterConfig.properties file instead of the defaultJdbcAdapter.properties file. There are three sections to the default Jdhc adapter configuration: global—contains defaults and adapter level configurations; data sources—contains the configurations for the data sources; and, query—contains custom query configurations and aliases for the named queries.

With regard to global configurations, there are several default settings that can be entered:

default.componentFactory—This is the default component factory to be used if none is configured.

default.datasource—This is the default data source to use if none is configured for a query.

default.cacheProxyClass—This is the cache proxy to use if none is specified for the persistence unit and caching is enabled.

default.cache Instance—This is the name of the cache instance to use if none is specified for a persistence unit.

Below is an example of the global configurations for the DefaultJdbcAdapter which declares the JNDI component factory, datasource of examplePuOne and DynaCache proxy with cache instance instance_one as thedefaults:

```
start of config file snippet
default.cacheProxyClass=com.highmark.gupdaf.dataservice.cache.DynaCacheProxy
default.cacheinstance=instance one
default.componentFactoryClass=com.highmark.gupdaf.dataservice.componentfactoryJndiComponentFactory
default.datasource=examplePuOne
######end of config file snippet
```

The DefaultJdbcAdapter can be configured to handle multiple data sources. Each data source is given an abstract name which is referenced in the configuration file in the query section. The default data source is specified using the "default.datasource" property and is the data source that will be used if none is specified in the configuration file for a query identifier. If only one data source is configured it will always be returned regardless of what is specified in a request or a query.

jdbc.datasources.reference.factoryClass—This is the name of the factory class to create the data source unit.

jdbc.datasources.reference.reference—This is the reference identifier of the data source unit.

jdbc.datasources.reference.cacheProxyClass—This is the implementation class for the cache proxy.

jdbc.datasources.reference.cacheInstance—This is the name of the configured cache instance for this data source to use if none is configured for a particular query.

In the above "reference" is an abstract name given to the data sources that will be used in the query configurations described later in this section. Below is an example of data source configuration. It configures two data sources; examplePuOne and examplePuTwo. Note that the examplePuTwo data source uses the default settings for the component factory, cache proxy and cache instance defined in the Global Configurations section, e.g.,

```
start of config file snippet
jdbc.data.sources.oracle_xa.componentFactoryClass=
   com.highmark.gupdaf.dataservice.componentfactory.JndiLocalComponentFactory
jdbc.datasources.oracle_xa.reference=jdhc/oracle_xa
jdbc.datasources.oracle_xa.cacheProxyClass=com.highmark.gupdaf.dataservice.cache.Dyna CacheProxy
jdbc.datasources.oracle_nonxa.componentFactoryClass=
   com.highmark.gupdaf.dataservice.componentfactory.JndiLocalComponentFactory
jdbc.datasources.oracle_nonxa.reference=jdbc/oracle_nonxa
jdbc.datasources.oracle_nonxa.cacheProxyClass=com.highmark.gupdaf.dataservice.cache.DynaCacheProxy
######end of config file snippet
```

There are many properties for each query identifier. If using the default type of "select" and the default datasource with no pre or post processing (the majority of cases) only the query and className are required. When in a multi data source environment then the datasource configuration will be required if not using the default (see Default Configurations section). The basic parameters are, queryId—The actual name of a configured query. If this configuration entry exists, this queryId is treated as an alias to another query. The value of this configuration property will be used as the actual queryId. Any other properties defined by this identifier will override the properties of the actual query pointed to by this alias.

queryId.queryType—The type of the query that is to be executed. Currently there are three types—select, callable, prepared.

queryId.query—The actual query to be run for this identifier.

queryId.datasource—The name of the data source to be used for the query.

queryId.returnType—The return type for the query. Currently dam and pojo are supported. If not provided it will default to pojo.

queryId.className—The name of the class to be mapped to the result set if returnType is pojo. The name of the row tag if returnType is dam.

queryId.dynamicInsert Dynamically constructs an insert statement using the metadata from the database. This is used in conjunction with the queryId.tableName parameter.

queryId.tableName—Sets the table to be used for the dynamic insert.

queryId.returnDefaultObject—Specified whether the query will return a default object of the types specified in the configuration rather than an empty list if no data is found.

queryId.preProcessor—A class containing pre-processing logic to be applied to the request prior to execution.

queryId.postProcessor—A class containing post-processing logic to be applied to the results of the request.

queryId.returnWebRowSet—A Boolean indicating the row WebRowSet xml to be returned if returnType is set to dam. Defaults to false. If returnType is set to pojo it has no affect queryId.returnDomPerRow—A Boolean indicating whether to split the dam response into a separate dam object for each row returned to mimic the behavior of a pojo. Defaults to false. If returnType is set to pojo it has no affect.

queryId.useCache—Specifies whether the results are placed in the cache for future lookup.

queryId.affectsCache—Specifies whether this query will affect the contents of the cache. Works in conjunction with the queryId.cacheKeys entry to ensure the cache is maintained.

queryId.cacheKeys—A comma separated list of query identifiers whose cached data sets are affected by the execution of this query identifier. If affectsCache is set to true for this query identifier then the identifiers in the list will have their cache entries invalidated so the next access attempt will reload that query identifier's data set into cache.

queryId.cacheInstance—Specifies the cache instance to use if caching is enabled.

In the above "queryId" is an abstract name used to uniquely identify a particular database operation or interaction. This usually results in executing a query to retrieve data or processing a set of data objects to update/insert/delete data in the database. This identifier is used by the programmers when creating requests to be processed by the framework.

start of config file snippet
IcisValidateClient.datasource=oracle_xa
IcisValidateClient.queryType=callable
IcisValidateClient.query={call VALADATE_CLIENT(?,?,?,?)}
IcisValidateCtient.parameterindex.1=p_UserType
IcisValidateClient.parameterindex.2=p_Entityid
IcisValidateClient.parameterindex.3=p_EntityType
IcisValidateClient.parameterindex.4=o_PassFail
IcisValidateClient.parameterindex.4.direction=OUT
IcisValidateClient.parameterindex.4.type=NUMERIC
IcisValidateClient.postProcessor.componentFactotyClass=com.highmark.gupdaf.dataservice.componentfactory.ClassComponentFactory
IcisValidateClient.postProcessor.reference=com.highmark.cltdcc.record.processor.ValidationPrePostProcessor
end of config file snippet The DefaultSOAPAdapter is configured with a properties file named "DefaultSOAPAdapter.properties" (case sensitivity is system specific.) An alternate configuration file name may be passed into the jvm so it can be read by a System.getProperty( )method call, using the key "soapAdapterConfiguration" e.g., DsoapAdapterConfiguration=MySOAPAdapterConfig.properties. This will use the MySOAPAdapterConfig.properties file instead of the DefaultSOAPAdapter.properties There are two sections to the default SOAP adapter configuration: global—contains defaults and adapter level configurations; endpoints—contains the configurations for the SOAP based web service endpoints. There are several default settings that can be entered:

default.http.proxyHost—this is the http proxy to use if the http.proxySet attribute is true.

default.http.proxyPort—This is the http port to use if the http.proxySet attribute is true.

default.http.proxySet—A true or false value indicating whether to use the http proxy or not.

default.https.proxyHost—this is the haps proxy to use if the https.proxySet attribute is true.

default.https.proxyPort—This is the https port to use if the https.proxySet attribute is true.

defautt.https.proxySet—A true or false value indicating whether to use the https proxy or not.

Below is an example of the global configurations for the DefauitSOAPAdapter which declares both the http and https host and port to invalid values and also turns them off by setting both the proxySet values to false:

start of config file snippet
default.http.proxyHost=none.http.url.or.ip
default.http.proxyPort=O
default.http.proxySet=false
default.https.proxyHost=none.http.url.or.ip
default.https.proxyPort=O
default.https.proxySet=false
end of config file snippet There are several properties for each endpoint. There are only two required configurations: endpointId.url—the URL of the service; and endpointId.operation—the name of the operation being invoked for this service. The rest of the configurations are optional and are not required. There is a single optional service level configuration which is endpointid.action—the default action to be used if none is specified for a particular operation. There are several operation level configurations:

endpointId.operationName.action—the action to be used for this operation (if none is defined it will use the endpoint action and if no endpoint action is defined then it will use the default); endpointId.operationName.namespace—this is the default namespace for the call (if none is provided then no default namespace will be added);

endpointId.operationName.namespace.ns1—adds a named namespace (the name of the namespace is the final part of the key—ns1 in this example).

In the above the endpointId is an abstract name used to uniquely identify a particular web service that can be called. This identifier is used by the programmers when creating requests to be processed by the framework. operationName is the name of the operation specified by the endpointId.operation entry. Below is an example of the endpoint configurations. It configures a single endpoint with three namespaces:

start of config file snippet
here is a service configuration
this is the base URL testSOAPService.url=http://testServer.company.com/services/SoapService
testSOAPService.operation=someOperation
the optional action is used in the soap header
the default action will be used
if not specified here
testSOAPService.action=someAction
enter a list of namespaces to add to the service
the default namespace is the first one without any .XXX appended to it
testSOAPService.someOperation.namespace=http://some.namespace.com/some/namespace
testSOAPService.someOperation.namespace.ns1=http://some.namespace.com/some/other/namespace
testSOAPService.someOperation.namespace.myNs=http://company.com/some/namespace
end of config file snippet The DefaultRESTAdapter is configured with a properties file named "DefaultRESTAdapter.properties" (case sensitivity is system specific). An alternate configuration file name may be passed into the jvm so it can be read by a System.getProperty( ) method call, using the key "restAdapterConfiguration" e.g., DrestAdapterConfiguration=MyRESTAdapterConfig.properties. This will use the MyRESTAdapterConfig.properties file instead of the DefaultRESTAdapter.properties file. There are two sections to the default REST adapter configuration: global—contains defaults and adapter level configurations; and, endpoints—contains the configurations for the REST based web service endpoints. There are several default settings that can be entered for global configurations:

default.http.proxyHost—This is the http proxy to use if the http.proxySet attribute is true.
  default.http.proxyPort—This is the http port to use if the http.proxySet attribute is true.
  default.http.proxySet—A true or false value indicating whether to use the http proxy or not.
  default.https.proxyHost—This is the https proxy to use if the https.proxySet attribute is true.
  default.https.proxyPort—This is the https port to use if the https.proxySet attribute is true.
  default.https.proxySet—A true or false value indicating whether to use the https proxy or not.

Below is an example of the global configurations for the DefaultJMSAdapter which declares both the http and https host and port to invalid values and also turns them off by setting both the proxySet values to false:
start of config file snippet
default.http.proxyHost=none.http.url.or.ip
default.http.proxyPort=O
default.http.proxySet=false
default.https.proxyHost=none.http.url.or.ip
default.https.proxyPort=O
default.https.proxySet=false
end of config file snippet There are several properties for each endpoint. There is only one required configuration for each endpoint, endpointId.url—the URL of the service. There are four optional parameters (six if one count the deprecated entries). These parameters govern the input source type and the return object type. The first two are legacy to maintain backwards compatibility and only control the format of the output.

endpointId.returnType—the type of the object the service will return. There are currently, three types supported, string/dom/pojo. The default return type is string. NOTE—this entry has been deprecated
  endpoint/d.jaxBContext—this is the context for the JAXB binder if the returnType is pojo. NOTE—this entry has been deprecated
  endpoint.requestType—the type of the object that contains the data for the service call. There may be three types supported:
    string—This is the default type and should be a string representation of the body of the service call. There will be no translations done to this data.
    dom—Specifies that a DOM object will be provided as the input to the service.
    pojo—Specifies that a pojo will be provided as the input to the service. The pojo will be translated via jaxb into xml
  endpointId.request.jaxBContext—this is the context for the JAXB binder if the requestType is set to pojo.
  endpointId.responseType—the type of the object that will be returned by the service in the response. There may be three types supported:
    string—This is the default type.
    dom—Specifies that the response will be translated into a DOM object.
    pojo—Specifies that a pojo will be provided as the input to the service. The pojo will be translated via jaxb into xml
  endpointId.response.jaxBContext—this is the context for the JAXB binder if the responseType is set to pojo.

If the service is a GET service then one should provide an entry for each parameter. The names provided as the values for the parameters are the keys into the map to append the data to the service call. Since there is often more than one parameter the X in the below example should be replaced by an integer denoting the order it should be appended. endpointId.parameter.X—The X in the key is an integer denoting the position of the parameter. The value of the entry is used to extract the input data from the map passed in the request.

In the above "endpointId" is an abstract name used to uniquely identify a particular web service that can be called. This identifier is used by the programmers when creating requests to be processed by the framework. operationName is the name of the operation specified by the endpointId.operation entry.

Below is an example of the endpoint configurations. It configures three endpoints, one a get service with three parameters, the second is a get service that accepts fixed parameters (none passed in) and returns a pojo (using the legacy/deprecated configurations), the third is a post service that supplies a pojo and returns a pojo using the current configurations:
start of config file snippet
here is a service configuration
this is the base URL
testGet.url=http://appstenv7.higbnark.com/services/currentContract/
for a REST GET operation this is the parameter list that will
be appended to the above URL+operation
testRESTService.parameter.1=clientNumber
testRESTService.parameter.2=productLine
testRESTService.parameter.3=contractDate
here is the service config for a get service that accepts no
parameters and returns a pojo
businessCodesService.url=http://company.com:7081/services/businessCodeList
returnType=pojo
businessCodesServicejaxBContext=com.company.model here is the service config for a post service that accepts a pojo
and returns a pojo
createCodeService.url=http://company:7081/HMK/SVC/services/addCode
createCodeService.requestType=pojo
createCodeService.requestjaxBContext=com.company.model
createCodeService.responseType=pojo
createCodeService.response.jaxBContext=com.company.model
end of config file snippet The DefaultJMSAdapter is configured with a properties file named "DefaultJMSAdapter.properties" (case sensitivity is system specific.) An alternate configuration file name may be passed into the jvm so it can be read by a System.getProperty( ) method call, using the key "jmsAdapterConfiguration," DjmsAdapterConfiguration=MyJMSAdapterConfig.properties. This will use the MyJMSAdapterConfig.properties file instead of the DefaultJMSAdapter.properties There are two sections to the default IMS adapter configuration: global—contains defaults and adapter level configurations; and, destinations—contains the configurations for the JMS queue destinations. Regarding global configurations, there are several default settings that can be entered:

- default.queueConnectionFactory—this is the queue connection factory that will be used if no other factory is specified for an individual destination identifier.
- default.requestQueueName—This is the default queue that will be used when publishing a message if no queue is specified for an individual destination identifier.
- default.responseQueueName—The name of the default queue to be used when consuming a message if no other queue is specified for an individual destination identifier.
- default.retrieveResponse—This identifies the default behavior of using a request/response queue pattern. The default is false if this configuration parameter is not specified.
- default.responseWaitTime—This is the time in milliseconds the framework will wait for a response message to be published before giving up and returning an error.

Below is an example of the global configurations for the DefaultJMSAdapter that defines a default connection factory of JMS/QCF along with a default request queue of JMS/HM_LOCAL_DEFAULT_NOTIFICATIONS_REQ.WS and a default reply queue of JMS/HM_LOCAL_DEFAULT_NOTIFICATIONS_REQ.WS. The retrieve response is set to true and the framework will wait 10 seconds (10000 milliseconds) for the reply:
start of config file snippet
default.queueConnectionFactory=JMS/QCF
default.requestQueueName=JMS/NOTIFATIONS.REQ
defaut.responseQueueName=JMS/NOTIFICATIONS.RESP
default.retrieveResponse=true
default.responseWaitTime=10000
end of config file snippet
The configurations for each destination are identical to the default set.

- destination/d.queueConnectionFactory—this is the queue connection factory that will be used for this destination identifier.
- destination/d.requestQueueName—This is the queue that will be used when publishing a message for this destination identifier.
- destination/d.responseQueueName—The name of the queue to be used when consuming a message for this destination identifier.
- destination/d.retrieveResponse—This identifies whether to use a request/response queue pattern.
- destination/d.responseWaitTime—This is the time in milliseconds the framework will wait for a response message to be published before giving up and returning an error.

Below is an example of the endpoint configurations. It configures a destination that uses the default connection factory and specifies a request queue of JMS/REPORTS_REQ and a reply queue of JMS/REPORTS_RESP. The request/reply pattern is turned on and the wait time is specified at 5 seconds:
start of config file snippet
reports.requestQueueName=JMS/HM_LOCAL_DEFAULT.REPORTS_REQ.WS
reports.responseQueueName=JMS/HM_LOCAL_DEFAULT.REPORTS_REP.WS
reports.retrieveResponse=true
reports.responseWaitTime=5000
end of config file snippet Requests and responses are the primary method of interacting with the framework. The programmer will build a request or list of requests to pass to the framework to be processed within a transaction. The framework will return a response or list of responses (one for each request processed). A standard request contains all the information necessary for the framework to process a repository interaction. A request contains the following attributes:

1. identifier—this is the identifier (referred to as the queryId in this document) that identifies the interaction. It is used to determine which configuration properties to use to complete the request.
2. adapter—this is the configured name of the adapter that will be used to process the request. If this value is null or empty the default adapter will be used.
3. operation—this is the type of operation that the adapter will perform. There are currently four types of operations, GET, PUT, POST, DELETE that correspond to the 4 basic data manipulation operations. If this value is null or empty the dethult of GET will be used.
4. shouldProcess—this is a flag available to determine if this request should be processed in the scope of the transaction. It is most often set/unset in a preprocessor to disable a particular request based on the outcome of a previous request. The default is true so the request will process.
5. Data—this is the data that the request needs to operate on. In the case of a GET this will be the filter criteria. In the case of a PUT or POST it will be the data that will be updated to the repository. In the case of a DELETE it will be the key values to identify the data to be removed from the repository.
6. propagation list—this is the list of responses from all previous requests executed in the current transaction. This attribute is typically only used by pre-processor elements and its value is controlled by the framework. A developer will never directly set this attribute, only read its contents when necessary.

Responses are returned from the framework fix each request in the transaction processed. They will generally be returned in the same order that the requests are processed but this is not guaranteed (especially in the case where a shouldProcess flag is set to false for a request.) A response is generated for each request that is processed and will contain the same information with the exception of the data attribute. This is so the caller can clearly identify each response and match it to the correct request in the case that the response list does not match the request list. Responses contain the first five attributes listed above for a request and include the following additional attribute: messageStatus—this is the return status of the request and indicates whether the request processing succeeded or not.

Note that the data attribute of the response does not hold the request information. It contains any information generated by the repository in response to the request. In the case of a GET it will contain a list of the data returned from the query. In the case of a POST, PUT, DELETE it will typically contain the count of the number of entities affected (this will depend on the type of repository the request is processed against.)

Utilities. This section describes the utilities that are provided by the framework and can be used independently of the framework. The provided properties object is a drop-in replacement for the java properties object. It extends the standard properties object to also allow access to key value pairs not only from the file system but also from an XML file with an arbitrary structure or JNDI namespace. To accomplish this, several new load methods have been added:

loadFromJNDI—Loads data from the JNDI namespace. This method will walk the global JNDI namespace from its root context and add all entries converting the JNDI path into a dot separated key by replacing the "/" with a ".". Any primitive value (numbers, dates, etc.) will be translated to a string while any complex objects will be ignored.

loadFromLocalJNDI—Loads data from the local JNDI context. This method behaves exactly like the loadFromJNDI except it uses the "java:comp/env" context as the root of the search instead of the global namespace context as the root of the search.

loadFromAnyXML—Loads data from any XML document. As with the JNDI loader the xpath expression to the data element will be converted to a dot separated list of tag names from the root element of the document.

Properties Object Examples:

loadFromJNDI—Given the following entries into the global JNDI namespace: "/my/rest/getConfiguration" with a value of "RestGetConfiguration.properties" "/my/rest/putConfiguration" with a value of "putconfigs.properties.putconfigs1.properties" Would produce the falling key value pairs: my.rest.getConfiguration=RestGetConfiguration.propertiesmy.rest.putConfiguration=putConfigs.properties.putConfigstproperties.

loadFromLocalJNDI—Given the following entries in a web.xml or an ejb-jar.xml:
<env-entry>
　　<env-entry-name>dataservice/rest/getConfigurationFileName</env-entry-name>
　　<env-entry-value>RestGetConfiguration.properties</env-entry-value>
</env-entry>
<env-entry>
　　env-entry-name>dataservice/rest/putConfigurationFileName</env-entry-name>
　　<env-entry-value>putConfigs.properties,putConfigs1.propertiesc/env-entry-value>
</env-entry>
Would produce the following key value pairs:
dataservice.rest.getConfigurationFileName=RestGetConfiguraton.properties; and,
dataservice.rest.putConfigurationFileName=putConfigs.properties,putConfigs1.properties loadFromAnyXML—Given the following arbitrary XML document:
<?xml version="1.0" encoding="UTF-8"?>
<properties>
　<default>
　<adapter>jdbc</adapter>
　<operation>GET</operation>
　<dataService>ejbLocal:dataService</dataService>
　</default>
<clientid>
　<query>select * from client where client_Id=7</query>
　<params>
　<clientId keyValue="1">clientid</clientId>
　/parains>
</clientid>
<default>
　<data>myDataValue</data>
</default>
</properties>
Would produce the following key value pairs:
default.adapter=jdbc
default.operation=GET
default.data.Service=ejbLocal:dataService
clientId.query=select * from client where client_id=?
clientId.params.1=clientId
default.data=myDataValue In the above, the root tag of the arbitrary XML document should be <properties>. Each tag may have an optional attribute named "keyValue". If present the value of this attribute is used as the value of the key part instead of the actual tag name. This has been done to allow for the use of illegal characters and/or numbers which are not allowable as tag names in an XML document.

The PropertiesManager is a simple management and caching mechanism for the highmark properties object. It manages the creation, caching, and refresh of the properties objects in an application. The factory can be configured to provide a default method of access (filesystem or Database) as well as a specific configuration for any or all of the properties tiles being managed. This allows for one to mix storage types.

When a configuration is requested, an internal map is checked to see if the properties object has already been loaded. If it has not then the manager looks for a configuration for the provided identifier. If none is found the default settings are used to load the properties object. Once loaded it is placed into the map and returned to the caller. The manager provides two methods for programmatically refreshing the cache. The refresh method accepts a string identifier for the configuration being requested. If the string is not null then it will remove the cache entry associated with the identifier. If the string is null then it will clear the entire cache. The refreshAll method is a convenience method that delegates to the refresh method passing in a null identifier.

There are several default configurations for the properties manager. These configurations should be put into a file named "PropertiesManagerproperties" and should be put at the root of one of the application's class loaders.

No explicit configuration is required. If there is no configuration file present, the manager will revert to the default method of a file based resource with the identifier being the fully qualified resource name from a class path root and using a shared copy of the properties objects. Note that the properties file can use the standard substitution pattern to allow it to be used across multiple environments.

There are two master configurations. The first is "preserveMasterConfigurations," which is a true/false property that governs whether the manager returns a reference to the master copy or whether the manager returns a copy of the master. This can be important if a process needs to modify the configurations at runtime without affecting the master copy so future runs will not inherit the changed configurations. The default is "false" which gives out the shared copy. The second is "cacheInstanceName" which is the JNDI name of the cache instance that should be used for the caching. if this configuration is not present (or the cache instance cannot be found) the manager will use a standard concurrent hash map to cache the properties objects.

If configurations are found, there are two types of configuration sets, one for the file based access and one for the database based access. These sets can be entered for each identifier to allow each identifier to be handled differently or can be set as defaults to be used if one do not want to enter them for each identifier. The following is an example of the properties file entries:
preserveMasterConfigurations=true
cacheinstanceName=services/cache/properties_cache
penv.dataBaseName=picis
tenv1.dataBaseName=sicis     tenv2.dataBaseName=micis
tenv3.data.BaseName=iicis
default.storageType=File defaultfileFormat=standard
default.dataSource=jdbc/oracle_${dataBaseName}
default.jdbcDriverClass=com.oracle.jdbc.OracleDriver
default.jdbcUrl=jdbc:oracle:oci8:@micis
default.jdbcUserName=lidxxxl
default.jdbcPassword=bGlkZTlmZA==default.tableName=
properties_table
defaul.tfileColuamName,;=fitecolumn
default.keyColumnName=keycolumn
default.valueColumnName=valuecolumn    default.timeTo-
Live=0
default.propertiesClass=com.highmark.gupdaf.utilities.
Properties
dbConfig.local.jdbcDriverClass=com.oracle.jdbc.Oracle
Driver
dbConfig.local.jdbcUrl=jdbc:oracle:oci8:@micis
dbConfig.locatjacUserName=lidxxxl
dbConfig.local.jdbcPassword=bGlkZTlmZA==dbConfig-
local.tableName=props_table
dbConfig.local.fileColumnName=configset
dbConfig.local.keyColumnName=keyvalue
dbConfig.local.valueColumnName=datavalue
process1.resourceName=com/highmark/ccr/enterprise/Configuration.properfies
process2.storageType=Database
process2.dbConfig=local process3.storageType=Database
process3.resourceName=copyProcess Given the above configuration file, the default storage type for any identifier not named in another configuration block:
  For all database storage the default data source is "jdbc/oracle_" with the substitution value appended
  For all database storage the default table name is "properties_table", For all database storage the default name for the column name that holds the file identifier is "filecolumn"
  For all database storage the default name for the column name that holds the key identifier is "keycolumn"
  For all database storage the default name for the column name that holds the file identifier is "valuecolumn"
  For all configurations, the time to live is "0"
  For the identifier "process1" the actual resource name used wilt be "com/highmark/ccr/enterprise/Configuration.properties"
  For the identifier "process2" the storage type is database using the defaults for data source, file, key, and value column names
  For the identifier "process3" the storage type is database using the defaults for data source, key, and value, but using the file identifier of "copyProcess"
  For all other identifiers, the storage method will be "file" and the identifier will be used as the resource name.

The timeToLive configuration is a time-based refresh mechanism. The value entered here represents the number of hours the data will live in the cache before it is automatically refreshed by the properties manager. A value of 0 indicates that there is no expiration of the cached data. If this property is omitted for an identifier then it will use the setting front the default entry. If there is no default entry then the value will default to zero.

Framework Extensions—this section describes the built-in extensions to the framework as well as Universal REST Framework. The universal REST framework is a single rest service that is a configurable front end for the data access framework. Its configurations allow it to expose any configured query identifier to the external world via a REST call. Once configured the framework will expose REST web services without the need for coding using the following URL format: <Base URL>/rootContext/queryId/ . . . ? queryParam=value& . . . , where <Base URL> is the base URL of the web application including the servlet mapping to the rest servlet, the rootContext is the configured root context (defaults to "dataService" of the framework, and the queryId is the query identifier for the data service. The " . . . " following the queryId indicates that any number of path parameters may be configured for each individual service and as always, a variable number of query parameters may be passed in.

If one deployed the framework into a server "mydomain.com" under the root web context of "myapp" and used a servlet mapping of "/services/*", without overriding any of the other defaults, a service configured with the queryId of "clientInfo" would have the base URL of http://mydomain.com/myapp/services/data.Service/clientInfo. If the client number were configured as a path parameter, then access to the service to bring back the client information for client number 155694 would take the form: http://mydomain.com/myapp/servivces/dataService/clientinfo/155694. If the client number were configured as a query parameter, then access to the service to bring back the client information for the same client would take the form: http://mydomain.com/myapp/servivces/dataService/clientinfo?clientNumber=155694

The REST data service resource should be configured in the REST application servlet just as any other resource. Once this has been done there are 2 sets of configurations, each using a single file or a set of properties files. The file names are configured in the web.xml or the ejb-jar.xml of the module it is being deployed into. The first set of configurations are for the service. They deal with service wide settings that affect all verbs. These settings are global and apply to each of the services exposed by the framework. The file name is configured in the deployment descriptor using the MIDI name "dataservice/rest/serviceContigurationFileName." The following service wide settings are available:
  rootContext—the root context for the rest hierarchy. If none is configured it will default to a value of "dataService".

jaxbContextPolicy—value that determines whether the default jaxb context is appended to the package list when creating the context for marshalling and unmarshalling. The valid values are "append" and "replace". If no value is configured it will default to a value of "append".

jaxbContext—the default jaxb context that will be either used or appended to the configured jaxb context. If none is provided it will delimit to a value of "com.highmark.gupdaf.universalRest.types"

requestClass—the default class for any incoming request for a PUT, POST, or DELETE service call. If none is configured it will default to a value of "com.highmark.gupdaf.universalRest.types.DefaultRequest".

responseClass—this is the default class for the response to be returned. If none is configured it will default to a value of "com.highmark.gupdaf.universalRest.types.DefaultResponse".

executionProcessor—the class of the execution processor plugin to execute custom code immediately before and after the service executes. This is intended for service wide customizations like security. If individual query customizations are required use the pre/post processor plugins in the data service.

Following is a sample of a service wide configuration file:

rootContext=ccrDataService
jaxbContext=com.highmark.gupdaf.universalRest.types:
com.highmark.ccr.types
requestClass=com.highmark.ccr.RestRequest
responseClass=com.highmark.ccr.RestResponse
jaxbContextPolicy=append
executionProcessor=com.highmark.ccr.processor.SecurityProcessor
executionProcessor.userid=CCRID executionProcessor.bpdlist=1,2,3,4,5,6,7,8,9,10,11,12

The above entries overload the defaults for rootContext, jaxbContext and the request/response classes. There is an execution processor defined as well as some extra sub entries for the execution processor. Any executionProcessor sub entries will be passed along to the execution processor. Note that any of the configurations for a path or query parameter can also be defaulted.

The second set is the set of verb configurations which contain the descriptions of the available services. Each verb has its own set of configurations which allow one to process a particular query ID using one or all of the available verbs. Any verbs not configured will return a 404 not found error to the caller. The user can specify the name of the configuration files for each of the 4 verbs (GET, PUT, POST, DELETE) that are processed by the data access framework. The file name for each verb is configured in the web.xml as environment entries using the following key pattern: dataservice/rest/???ConfigurationFileName, where "???" is the verb for the REST service in lowercase letters. The name can be a comma separated list allowing one another layer of granularity in organizing the configurations. Excerpt from web.xml:

<env-entry>
    <erw-entry-name>dataservice/rest/getConfigurationFileName</erw-entry-name>
    <env-entry-value>RestGetConfiguration.properties</env-entry-value>
</env-entry>
<env-entry>
    <env-entry-name>dataservice/restlputConfigurationFileName<env-entry-name>
    <env-entry-value>putConfigs.properties, putConfigs1.properties<ienv-entry-value>
</env-entry>

The above entry will configure the GET verb using the configuration file named "RestGetConfiguration.properties" and the PUT verb using 2 files named "putConfigs.properties" and "putConfigs1.properties".

Each verb configuration file should contain at a minimum at least one configuration entry for each service exposed by the framework for that verb. In addition to the service configurations, optional defaults for each configuration property can be set. The possible properties are:

queryId—this allows the user to configure a different data service queryId so the service name can be an abstract identifier.

dataService—the reference name of the data service.

dataServiceFactory—the component factory to use for the data service.

adapter—the adapter to use for the data service request jaxbContext—the context to use for any jaxb conversions.

requestClass—the name of the class to be used to convert the request responseClass—the name of the class to be used for the response.

path.Params.?.key—the key for the data service request parameter map path Params.?.converter—the class name for the data converter.

pathParams.?.validator—the class name for the data validator.

queryParams.?.isRequired—true/false value indicating whether this query parameter is required.

queryParams.?.key—value for the key in the data service request parameter map. if none is provided the key will default to the query parameter name.

queryParams.?.converter—the class name for the data converter.

queryParams.?.validator—the class name for the data validator, transformation.?.xslt—xslt for a transformation.

transformation.?.reference—name of an xslt document on the filesystem.

Following is an example of setting the defaults for the above properties:
default.data.Service=ejblocal:dataService
default.dataServiceFactory=com.highmark.gupdaf.factory.JNDIComponentFactory
default.adapter=jdbc
default.jaxbContext=com.highmark.ccr.types
default.requestClass=com.highmark.ccr.ClientRequest
default.responseClass=com.highmark.ccr.ClientResponse The above entries allow exposed services to use the data service deployed at JNDI name "ejblocal:dataService."

In addition to the above, there are two groups of properties to configure the path and query parameters for each service. Each set is a grouping of sub entries using either "pathParams" or "queryParams" as the root of the key after the queryId. The path parameters are configured using the pathParams property set, which describes the path parameters used by the service. If any path parameters are used in the service then a set of pathParams properties are required for each path parameter used. Path parameters are referenced using an index so they can be associated with the correct path element. This creates a compound root of "path- Params.?", where the "?" is the numeric index (starting at zero) of the path element not including the queryId.

Following is an example of pathParams entries for the clientinfo query identifier:
clientinfo.pathParams.0.key=clientid
clientinfo.pathParams.0.converter=com.company.converter.NumberConverter
clientinfo.pathParams.1.key=eff_frm_dt
clientinfo.pathParams.1.converter=com.company.converter.DateConverter
clientinfo.pathParams.1.converter.dateFormat=YYYYMMDD
clientinfo.pathParams.1.validator=com.company.validator.DateRangeValidator
clientinfo.pathParams.1.validator.dateFormat=YYYYMMDD
clientinfo.pathParams.1.validator.minRange=20150101
clientinfo.pathParams.1.validator.maxRange=20151231

The query parameters are configured using the queryParams property set, which describes the query parameters used by the service. Query parameters are optional by nature but can be forced to be required using the isRequired property. Query parameters are referenced by name which creates a compound root of "queryParams.?", where the "?" is the name of the expected query parameter, not including the queryId. The following is an example of queryParams entries for the clientinfo query identifier:
clientinfo.queryParams.clientNumber.isRequired=true
clientinfo.queryParams.clientNumber.key=clientid
clientinfo.queryParams.clientNumber.converter=com.highmark.ccr.converter.NumberConverter
clientinfo.queryParams.effFromDate.key=eff_frm_dt
clientinfo.queryParams.effFromDate.converter=com.company.converter.DateConverter
clientinfo.queryParams.effFromDate.converter.dateFormat=YYYYMMDD
clientinfo.queryParams.effFromDate.validator=com.company.validator.DateRangeValidator
clientinfo.queryParams.effFromDate.validator.minRange=20150101
clientinfo.queryParams.effFromDate.validator.maxRange=20151231

There is a set of xsl transformations that can be applied in a pipeline using the transformation property set, which holds a set of xslt docs used in the transformation of the response. the individual XSL transformation documents are referenced by index which creates a compound root of "transformation.?.xslt" or "transformation.?.reference", where the "?" is the index and represents the order which the transforms are applied. Following is an example of the transformation entries for the clientinfo query identifier:
clientinfo.transformation.1.xslt=<?xml version="1.0" encoding="UTF-8" ?> . . .
clientinfo.transformation.1.reference=MyTransformation.xslt
If both a reference and the xslt are given the system will use the xslt provided and not read the file.

GUPe Federation Engine—Federation Engine Overview. The federation engine is an event driven framework to facilitate the movement of data from one place to another. It can also be used as a simple BPEL engine. The framework operates on a simple read/transform/translate/write cycle. The actual access (read/write) operates on a repository which can be any type of data storage/access device. The framework currently supports database, file system, ftp/sftp, jms, bluedevel, REST, and SOAP. The relevant components are the federation process bean, federators, repositories, and transformers. We will be covering the configuration of each in the following sections of this document.

The federation process bean is the entry point for processing. It is the component that is scheduled in the scheduler and is responsible for querying the control table to determine if there is any work for the processes it manages. The federation process bean is capable of managing 1 to N number of processes to allow one to separate or combine the flows into logical groups that can be manipulated together.

The federator is the code that actually does the work by orchestrating the data read, transform and finally write of the data to the destination. There can be two stock federators: the universal federator that handles data in bulk which is suitable for small data sets, and a streaming federator that can handle large data sets.

Repositories provide the actual connection and orchestrate the interactions with the data repositories. The framework provides repositories for most standard data storage/access methods and includes the following: database, file system, FTP/SFTP, jms, bluedevel, and REST/SOAP.

Transformers are plugins that provide transformation (data format) as well as content translation (data content). There are several transformers provided that can manage a wide range of standard transformations which include: database result set to XML, XML to POJO, POJO to XML, EDI, and business rules.

Configuration of the federation engine involves several steps. This section covers the configuration steps necessary (both server and project) to utilize the engine. The federation engine uses a database for both the scheduler as well as the federation process bean. The federation engine table does not have to be in the same database as the scheduler tables.

Websphere Scheduler. Careful consideration should be given to the location of the scheduler tables. Typically, this is done in the domain's database. This is fine for the deployment environments but is not recommended for local development. For local development, it is recommended that one use the internal derby database so that the scheduler configuration in the deployment environments is not corrupted or changed during any unit testing by the developers which could cause problems for anyone testing in the deployment environments. The scheduler uses several database tables to operate. The structure for these tables can be pre-defined by IBM DDL scripts. The scheduler relies on these tables or it will not function properly. They can either be created using the pre-defined scripts, or they can be created using the Websphere admin console. There is an option in the console to create the tables when one creates the scheduler.

The federation engine can use a single table to operate. This table is the control table and is what collects the events that are processed by the engine. The structure of this table is completely up to the implementer. The only requirements for the framework are that it contains 5 columns to hold the following data:
1. CONTROL_ID—this is a unique key for the record.
2. PROCESS_TYPE—this is a value specifying the process type to run.
3. OBJECT_TYPE—this is a value specifying the object type to operate on.
4. STATUS—this is a char value holding the process status of the row.
5. ERROR_MESSAGE—a char value holding the error message if the row fails to process.

Note that the column names one chooses for the table do not have to match the above values. If one chooses not to use the above values when one selects the data from the control table one need to alias the columns with the above values so the framework will recognize them so if one chooses to use the following table:

Create table federation_control as (
control id long,
Federation long,
Table varchar(30),
Status varchar(1), Error message varchar(2000))
One would use the following query for the framework to get a list of unprocessed work: Select control_id, federation as process_type, table as object_type, status, error_message from federation_control where status='N'.

There are two required server configurations and one optional configuration. A scheduler instance and a data source should be created and a work manager (thread pool) can optionally be created. It is highly recommended that one create a dedicated work manager for the federation engine. The default work manager is shared with other processes in the application server so it could be possible that a job could be blocked because resources are unavailable.

There should be a data source configured for each database used for the above configurations. In a local development environment, this would typically be 2 data sources since the scheduler tables should be in the local derby database but would typically be only one in a deployment environment. When configuring the derby database, a derby network server provider should be configured, and in the data source configuration the database name should be set to "myeclipse". The derby network server also should be started prior to starting the WAS server or there may be exceptions during startup.

To create a work manager in a local development environment, open the administration console for the running server and on the left-hand navigation menu expand the Resources→Asynchronous beans and select Work managers. In the Scope drop down select "Node=localnode, Server=server1" (or whatever the local server is named) and select "New". This will bring up the work manager configuration page. On this page enter a name for the work manager. One should select a name like "schedulerWorkManager" or similar as this name will also be used in the deployment environments. For the JNDI name, one should prepend whatever name one chose with "wm/" (this is the standard context used for work managers by WAS admin) so if the JNDI name would be "wm/schedulerWorkManager".

In the thread pool properties one needs to set the number of threads available for processing. For development in a local environment this number can be fairly small (the default of 2 should suffice), but for the deployment environments one will need to evaluate the volume of data and size it accordingly. Other settings should be left at their defaults.

To create a scheduler in the local development environment, open the administration console and on the left-hand navigation menu expand the Resources and select Schedulers. In the scope drop down select "Node=localnode, Server=server1" (or whatever the local server is named) and select "New". This will bring up the scheduler configuration page.

On this page enter a name for the scheduler. One should select a name like "federationScheduler" or similar as this name will also be used in the deployment environments. For the JNDI name one should prepend whatever name has been chosen with "sched/" (this is the standard context used for schedulers by WAS admin) so if one the JNDI name would be "sched/federationScheduler". In the data source drop down select the JNDI name of the data source one has decided to use for the scheduler's tables.

The table prefix value depends on whether one create the tables from the pre-defined scripts, or whether one is going to use the admin console to create them. If one ran the scripts one need to put the value one used in the scripts. If one is going to use the admin console then use the standard value of "sched_". The table prefix is not important to any external process and is just used by the scheduler internally and is there for cases where multiple schedulers are configured so the jobs are not comingled. Finally, the work manager should be specified. If no dedicated work manager was created one should select the wm/default work manager. Leave all other settings at their defaults.

Configuration of the framework in an application requires that there be a configuration file created for most components of the framework that are used. The configuration files for the provided components are standard java properties files in which the configuration data is entered. Configuration for each of the provided components will be covered starting with the supporting factory and proxy classes. Each component that requires configuration includes a setter method to set the configuration file name either programmatically or via dependency injection. All provided components that can be configured may accept a comma separated list of configuration file names. In this case each of the configuration files will be read, in order, and the configurations contained within are added to the master configuration file. Please take care not to duplicate any configuration entries since the last value read in for an entry will be the one that is used. The properties are read in using the properties manager so consult the gupdaf documentation for details on configuration data location and format.

The federation process bean reads the control table and determines if there are any events to process. If it finds any events it delegates to the appropriate federator to do the actual processing. There are two types of processes currently available. They are asynchronous (threaded) and synchronous (single thread). They are identical in every respect except the way in which they handle the workload.

The standard behavior or the scheduler is to run each defined job in a synchronous manner. That is to say if the previous run has not finished by the time the next run is executed it will block and not run the job again until the previous job has completed. This is typically fine for jobs that run daily, weekly, or even every few hours.

The threaded process bean takes each event it retrieves from the event table, retrieves a federator, passes the control data to it and then passes it off to a thread from the work manager. This federation process will not block unless all the threads in the work manager are being used. In this case the job will block until a thread is available for execution. This is typically used for jobs that run every few minutes (or less) to deliver data in near real time or on jobs that have huge amounts of data to process so parallel threads of execution will be started to increase throughput.

The configurations for these two beans are almost identical. The configuration for the control table and the queries that are run to retrieve the control records are the same. The only difference is in the way the federators are defined that the process bean delegates to. There are 3 sets of configurations for a process. The first set is the control set and defines the event set that will be processed. The second set are the federator configurations. The last set are the object configurations.

There are a base set of configurations for retrieving and managing the control records. These include the database information where the control table is housed along with the queries that do the unprocessed row selection and status update. Additionally, there is a set of configurations for each combination of processtype and objecttype that determines the federator to use as well as any configurations that are passed to the federator for processing. The following is an example of a set of base configurations:

control.blockSelectQuery=select event_)d, object_type as object_type, process_type from event_table where event_status='N' and rownum<?
control.blockSize=6000
control.failureUpdateQuery=update event_table set event_stats='F' failure_cnt=failure_cnt+1, status_msg=? where event_id=?
control.inProcessUpdateQuery=update event_table set event_status='I',
event_process_ts=sysdate where event_id=?
control.orphanQuery=update event_table set event_status='N' where event_status='I'
and event_process ts<sysdate−0.083
control.repository=jdbc/${dataSource}
control.successUpdateQuery=update event_table set event_status='C',
event_process_tss=sysdate where event_id=?

1. The blockSelectQuery should contain a single substitution parameter which is the blockSize. If no blockSize configured a value of 1000 will be used.
2. The blockSize is the number of events that will be processed for each run.
3. The failureUpdateQuery should contain a single substitution parameter which is the control_id.
4. The inProcessUpdateQuery should contain a single substitution parameter which is the control_id.
5. The successUpdateQuery should contain a single substitution parameter which is the control_id.
6. The control repository is the JNDI name of the data source where the control table is located.
7. The orphanQuery serves to try to recover any work that may have been orphaned and should be recovered to be reprocessed.

Once the base configurations for retrieving the events are complete a set of configurations are necessary to process those events by type. This is just specifying the federator class that implements the process and a custom update query. The custom update query is only required if it is different than the default update query provided previously. The following is a set of example configurations for this:

control.federator.1=com.highmark.gupfar.foderator.UniversalFederator
control.federator.1.successUpdateQuery=update event_table set event_status='C',
event_process_ts_ts=sysdate where event_id=?
control.federator.2=com.highmark.gupfdr.federator.UniversalFederator
control.federator.2.successUpdateQuery=update mkt.mal set event_status='C',
event_process_ts_ts=sysdate where event_id=?
control.federator.3=com.highmark.gupfar.federator.UniversalFederator
control.federator.3.successUpdateQuery=update event_table set event_status='C',
event_process_ts_ts=sysdate where event_id=?
control.federator.4=com.highmark.gupfdr.federator.UniversalFederator
control.federator.4.successUpdateQuery=update mkt.mal set event_status='P' where event_id=?
control.federator.5=com.bhighmark.gupfdr.federator.UniversalFederator
control.federator.5.successUpdateQuery=update event_table set event_status='C',
event_process_ts_ts=sysdate where event_id=?

In the above examples, the process_type is an integer value. This value is arbitrary and defined by the implementer. It is used in building key references for the configurations.

GUPe EDI Framework—EDI Framework Overview.

The EDI framework serves as a binding framework for delimited and fixed width data files and POJOs. The framework is completely configurable and the binding takes place automatically based on the configuration files. The framework is able to generate a flat file from a set of POJOs or a set of POJOs from a flat file without any java coding. The default return object is a map for each row so no POJOs are actually required to be created but can be if required.

There are three basic components the user is required to understand. The record set, structure, and field. Once these are understood, configuration is relatively straightforward. Record sets represent a collection of records or individual lines or a file. They are comprised of structures. Structures represent an individual record/line and define the makeup of it using fields. Fields represent an individual data element in a structure. There are several types of fields, each with its own properties. Note that a structure may be used as a field.

Configuration of the EDI framework requires that there be a number of configuration files created. The number will vary depending on the makeup of the individual record or structure. At a minimum one will have a configuration for the Record set, the record structure and 1-N configuration, one for each data element in the structure. Note that these configurations can be reused in different record set definitions so it can be beneficial to standardize some data elements and reuse them across an entire enterprise. Configurations are stored in standard properties files. The Highmark properties object is used to allow storage of these configurations in a database for convenience.

When referring to component names in the EDI framework it is important to note that they are referred to in the same way a java class is referred to, using dot-notation of the package structure without any file extension. This is translated by the framework into the correct name so if one had a properties file named "ClientNumber.properties" for the clientNumber component in the "com.highmark.client" package one would refer to the component as "com.highmark.client.ClientNumber" without the extension and without changing the dot "." to a slash "/" as one normally would to retrieve a file resource. This way one can package a resource jar with the components and distribute it to consumers.

A record set is the top level component and represents an entire file of data. The record set configuration may contain eight configuration parameters:

type—this is the component type of this configuration and should be set to "recordSet"
name—this is the name of the record set. This is used internally within the framework to uniquely identify it.
structureName—this is the fully qualified name of the structure for the body of records (see note about component names above).
usesHeader—a value of "true" or "false" to indicate whether this structure has a header record or not.
headerStructure—this is the fully qualified name of the structure used for the header record (see note about component names above). This entry is only required if usesHeader is set to true.
usesFooter—a value of "true" or "false" to indicate whether this structure has a footer record or not.
footerStructure—this is the fully qualified name of the structure used for the footer record (see note about component names above). This entry is only required if usesFooter is set to true.

trailingEOL—a value of "true" or "false" to indicate whether there should be a trailing end of line character as the last character of the file. This is most important for the creation of the flat file from a list of POJOs where the recipient expects that every line will have an EOL character.

It is expected that if either a header of footer (or both) are used there can be only a single record for each of them. The following is an example of a record set definition:

type=recordSet
name=mixedSampleRecordSet
structureName=com.company.edistructures.mixedSampleStructure
useHeader=false
headerStructure=headerStructure
useFooter=false
footerStructure=footerStructure
trailingEOL=false The above configuration defines a record set named "mixedRecordSet" that has no header or footer with a body structure of "com.highmark.gupedi.edistructures.mixedSampleStructure". When a file is written, an EOL character will not be appended to the last line of the record set.

Structures are the representation of the rows contained within a record set. A record set is broken down into a series of rows, delimited by an EOL character or character sequence, each of which contains a series of data elements or fields. A structure is the most complex of the components to configure and has a variable number of configuration parameters. There are standard configurations that should be entered followed by a variable number of field definitions. Examples of five standard configuration parameters are:

type—the type of component. This should be set to "Structure"

name—the name of this component. This is used internally by the framework but should be unique within the record set.

defaultDataObject—this is the fully qualified class name of the POJO that will be created when calling the getValueAsObjectlist method without supplying an object type for mapping the structure. If no value is configured and no type supplied the method will return a list of Maps.

style—a value of "fixed" or "delimited" to indicate the style of field separation for this structure.

delimiter—the character used as a field delimiter if the style is set to "delimited"

In addition to the above configurations, each structure will contain a number of entries whose keys are all integer numbers and values are the field names (see a note on names above) of the data elements. The integer key value is used to sequence the fields so the lowest number (regardless of location in the file) is the first element in the sequence. The numbers can be any integer (positive or negative). Following is a sample of a structure definition:

type=Structure  style=delimited  delimiter=,
name=SampleStructure
10=com.company.edifielddefs.delimitedString
20=Filler34&#
30=com.company.edifielddefs.Date
40=com.company.edifielddefs.delimitedNumber
50=com.company.edistructures.SampleStructure2

The above configuration defines a structure named "SampleStructure" that is delimited by the "," (comma) character. The structure contains 5 data elements 1 of which (#20) is the special "Filler" field and one of which (#50) is another structure. The other three are standard fields.

In the above example, a filler type is used. This is a special type that has no definition. The format of the value is very specific. It has 2 forms a simple form and a complex form. The simple form is the word "Filler" followed by a numeric value that indicates the width of the filler. If this form is used the default filler of a blank space will be used. An example of this would be "Filler23" which would produce a 23-character string of blank spaces. The complex form also contains the character to be used as the filler separated by the "&" symbol. An example of this would be "Filler23&#" which would produce a 23-character long string of the "#" character.

It is possible to use a structure as a field in another structure definition. To do this one simply uses the name of the structure definition file instead of a field definition file. The benefit of using a structure as a field is that one can mix and match different delimiter styles on a single line. One could have a delimited format file that contains a field that has fixed width set of values.

Fields are the representations of the individual pieces of data contained in a structure. A field configuration may have the following configuration parameters:

type—The data type of this field. Currently the framework supports 3 types—Date, Number and String.

name—the name of the component. This name is used to access (get/set) the individual data element in a structure. This name should be unique within the structure.

className—the implementation class of the return type.

length—the length of the data element in the structure. This configuration only has meaning if the structure is a comprised of fixed width fields. The data element will either be padded or trimmed to the length specified by this parameter.

padStyle—a value of "−1" for left padding or "1" for right padding.

padCharacter—this is the character to use for padding the value when it is shorter than the value specified by length. Note that some characters need to be escaped due to the nature of the properties object and how it stores the information. Most notably is the space character—" " as well as any special characters like a tab (\t).

Note that each data type other than string has additional configuration parameters. This may also include any custom data types that are used. The following are the additional parameters listed by data type:

Date—the date type has 2 extra parameters dateFormat—the formatting string that should conform to the constraints of the standard java SimpleDateFormat class.

dateOffset—the offset into the date field that the actual data begins. This value is optional and defaults to zero.

Number—the number type has 2 extra parameters

Precision—the location of the decimal point in the representation. This is used only used when there is no decimal point provided in the representation (removeFormatting=true).

removeFormatting—a value of "true" or "false" indicating whether the formatting for the number (currency symbol, decimal, etc.) are rendered in the file output.

The following are examples of configurations for each of the three types of data:
String:
name=customerName
type=String className=java.lang.String length=25
padStyle=-1 padCharacter=\
The above configuration defines a field named "customerName" that will hold a string 25 characters long that is left padded (right justified) with spaces (note the blank space after the backslash "\").
Number:
name=paymentAmount type=Number className=java.lang.Double length=12
padStyle=-1 padCharacter=0 precision=2 removeFormatting=true
The above configuration defines a field named "paymentAmount" that is a number 12 characters wide with a precision of 2. The formatting of the number will be removed when written to the file. The value will be left padded (right justified) with zeros.
Date:
name=startDate
type=Date
className=java.util.Date
length=10
padStyle=1
padCharacter=\
dateFormat=yyyy-MM-dd
dateOffset=0
The above configuration defines a field named "startDate" that is a date that is 10 characters wide and has a format of "yyyy-MM-dd" (in SimpleDateFormat terms). The offset into the field is zero since the format itself is IO characters and the padCharacter is defined as a space (note the " " after thebackslash "\").

This section outlines the basic usage of the framework, including examples of required resources and jar placements. The following three jars may be used: edi.jar, gupdafComplete.jar, and hmkcom.jar—indirect dependency from the data service jars. These jars may be placed anywhere in the class path. Note that the gupdafComplete.jar and hmkcom.jar contain the interfaces and support classes required and should be available in the class path for both the module interfacing with the data repositories as well as the module that is consuming the data (these could be the same or different modules.) The gupdafComplete.jar may only be required to be available to the module that is accessing the data repositories.

Initial configuration starts with a record set configuration. Regardless of the actual structure the basic decisions to use/not use a header and/or footer and the names for the record set and structure can be done at this point and the record set configuration created.

Next a structure should be defined. Use the name from the record set created in the previous step. When creating the structure, one should remember to use unique names for each field. If one fail to do so, one may have unexpected results when trying to set data onto the structure.

Once the structure is defined then one need to create a definition for each field defined in the structure in the previous step. Note that one does not have to create any definitions for the filler fields.

Once the configurations have been created, testing the record set is fairly simple. One can test each component individually or one can do an end-to-end test. Just remember that a test on a record set or structure by extension tests the ancestors it has configured. It will not do a full set of tests but it will test the basic get/set/convert operations.

The following is a sample of how to use the framework. Several examples are given. This example reads the string from a file. Any input stream will suffice.
InputStream is=ClassLoader.getSystemResourceAsStream ("tabTestData.txt");
EDIRecordSet recordSet=null;
recordSet=(EDIRecordSet) EDIComponentFactory.createComponent("com.company.edirecordsets.tabSampleRecordSet",-1);
recordSet.parseRecordSet(is);

To return the raw data there is a standard getValue( ) method that returns a list of EDIStructure objects. This is the default representation of the data: List<EDIStructure> records=recordSet.getValue( ). To return the data into the various formats use the getValueAs . . . methods. The following methods return a string representation in various formats.
System.out.println("the record set is: \n"+recordSet.getValueAsString( ));
System.out.println("the record set xml is:"+recordSet.getValueAsXml( ));
System.out.println("the record set json is:"+recordSet.getValueAsJson( ));
The following return a list of objects that can then be iterated over.
List<Object> records recordSet.getValueAsObjectList( );
List<Type> records=recordSet.getValueAsObjectlist(type);
Note that the first form retrieves a list of objects the type of which is specified in the configuration. The second form accepts an object and the framework will try to convert the set into a list of that object type.

Once the data is read in one can manipulate it by iterating over the record sets and getting/setting individual field values.
Set<EDIStucture>structureSet=(Set)recordSet.getValue( );
for (EDIStructure struct: structureSet) {
   struct.setFieldValue("String", "another test value.");
   struct.setFieldValue("Date", new java.util.Date( ));
   struct.setFieldValue("Number", new Double("35.01"));
   String str=struct.getFieldValue("String");
}

Using Complex Components as Fields. Every component that implements the EDIFieldlnterface (which is every component in the framework) may be used in a structure as a field. This allows for very complex data structures. It is possible to have a record set or structure defined as a field in another structure. Be careful though as some structures do not lend themselves very well to nesting.

Data Formats and Bi-Directional conversions. The framework supports several data input and output formats. Data supplied in any of the input formats can be converted to any of the output formats. This allows for seamless and easy conversions between types.

There may be five different input types:
1. Input Stream—The input stream is used to read from file(s) etc. It treats the data the same way as described in the String type below. The input stream uses the parse method as opposed to the setData method.
2. String—The string type is representative of a flat fixed or value separated data format. One entire string is used to represent a record set. The standard CR-LF/EOL line separator is the expected record termination.
3. List<EDIStructure>—The list of native structures.

4. List<Map>—The List of maps uses each map to represent a single record. The key values in the map should match the name (including case) of a configured field. Non-matching keys will be ignored.

5. List<pojo>—The list of pojos uses each pojo to represent a single record. The attribute names should match exactly (including case) the name of a configured field. Non-matching attributes will be ignored.

There may be five different output types.

1. String—The string type is representative of a flat fixed or value separated data format. One entire string is used to represent a record set. The standard CR-LF/EOL line separator is the expected record termination.

2. List<Map>—The List of maps uses each map to represent a single record. The key values in the map should match the name (including case) of a configured field. Non-matching keys will be ignored.

3. List<pojo>—The list of pojos uses each pojo to represent a single record. The attribute names should match exactly (including case) the name of a configured field. Non-matching attributes will be ignored.

4. Xml—This is a custom output type that renders the exact structure of the record set as xml. The wrapper tag name for the entire data set and each record come from the configured name of the component. The tag name for each field is also the configured name of the field.

5. Json—This is a custom output type that renders the exact structure of the record set as Json. Attribute names including data block and list names come from the configured name for the component being rendered.

FIG. 6 illustrates an example of a computer system architecture 601 structured in accordance with various embodiments of the invention and illustrating various aspects of the computer-based processing performed by these embodiments. As noted above, one goal of the system is to provide a zero or substantially zero code environment in the same manner as other framework components described herein. In certain embodiments, the architecture 601 represents a unified event processing framework (sometimes referred to as "GUPEVT") to automate the dissemination and processing of enterprise data. The framework can be configured to provide a zero or near zero-coding environment where any and all types of data, regardless of format or source system, can be captured and processed. When used in operative association with other components, the GUPEVT framework can provide a configurable ecosystem for data processing whose features include (but are not limited to): events can be recorded and tracked through all systems processing them; enhanced delivery of events; persistent events (can last through outages once captured); asynchronous processing; integration with components like GUPFDR to initiate processing of events; implements a data ocean to provide high availability access to unified view of enterprise data; and, event forwarding and republishing, among others.

The framework 601 can start with the basic element that drives other processing: events 602. An event comprises a message that is published that encapsulates an action. For example, each event 602 may contain the action, any associated metadata, and a data payload. Events may be published with or without regard to interaction within listening systems. The method of event publication and transport can depend on whether the data in the event 602 must be kept secure or not. In the event of public or non-secure data, it is often most advantageous to use the physical network's multicast capabilities. This promotes a minimum of resource usage as multicast packets are guaranteed to never duplicate across a subnet to deliver to any and all systems listening. If security and/or guaranteed delivery may be required, then a publish/subscribe messaging system can be used. Using a messaging system like JMS, for example, can increase resource usage and does not scale to a high volume of listeners. This is because the message is duplicated for every system listening and requires an open network socket to be maintained for every system listening. The GUPEVT framework can accommodate the use of any type of delivery mechanism.

In the example shown in FIG. 6, a set of listeners 604A, 604B is provided for the basic event transport mechanisms. No coding is required to use the listeners 604A, 604B, which are configurable as to what events each listener 604A, 604B is programmed to capture. The listeners 604A, 604B are responsible for capturing events, archiving events at 606A, 606B in an archive 608A, 608B to ensure processing, and invoking processing at 610A, 610B for the events 602 in association with a GUPFDR processing framework 612, for example. The choice of archive repository 608A, 608B is not critical, although an RDBMS tuned for high volume transactional data is recommended for a document database and file-based storage system. This archive 608A, 608B may also be configured to track the progress of event processing to ensure that the event 602 is processed correctly. The archives 608A, 608B can also preserve the system state, so that if the system shuts down for any reason the event 602 can continue processing once the system is active again.

Publishing of events 602 can be derived from many different locations. The framework can provide several data change monitors for things like databases (e.g., RDBMS, document, indexed file), which are the most common locations used to store data in an enterprise. Another source of events 602 may arise from user interactions with application software, for example. Various embodiments of the GUPDAF component described herein, for example, can provide event publishing adapters that applications can use to publish events. GUPFDR also provides a set of publishers that plug into the process flow to accommodate publishing of events 602 based on the processing results of received events 602.

The event 602 processing framework may use an ETL (extract-transform-load) tool of the GUPFDR component 612 to extract data (at 612A), transform data (at 612B), and load data (at 612C) as part of the data processing activity. The GUPFDR component 612 allows for parsing, transforming (using multiple stages), and finally storing the data into a repository 614. At the end of the ETL cycle, after the data has been processed and persisted into the repository 614, a special event can be generated at 612D that will update a data ocean 616 that holds the unified view of enterprise data.

In certain embodiments, an adaptive processing module 622 may be provided which operatively interacts with the GUPFDR component 612, for example, among other aspects of the framework 601. The module 622 may be programmed with various kinds of artificially intelligent (AI) algorithms which can be applied to the events 602. The AI algorithms may be configured to analyze and self-configure the processing flow or business rules at runtime, for example, based on the event type, action, source domain, and data content, among other attributes of the event 602. Since each data element can have a reusable set of rules or configurations for processing, whenever a data element is encountered the system can use the AI algorithms to automatically configure the processing flow and/or business rules to apply to each data element as it is encountered. This can eliminate or significantly reduce the need for future maintenance and may streamline entry of the business rules and/or processing configurations (which include any custom business logic if required) to be developed for each data element in the enterprise. Incorporating such AI algorithms can add processing intelligence to the system to automatically set up and configure process flows dynamically at runtime based on the event type and content. In one example, the application of business rules can be assisted using a simple mapping system that maps the data element name to an abstract name of a business rule (or a set of business rules) applied to the data element. Each data element in the event 602 payload is parsed and examined for this link and invokes it if it is found.

With reference to the screen displays shown FIGS. 7 through 42, examples are illustrated of the computer-based modules and computer environment processing which can be performed in accordance with certain embodiments of the invention.

Figure 7:
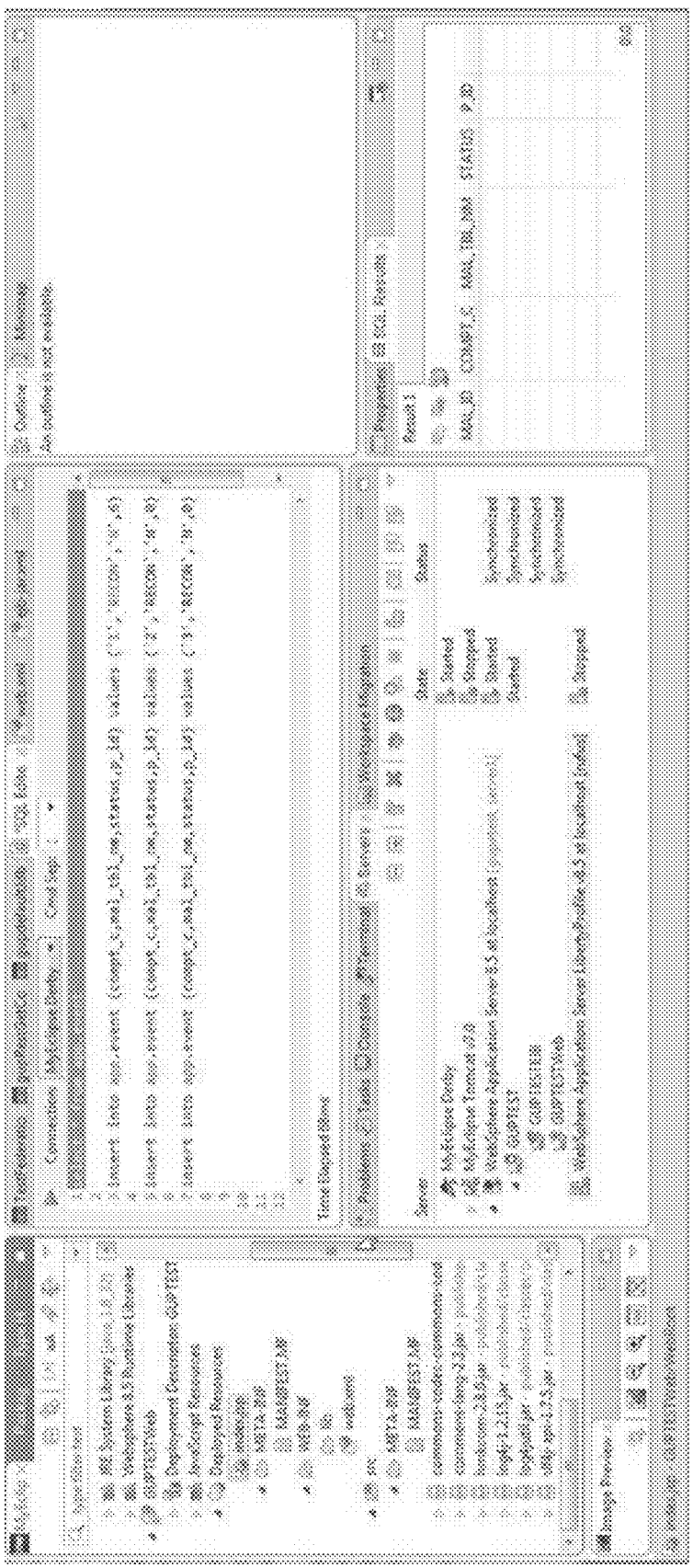
Figure 8:
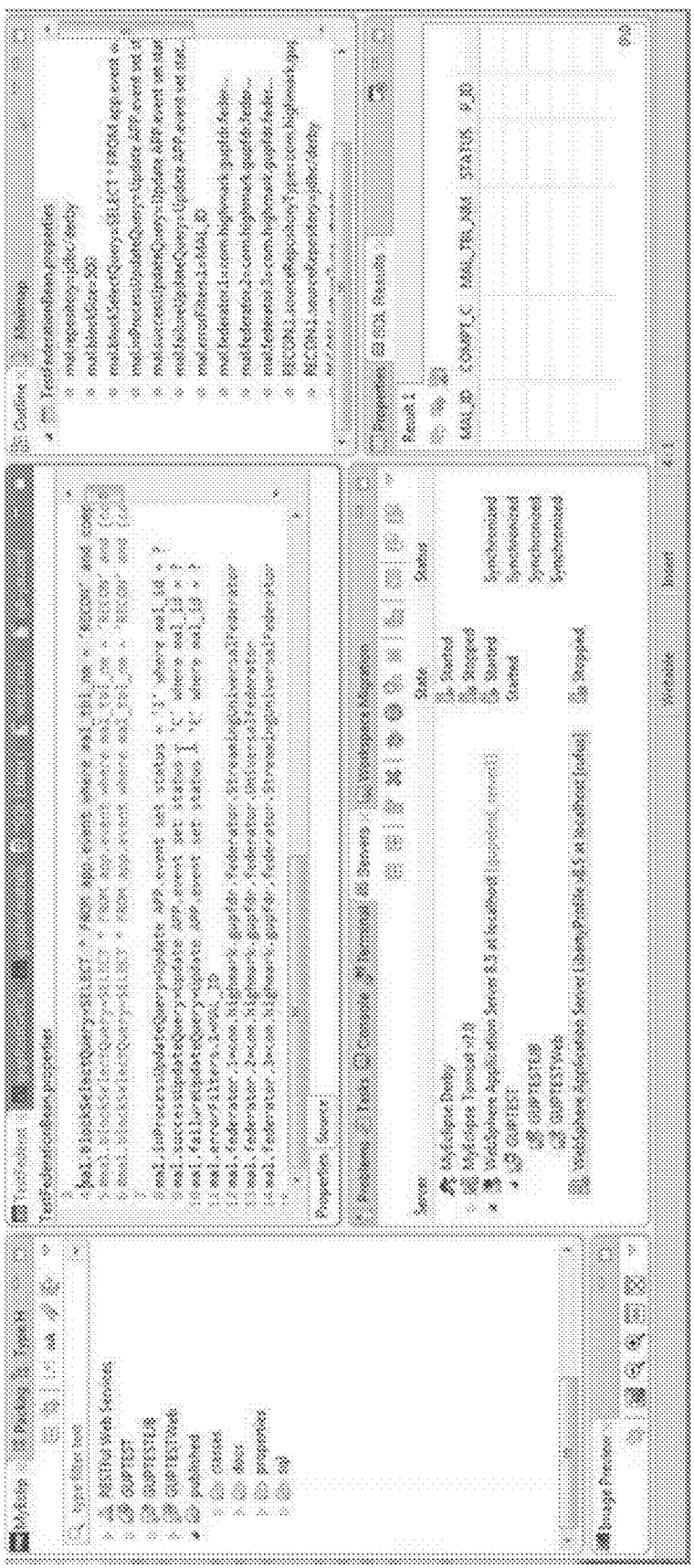
Figure 9:
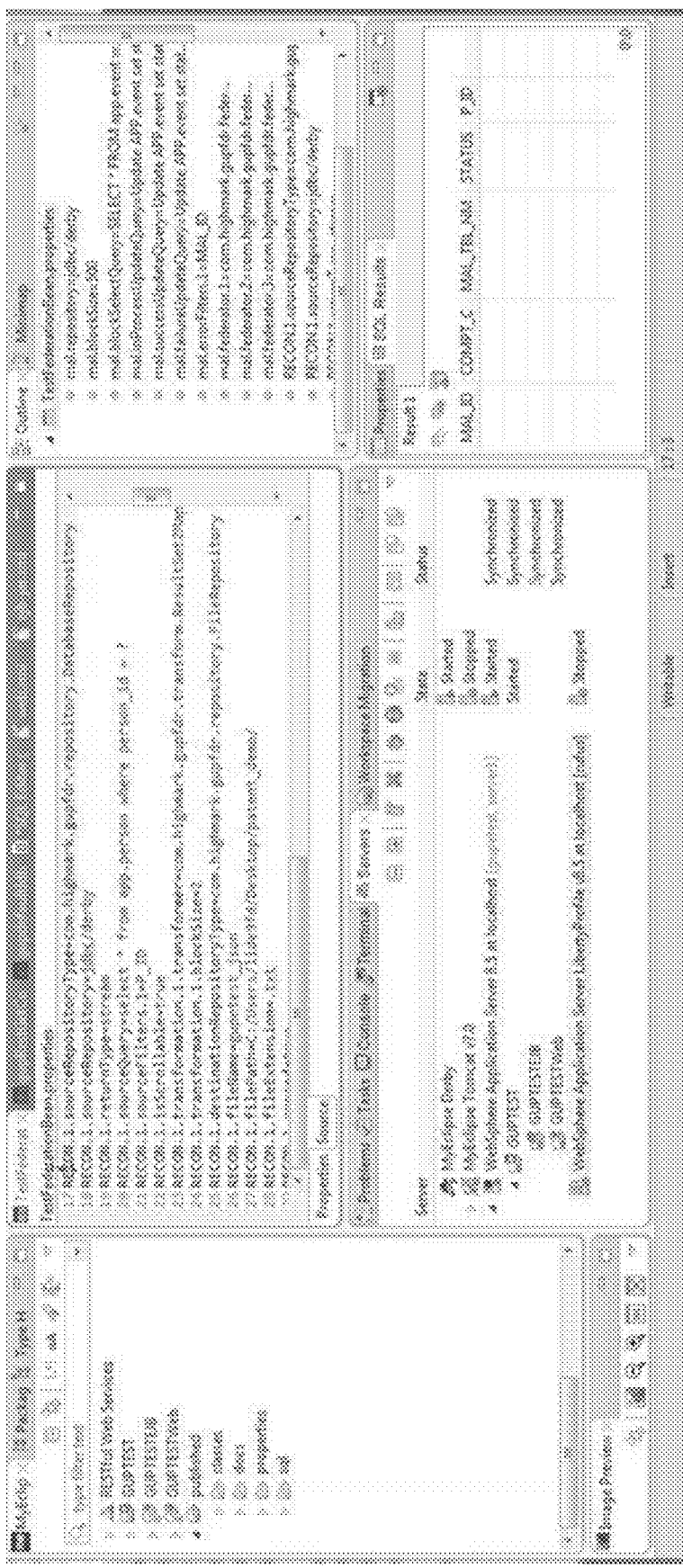
Figure 10:
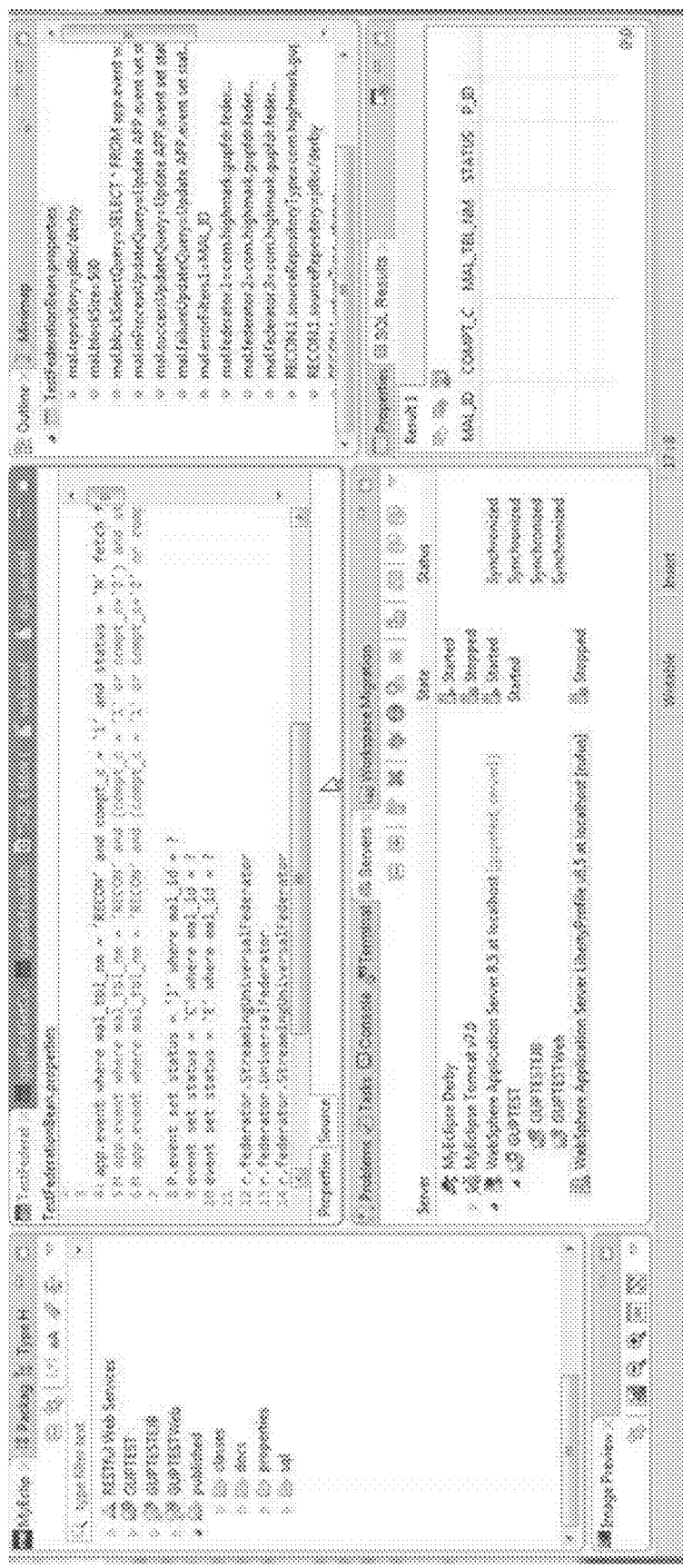

With reference to FIG. 7, this example demonstrates a Job Enterprise Edit application with two modules, an EJB module and web module containing web resources. It will be seen that no source code needs to be created or edited to accomplish the tasks or executed the computer-based processing demonstrated in this example. In the current state of the application shown in FIG. 7, the application has no events to be processed. Events can be harvested from a database, although an events table right is currently empty as shown. With reference to FIGS. 8 through 10, the processor can be configured to only process designated "Type 1" event having a predefined data type and event type. In this example, the Type 1 event is associated with recon data processing. The process mines data from the database and writes it out to a file for the event types. There can be a transformation that takes place to change the data format from the database format into either JSON or XML for the process in response to the event type.

Figure 11:
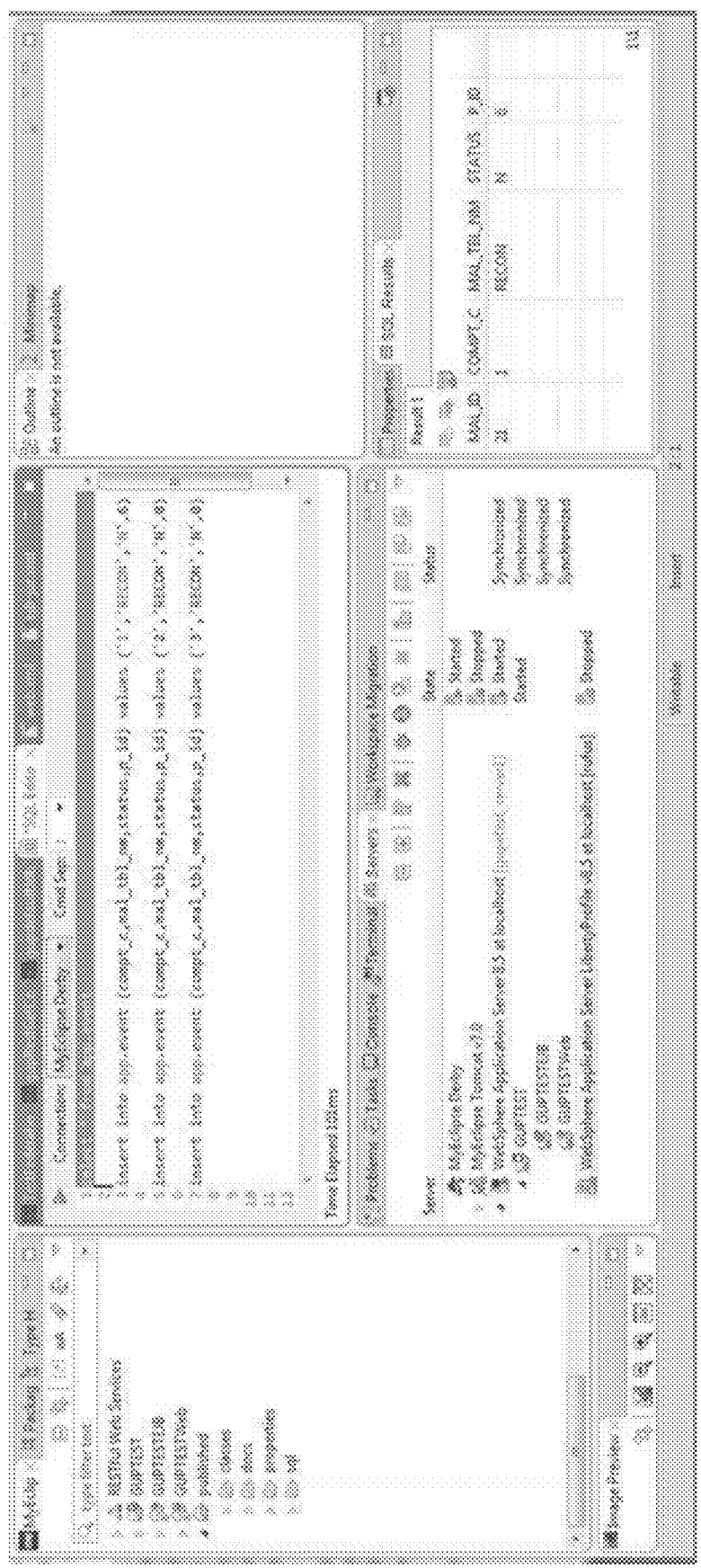
Figure 12:
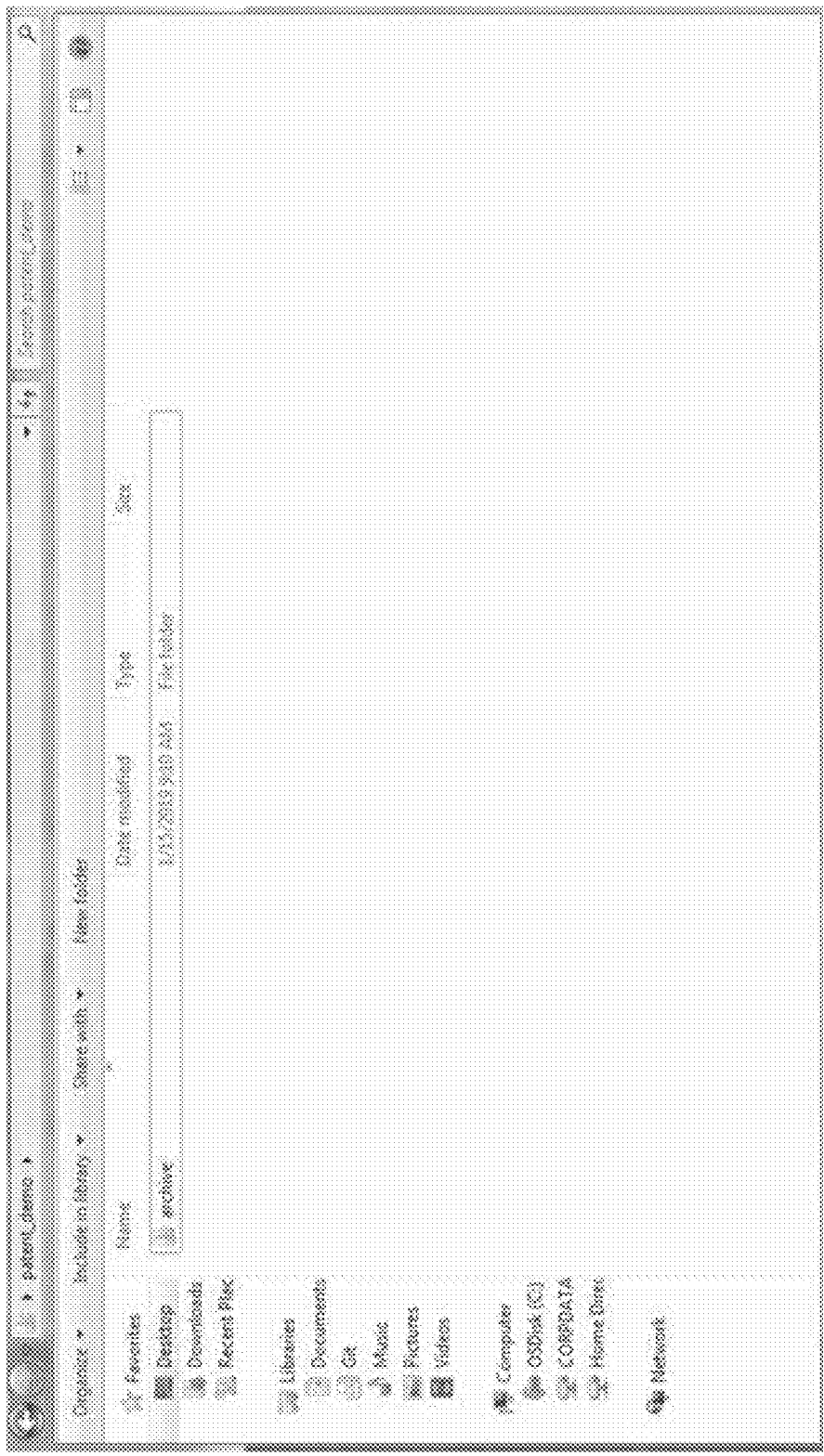
Figure 13:
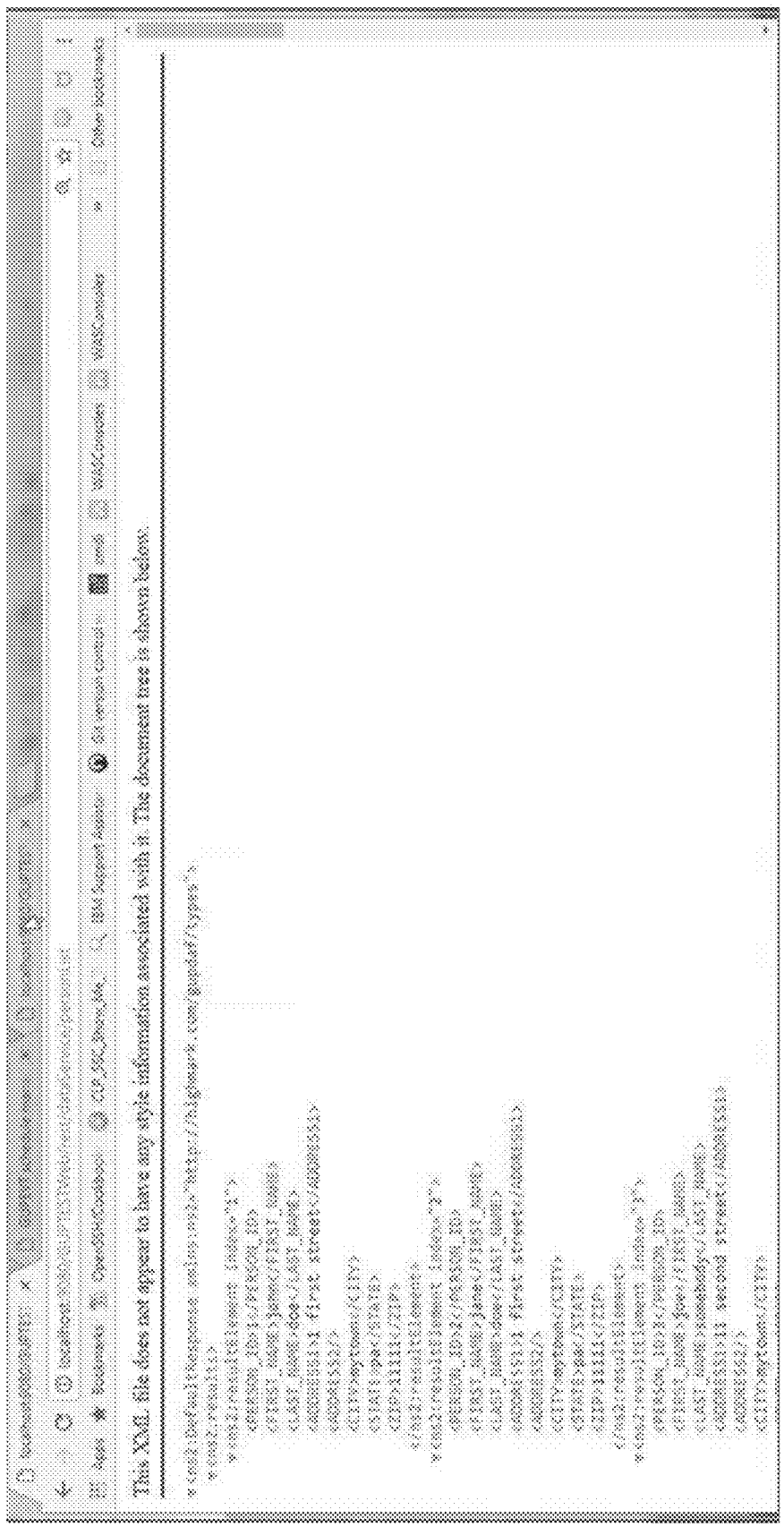
Figure 14:
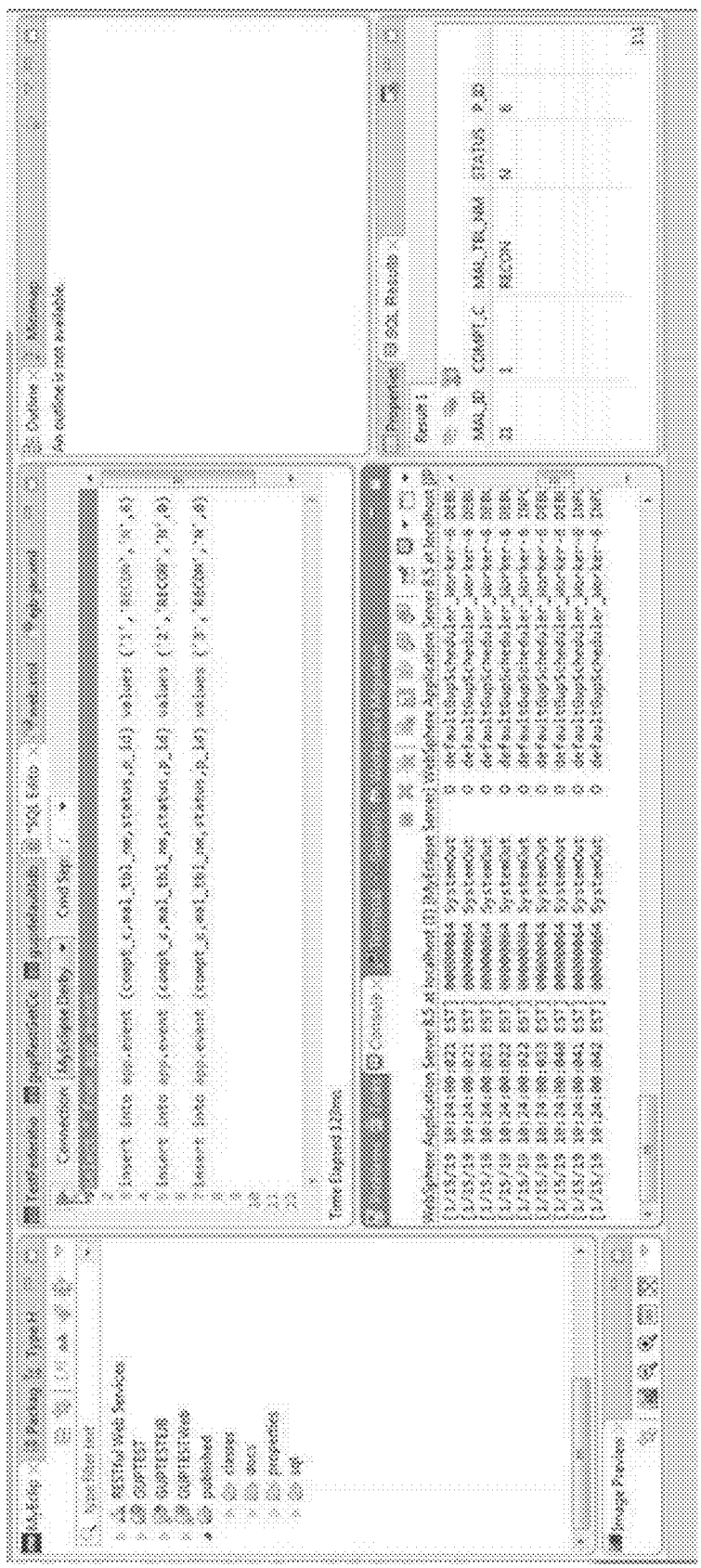
Figure 15:
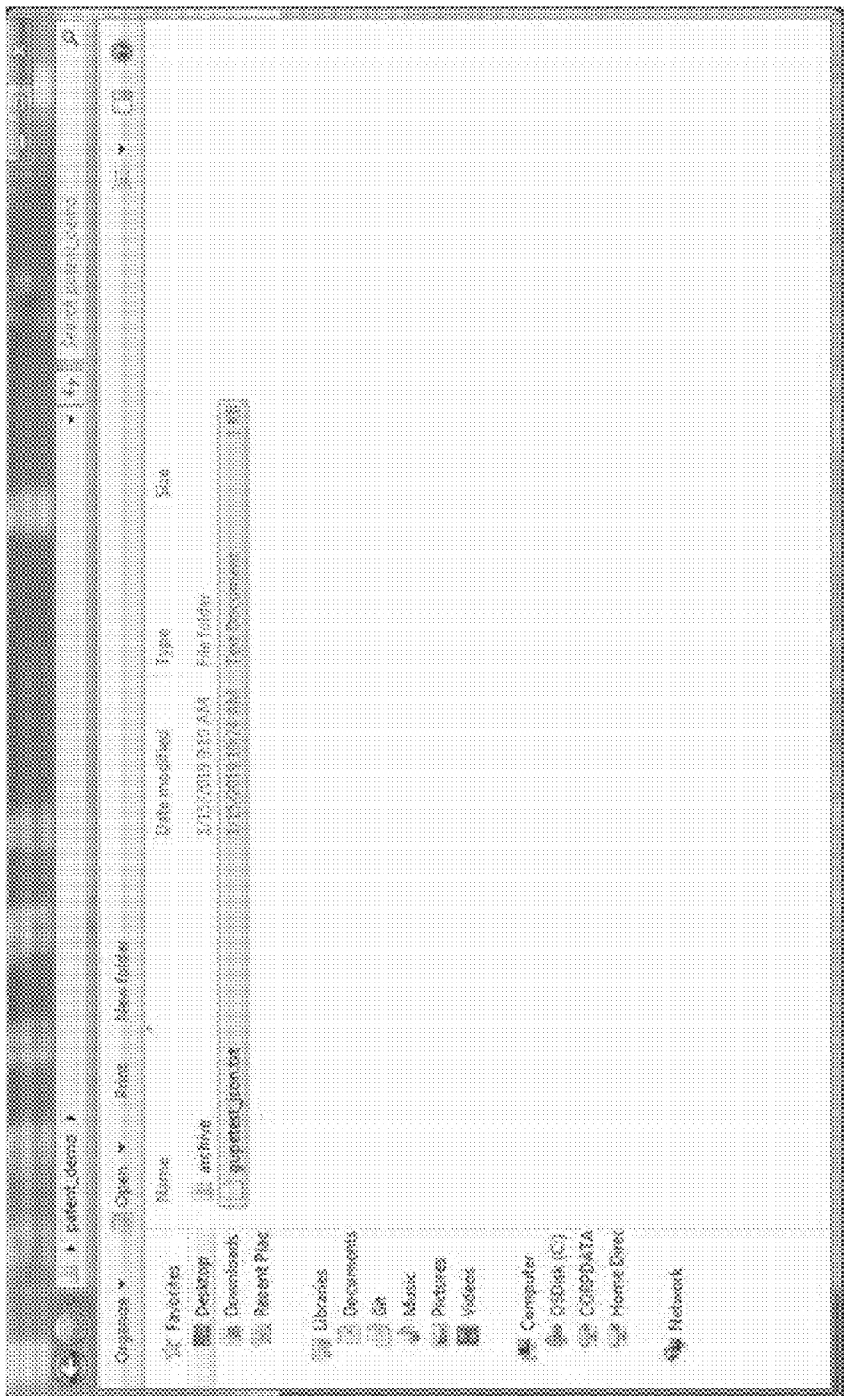

With reference to FIG. 11, a Type 1 event can be designated and for this particular event the processing will ultimately generate a data file which will appear in a designated folder (see FIG. 12). With reference to FIG. 13, configuration management parameters are shown which facilitate deployment and completion of the processing (see FIG. 14). After the scheduled processing is completed the data file is created and stored in the desired location (see FIG. 15). The particular process in this example involves a collection process where pending changes that happen throughout the day are stored in a file, and then the file is transferred at a designated time to be processed by another computer system.

Figure 16:
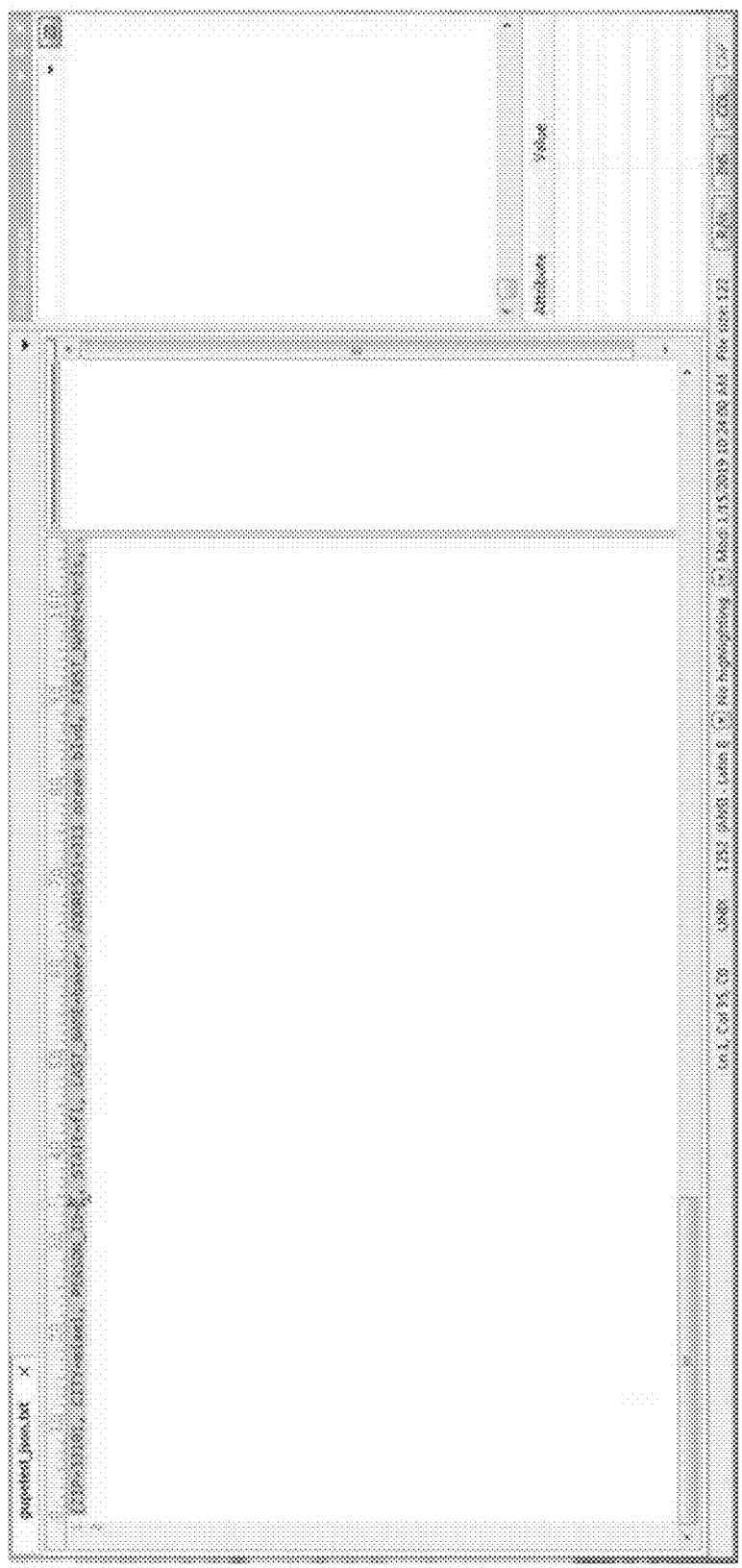
Figure 17:
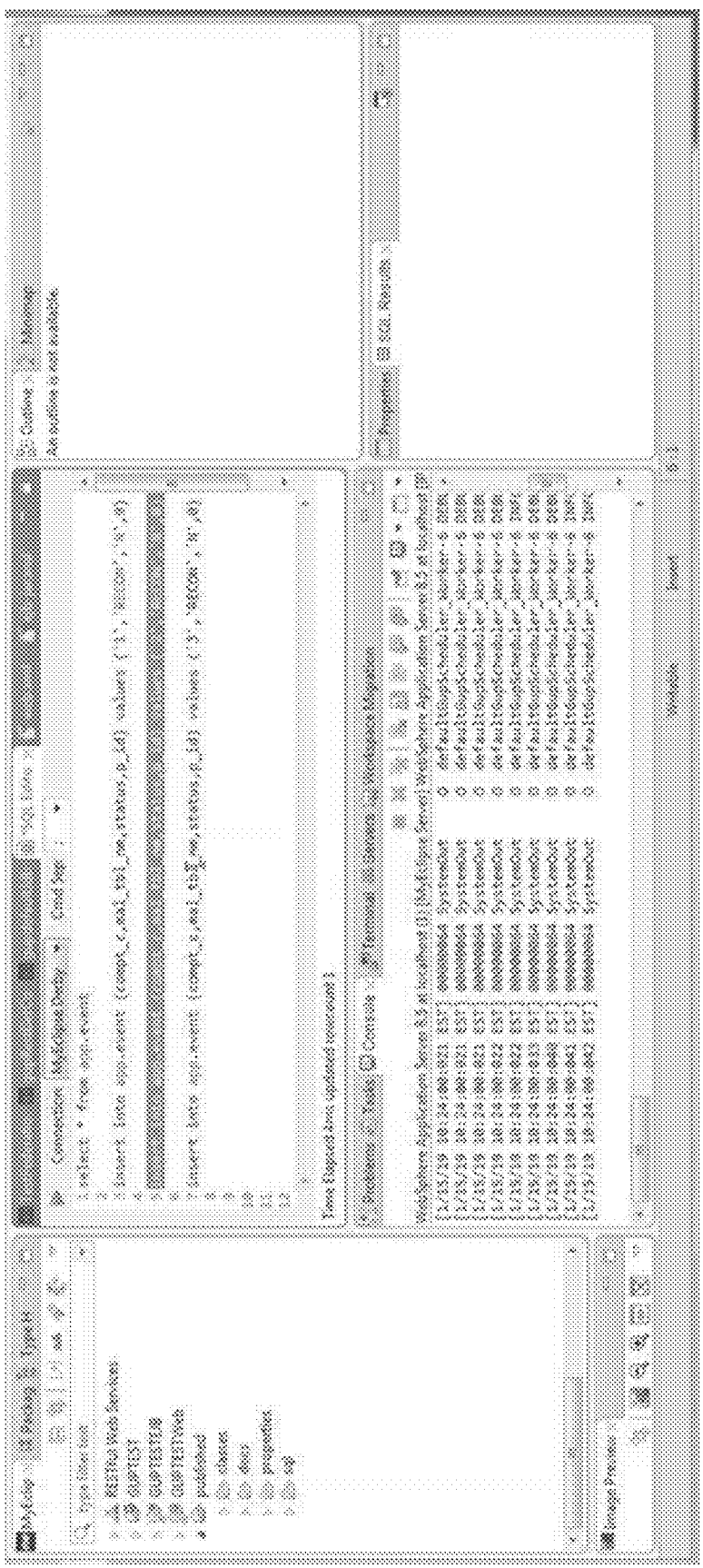
Figure 18:
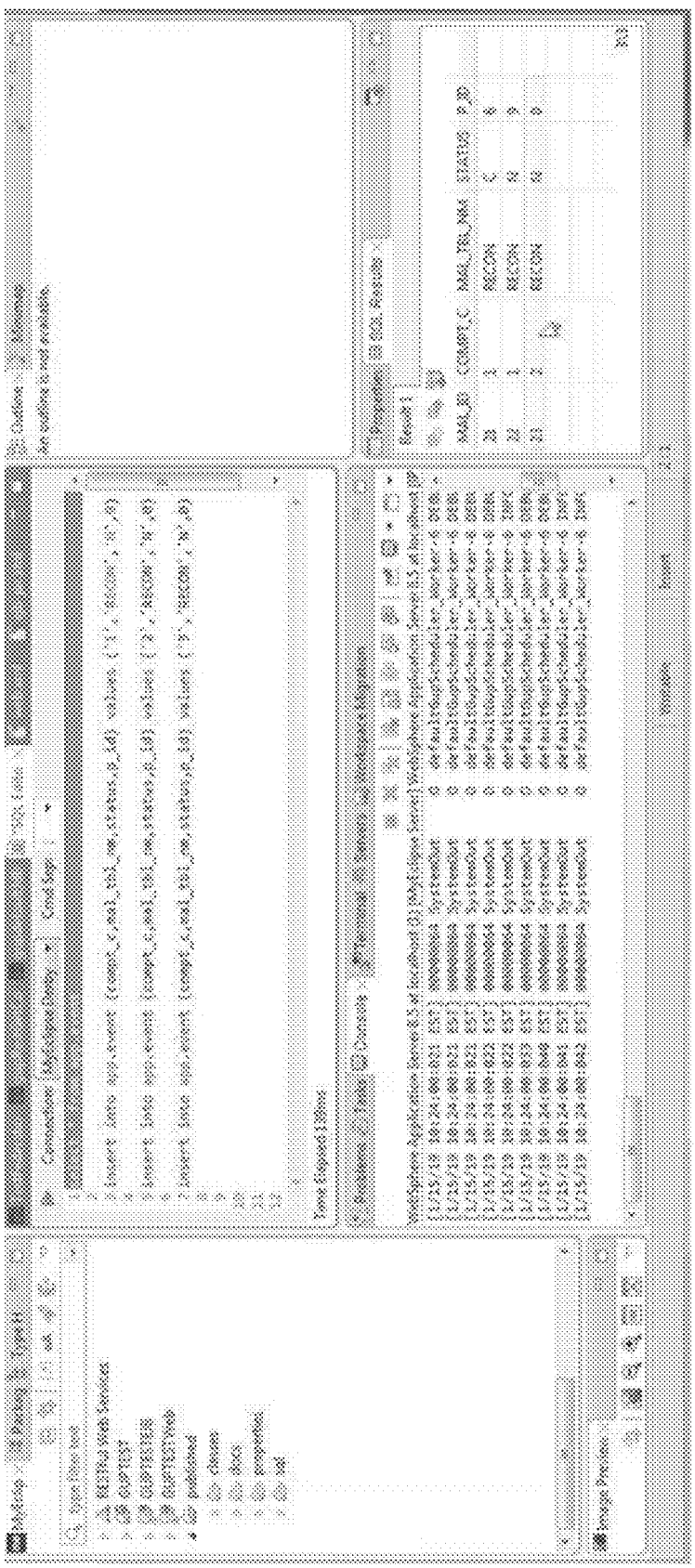
Figure 19:
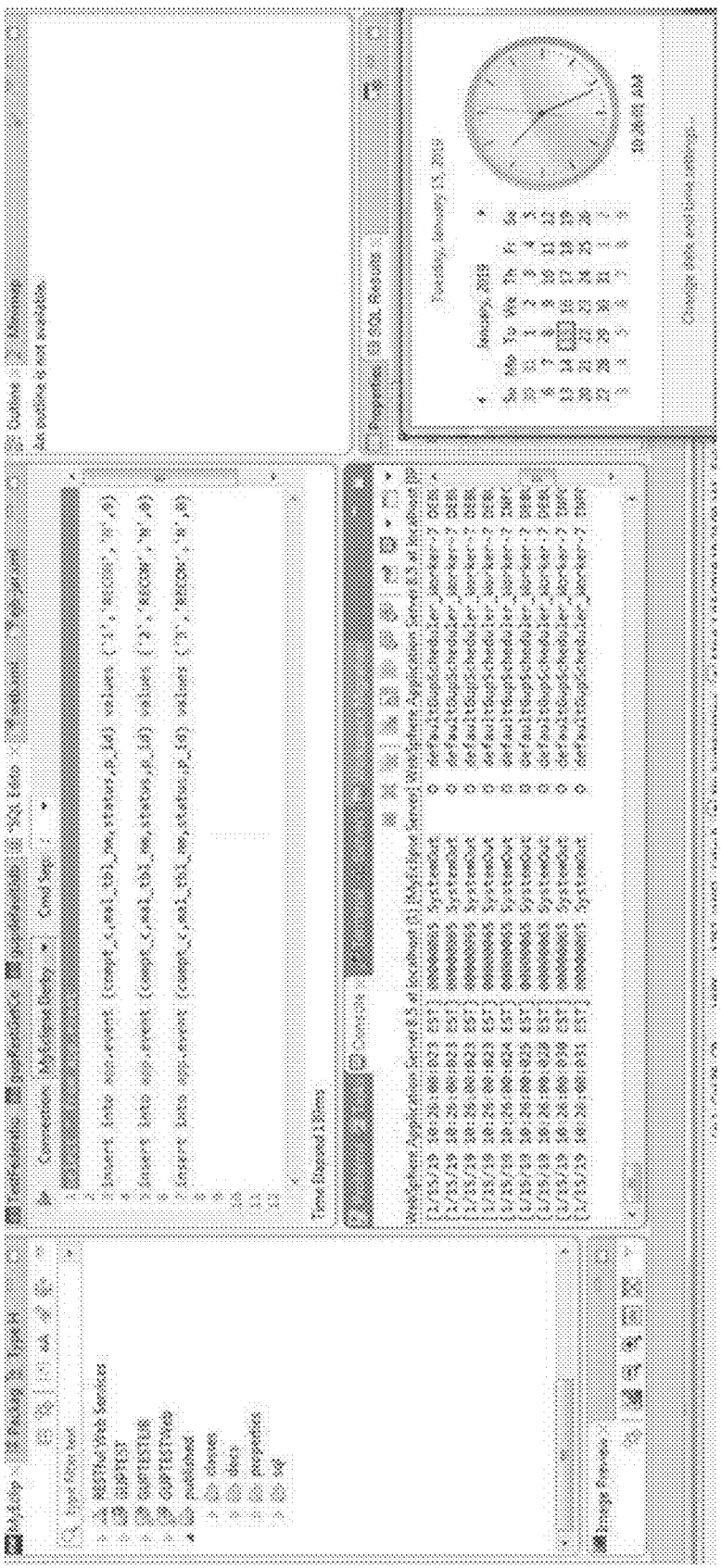
Figure 20:
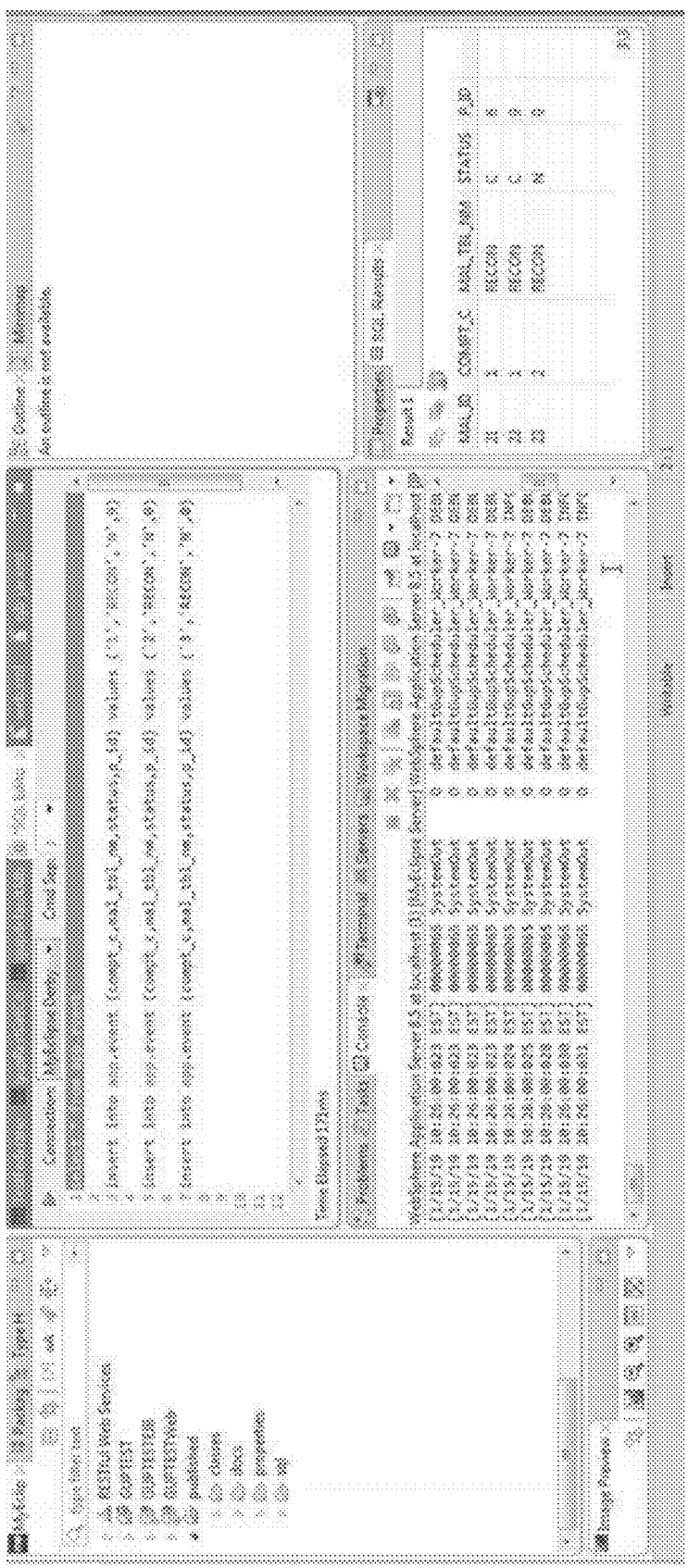
Figure 21:
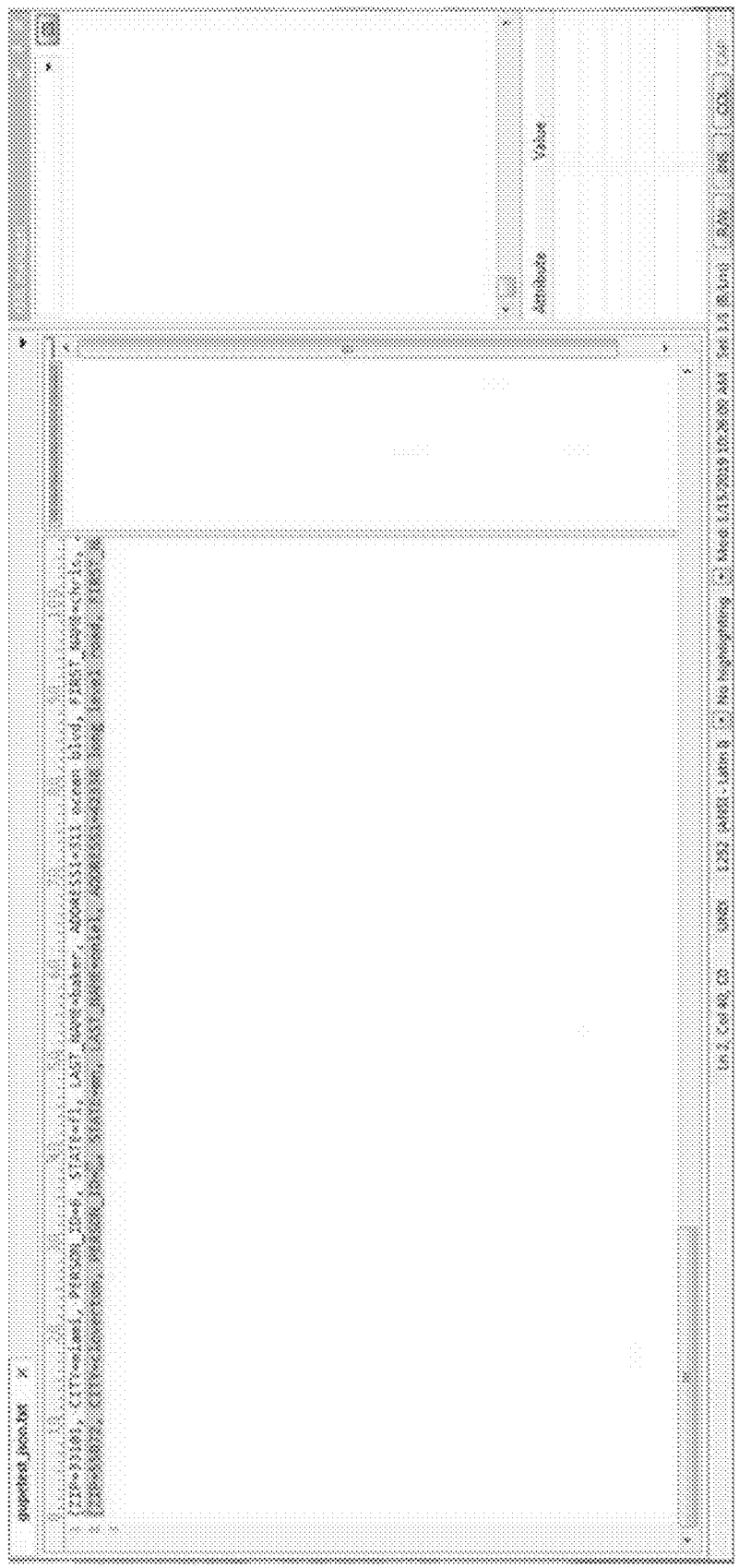

With respect to FIG. 16, it can be seen that a person with identification "6" matches the personal identification number contained in the Type 1 event and is included in the output. With respect to FIGS. 17 and 18, in another aspect of this example, a personal identification number of "9" can be designated in association with an event. The Type 2 event can be made active through the configurations parameters and can be designed to append to the existing processing results of the Type 1 event. In this example, the system initially processes the Type 1 event, but not the Type 2 because it has not yet been added to the configuration parameters. With respect to FIGS. 19 and 20, it can be seen that processing for the Type 1 event has been completed. FIG. 21 demonstrates that the file has been changed and now an additional person with identification "9" has been added from the database records.

Figure 22:
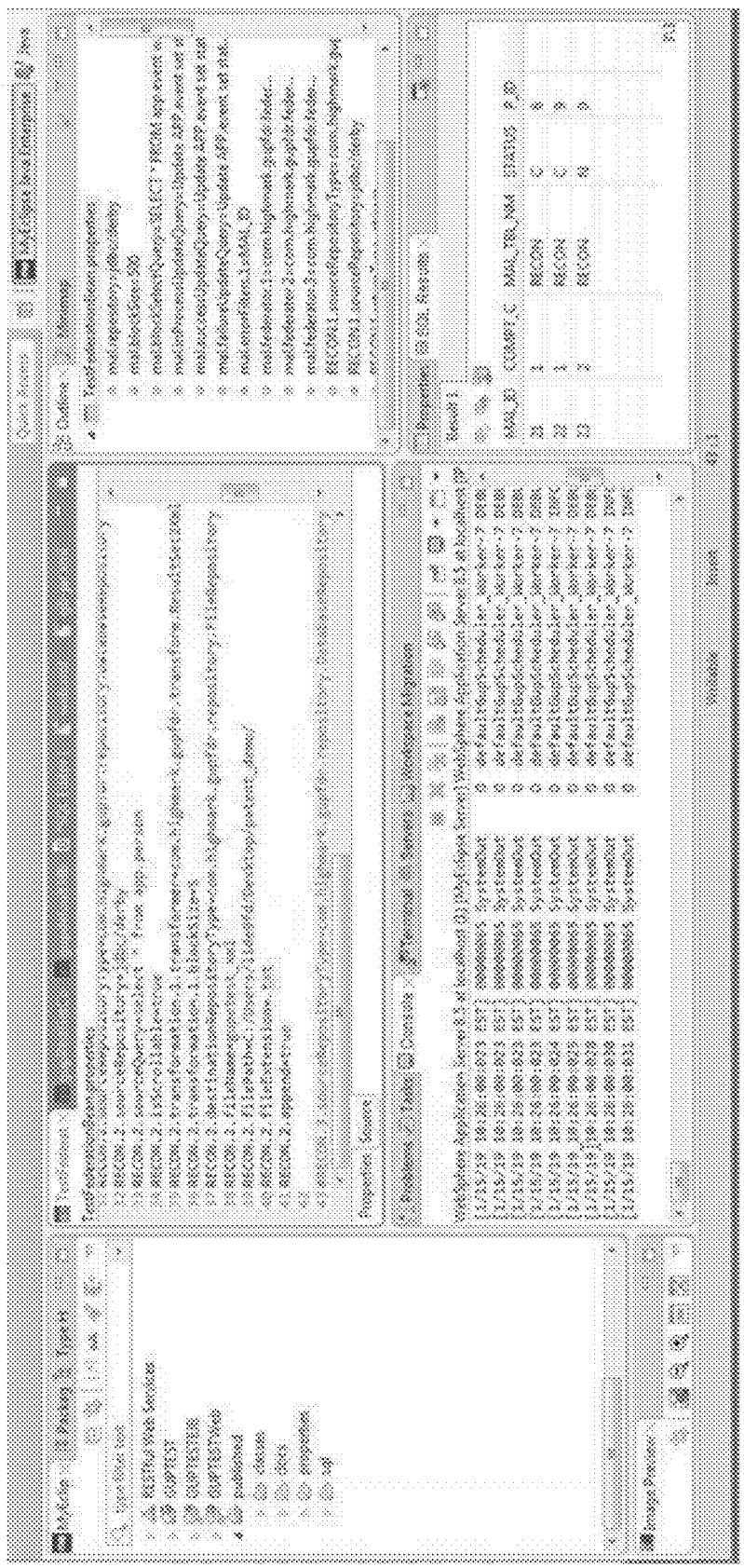
Figure 23:
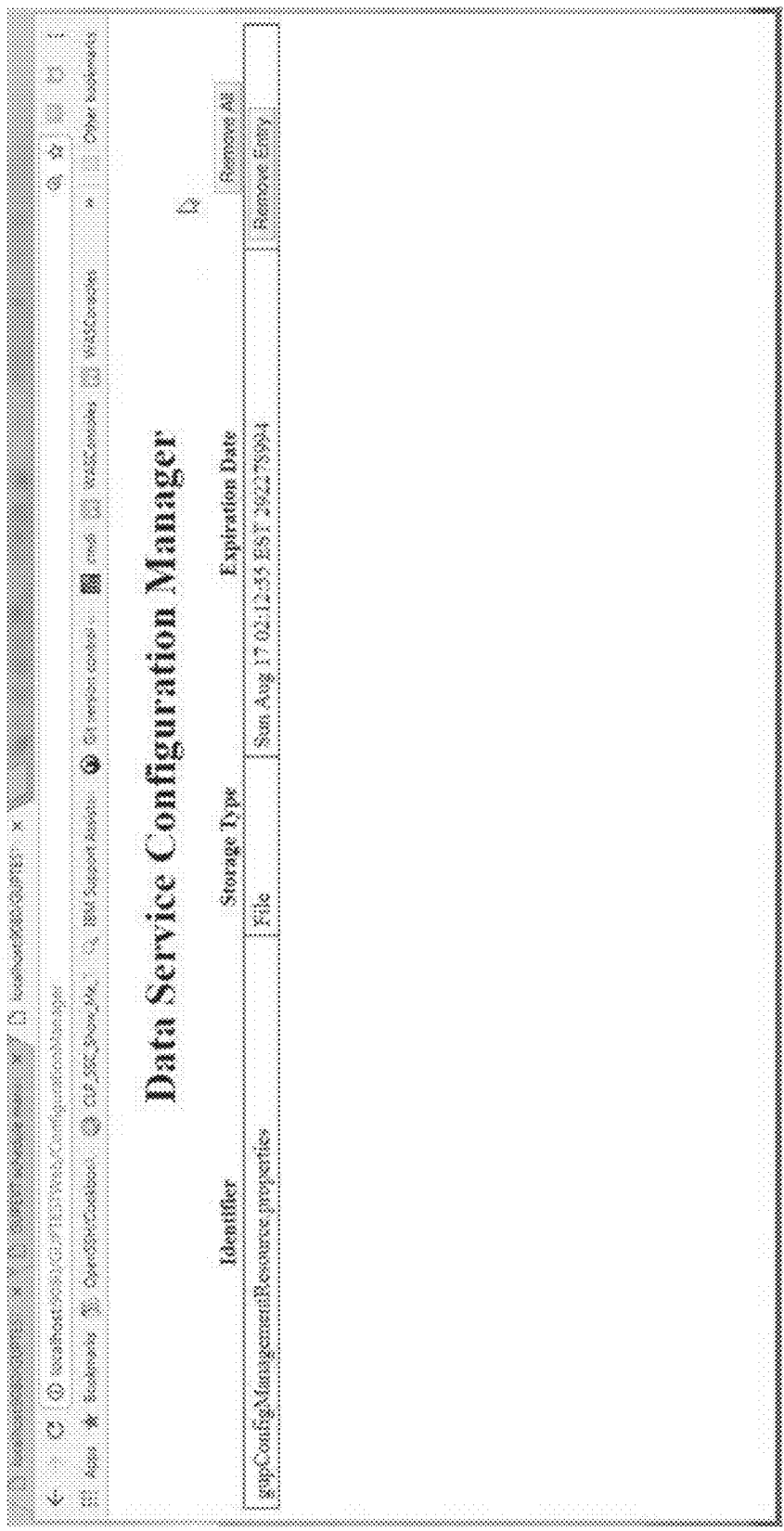
Figure 24:
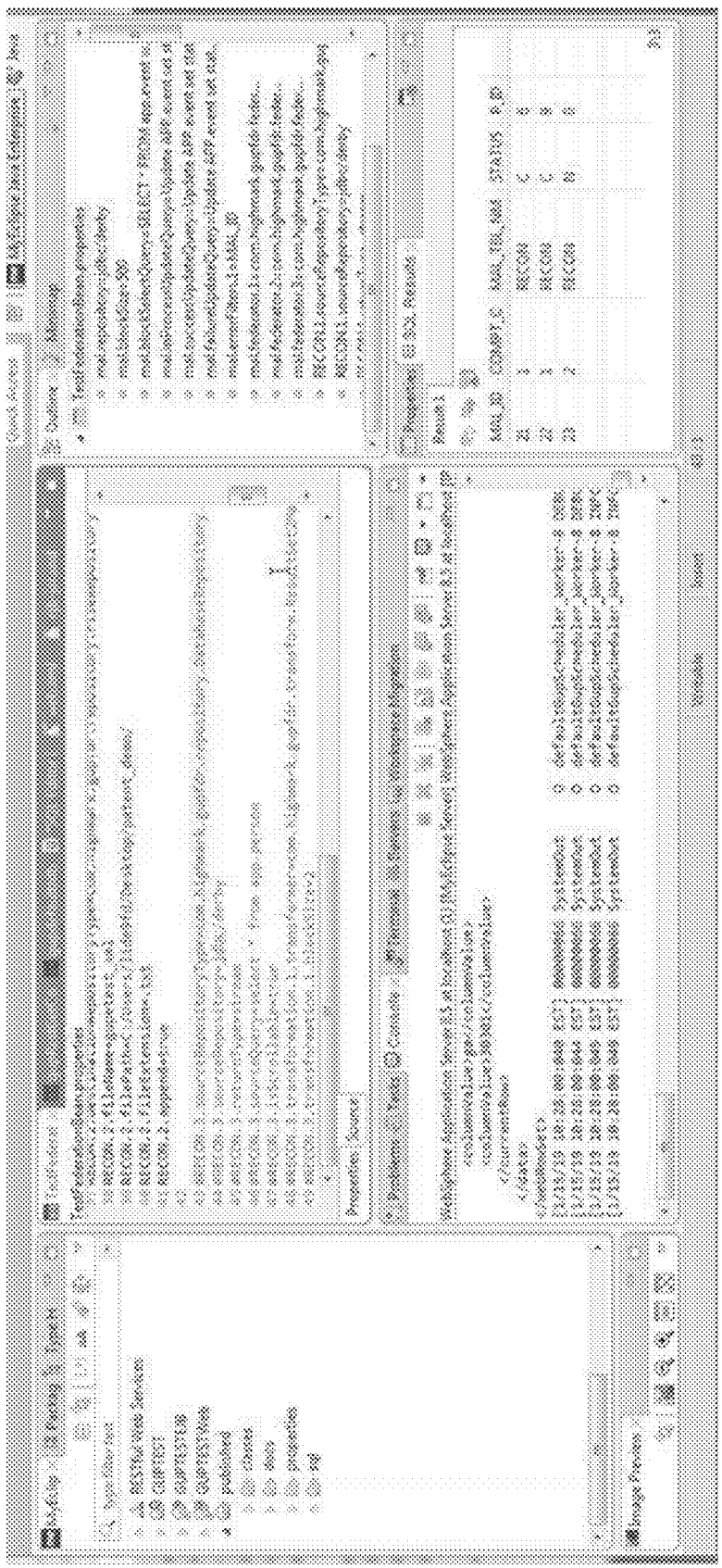
Figure 25:
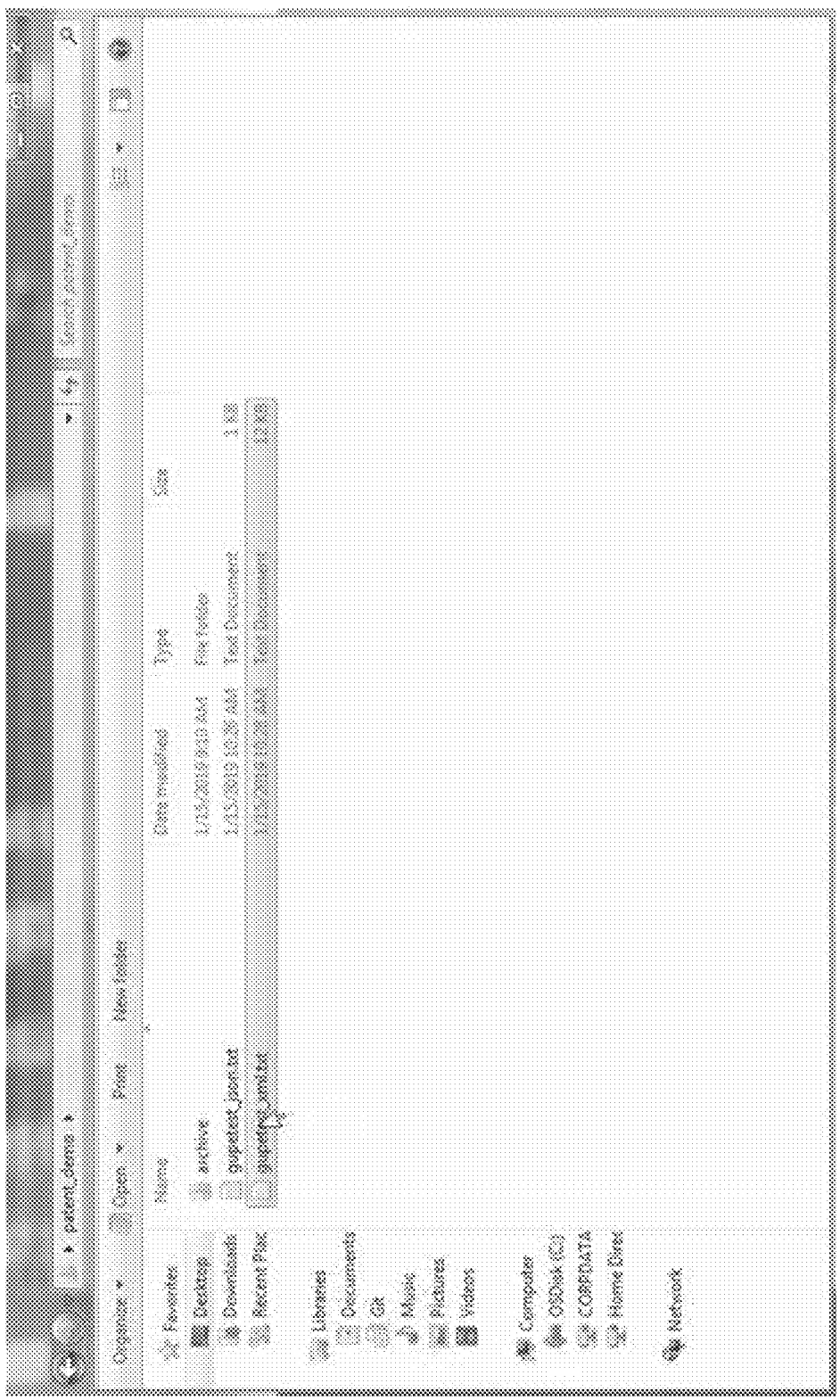
Figure 26:
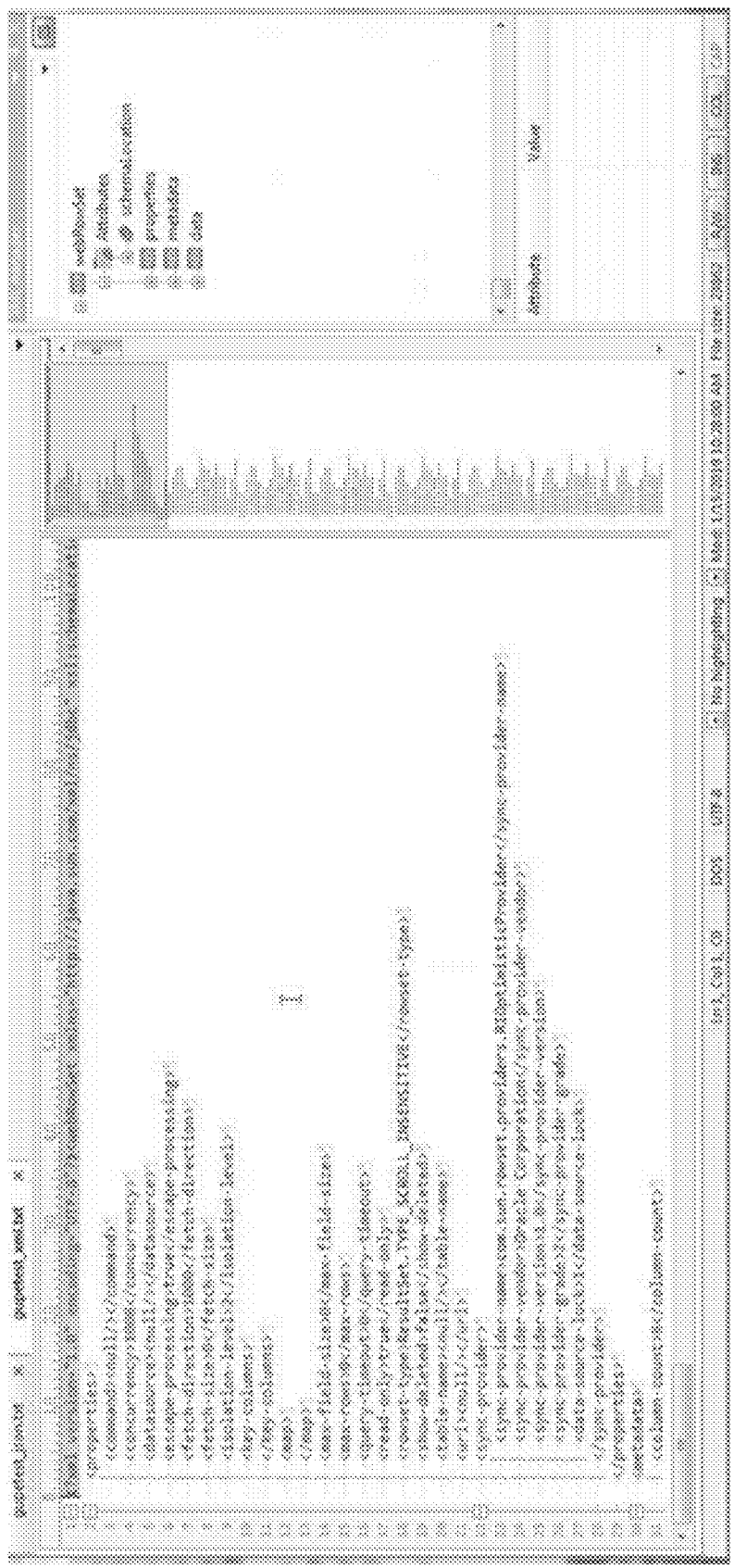

At this stage, configuration parameters for the Type 2 event can be made active to make sure that the processor executes the Type 2 event. This can be done by removing comment status for the configuration parameters for the Type 2 event as shown in FIG. 22. It can be appreciated that to achieve the zero deployment during run-time for the system, the configuration manager can be accessed to modify the TestFederation BDOT to remove an entry (see FIG. 23), and this will reload the configuration and start processing for the Type 2 event. The screen display of FIG. 24 confirms that the processing of the Type 2 event has been completed. It can be seen that this event produced XML output. The new file created by the Type 2 event processing is shown in the screen display of FIG. 25 including the XML output, which is shown in more detail in FIG. 26.

Figure 27:
Figure 28:
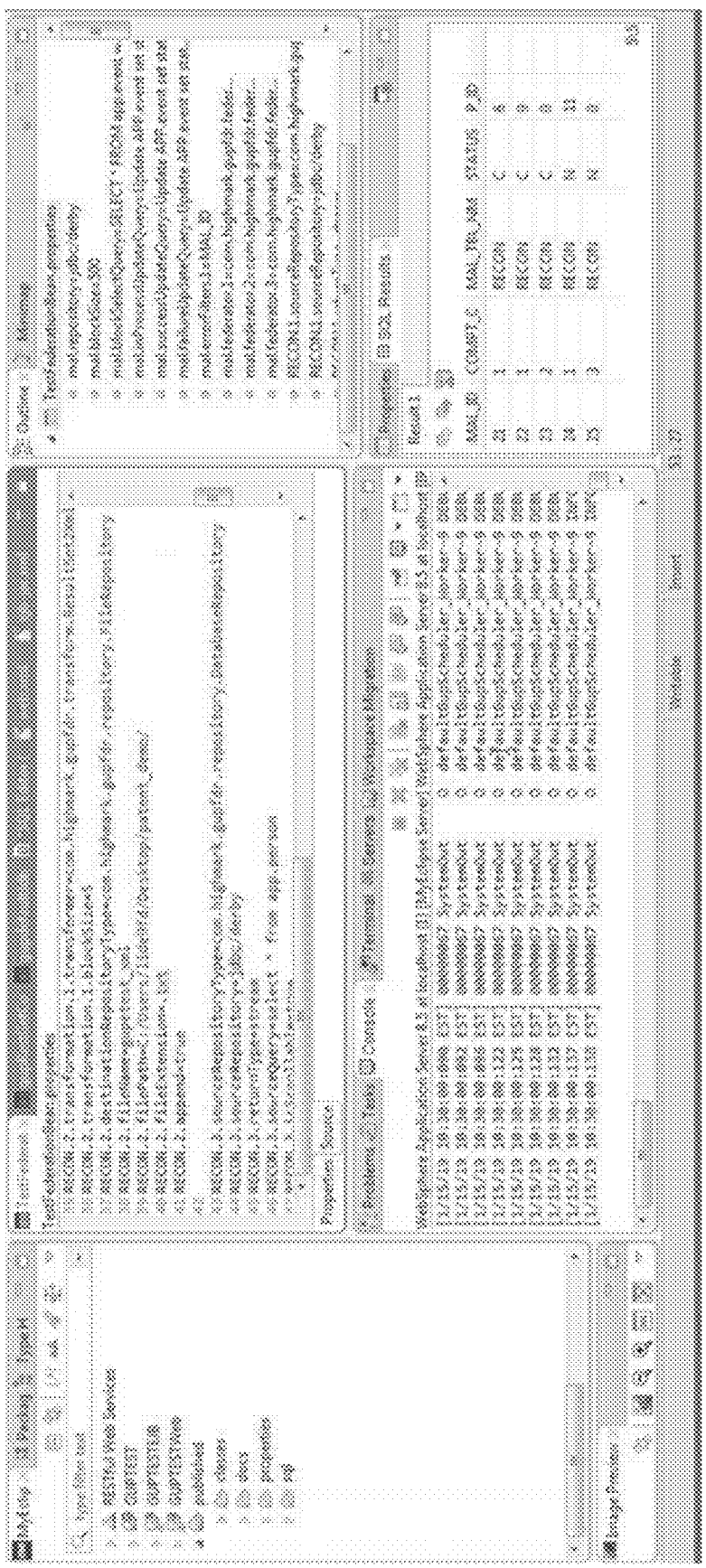
Figure 29:
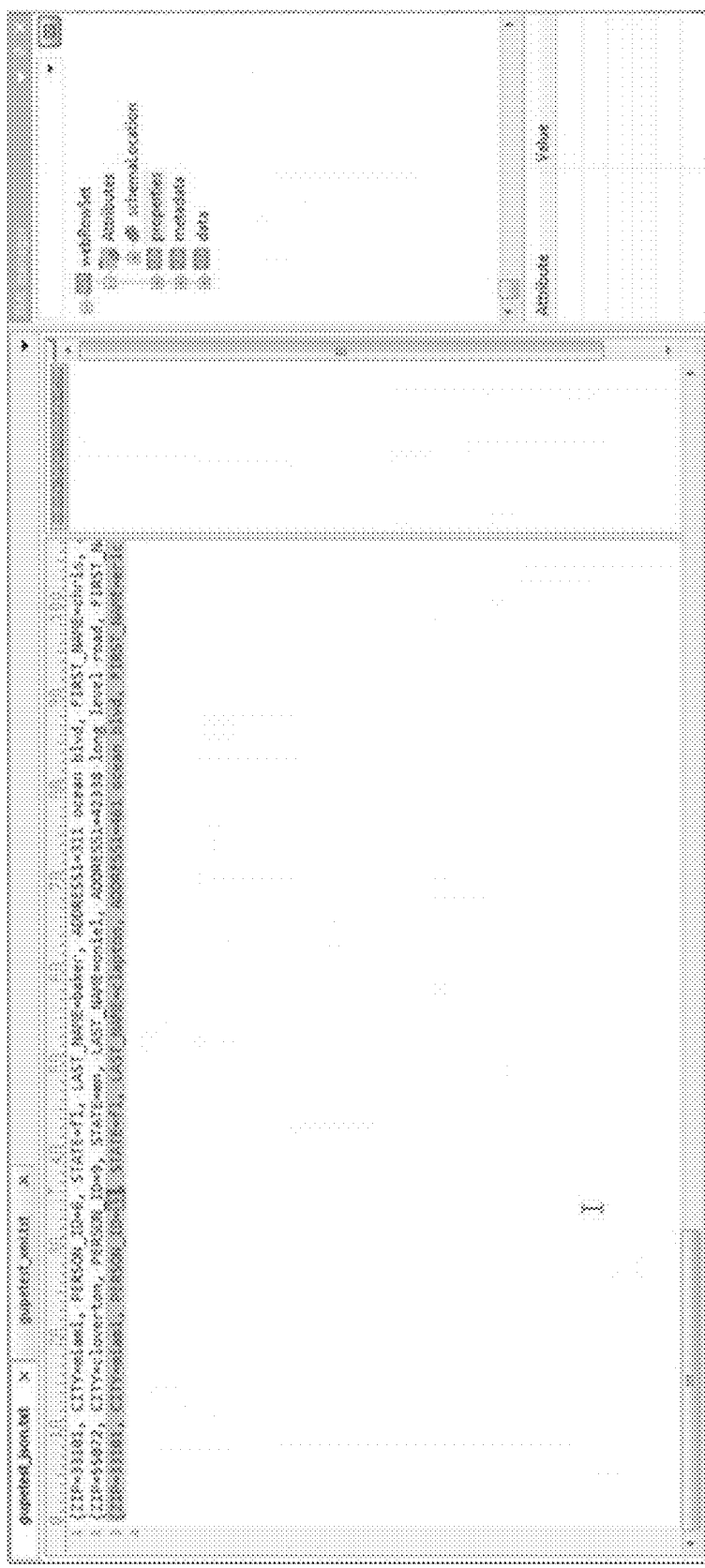
Figure 30:
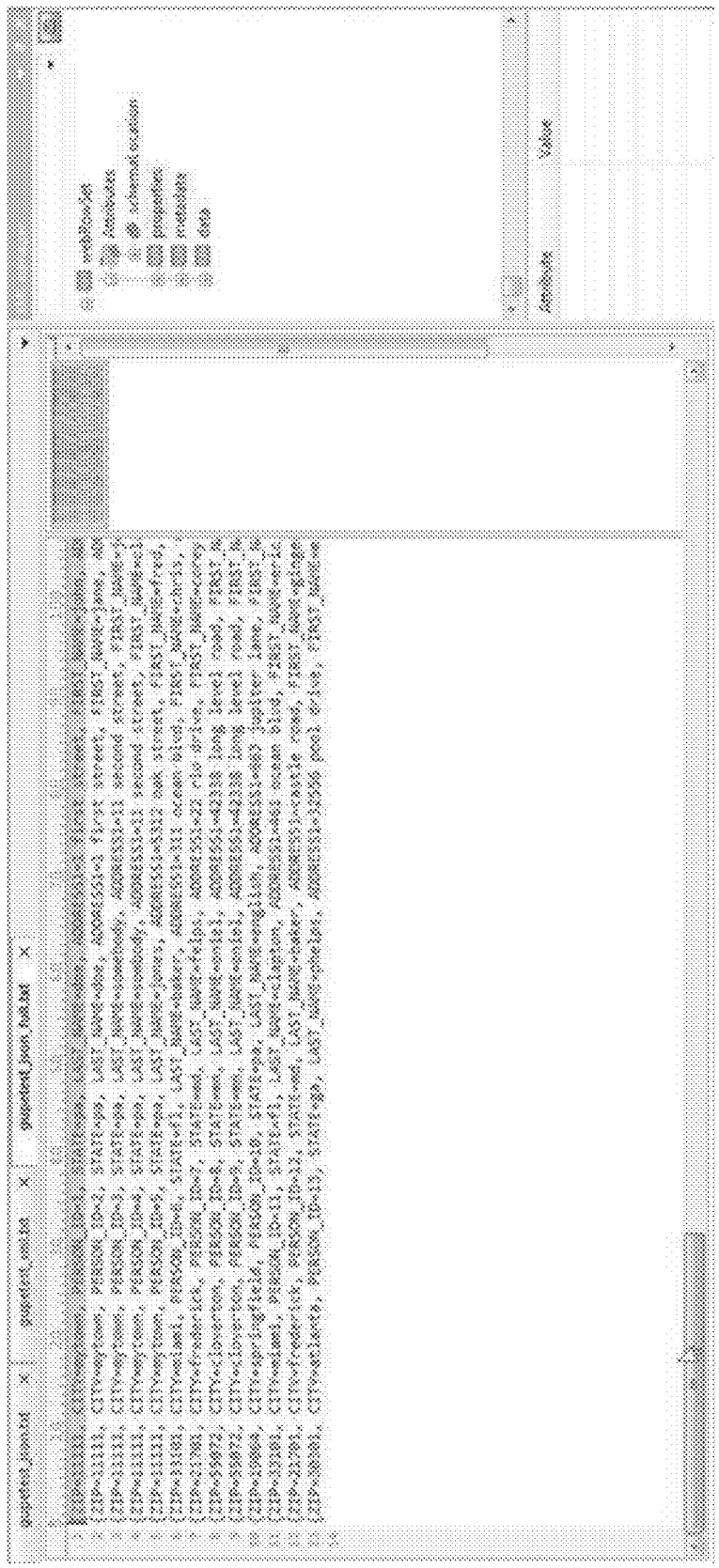

With reference to FIG. 27, another event can be added which yields a full JSON strip after processing. This third event can be readily added by modifying the configuration parameters and the TestFederation.properties. FIG. 28 confirms that this event has been processed. As shown in FIG. 29, it can be seen that a person with personal identification number "11" has been added to the output results. Accessing details of the file reveals the JSON full strip that has been generated by this event, including data represented in JSON format (see FIG. 30). Those skilled in the art will readily appreciated that the configuration parameter modifications and the data transformations represented in these examples of the invention offer a framework that supports full application of a business rules engine. A developer can access and direct tasks that transform data in a variety of ways which are relatively independent of system requirements for output format, data source, and data destination are arbitrary.

Figure 31:
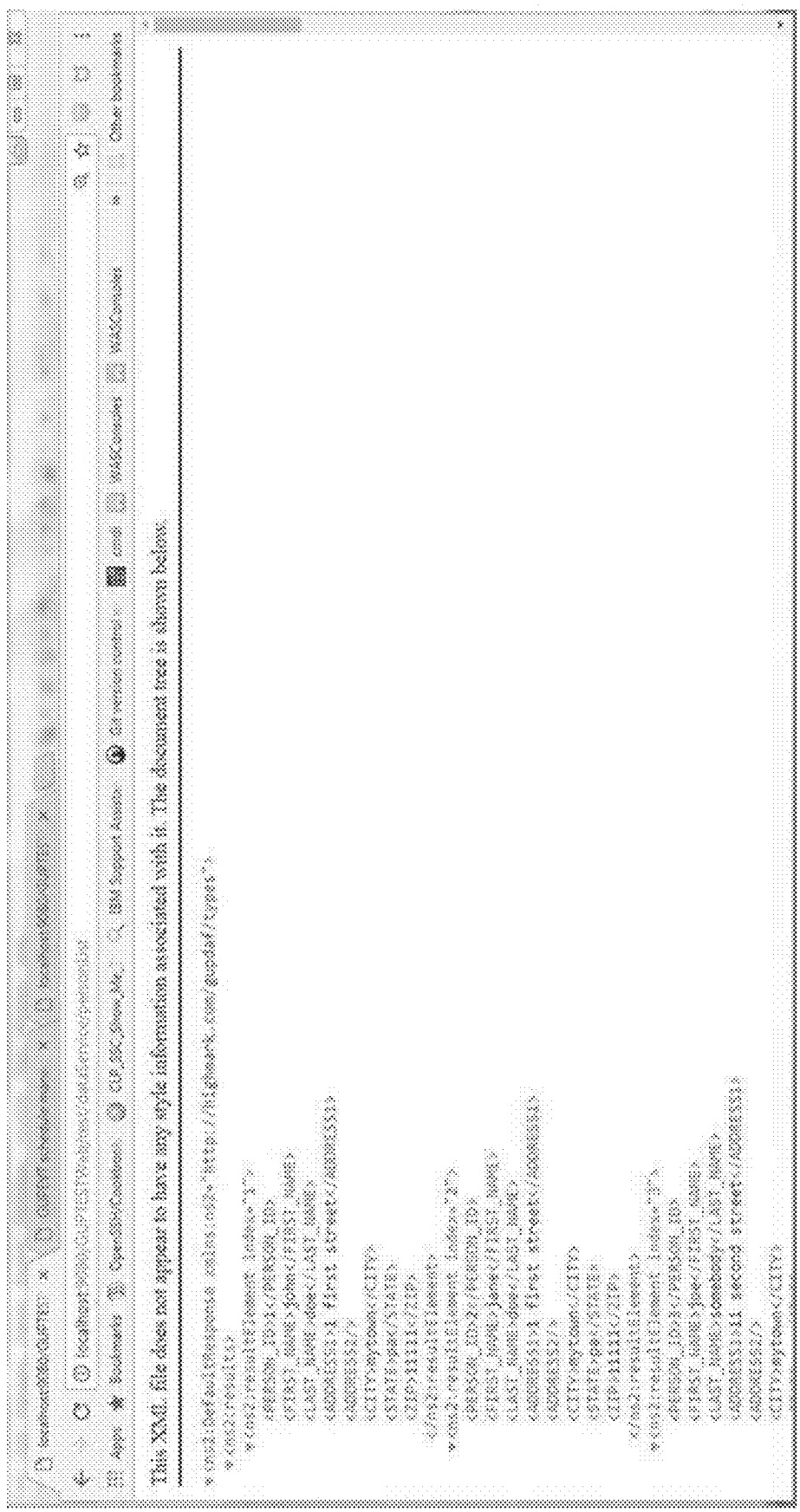
Figure 32:
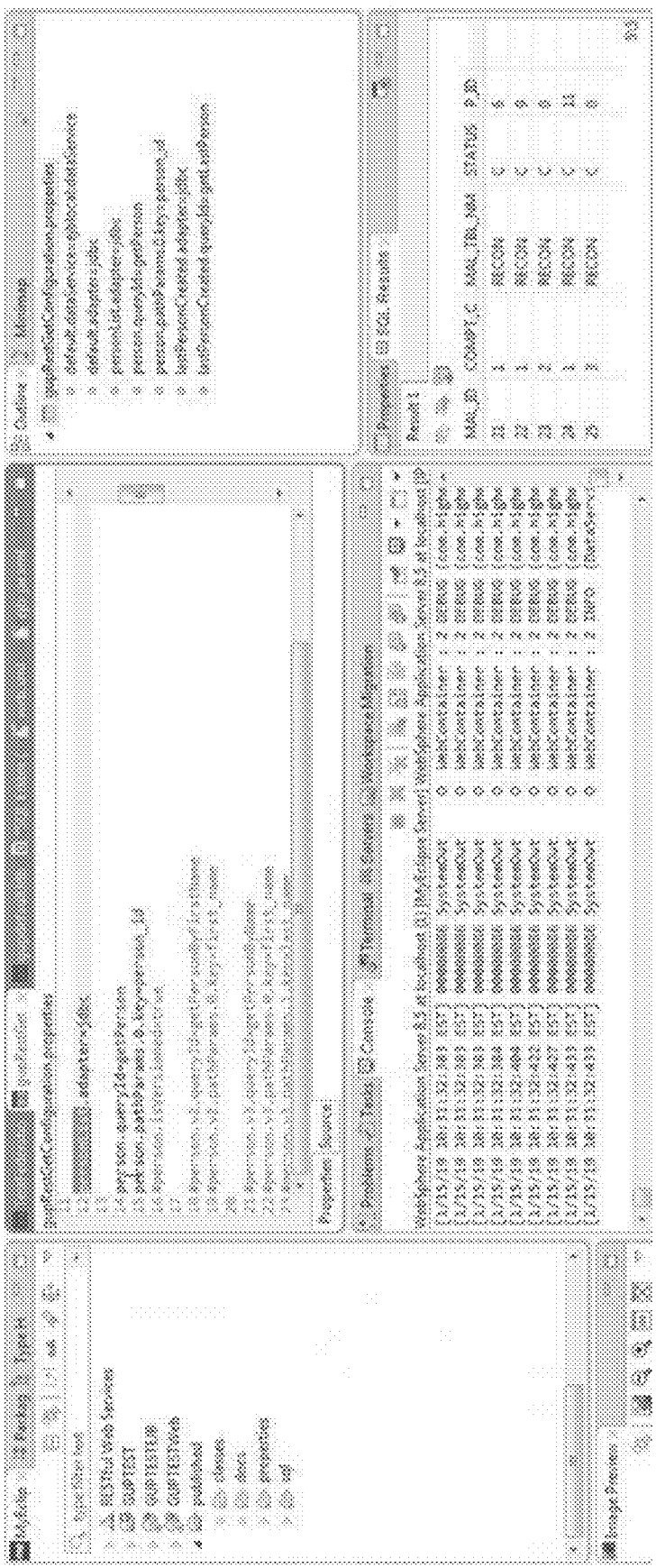
Figure 33:
Figure 34:
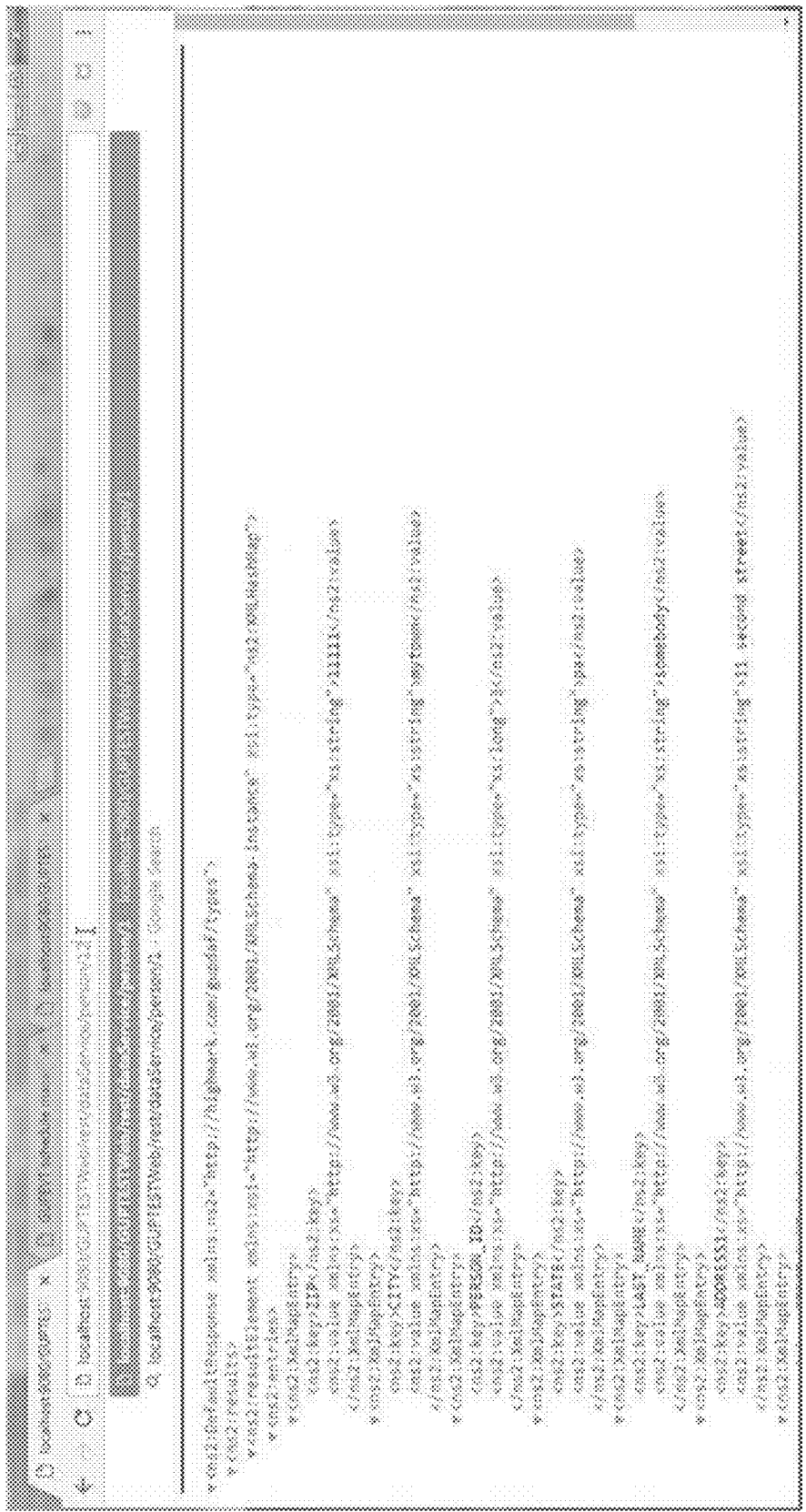
Figure 35:
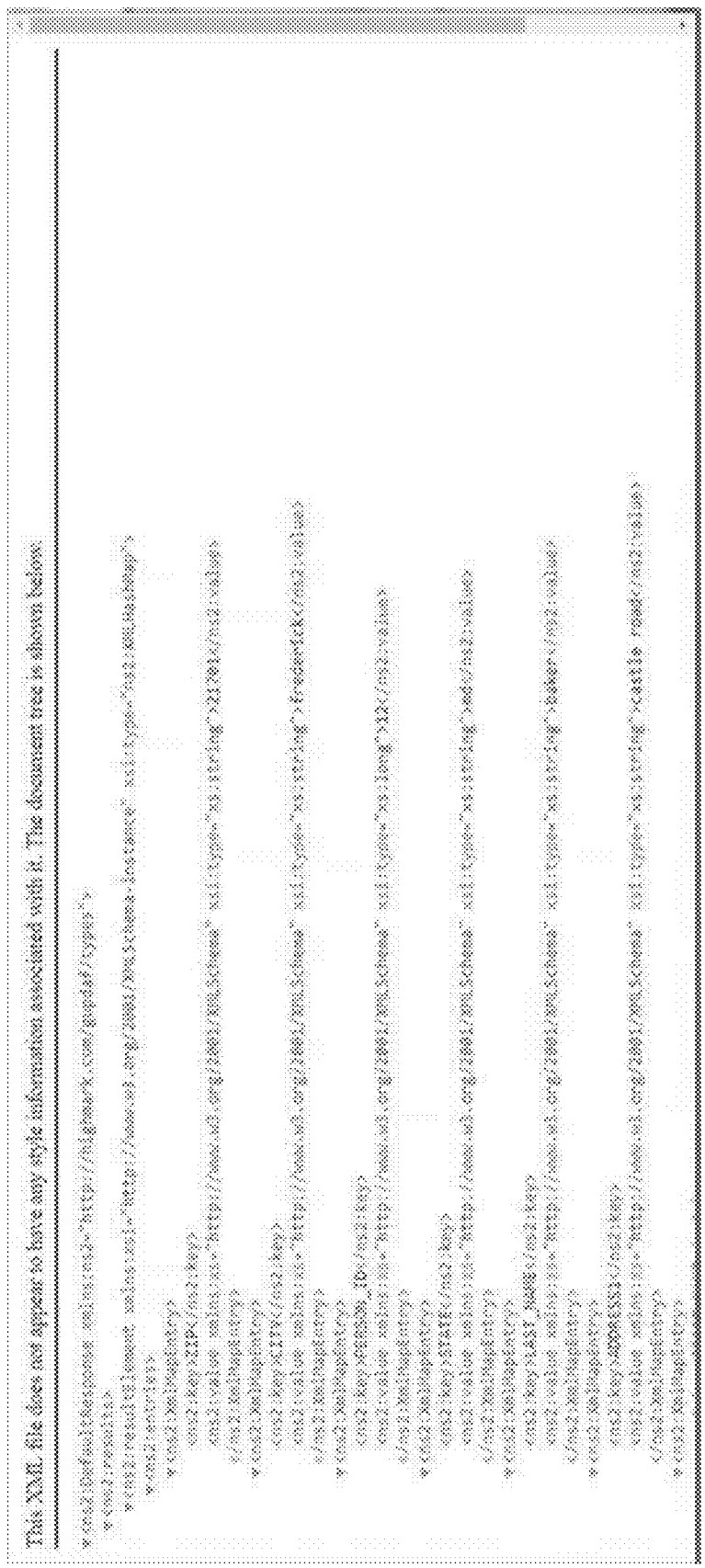
Figure 36:
Figure 37:

In other aspects, capabilities are provided using a built-in REST framework that can be leveraged to display data and possibly feed data to applications such as mobile phone applications and other applications which are REST-based. With reference to FIGS. 31 and 32, examples of two other services are shown. One service is called "personList" that is programmed to generate a list of all people in the database, and the other service is programmed to accept a person identification and output the details associated with that person identification. Details for person identification number "3" are shown in the example of FIG. 33. Details of retrieving information for person identification number "12" are shown in FIGS. 34 and 35.

Figure 39:
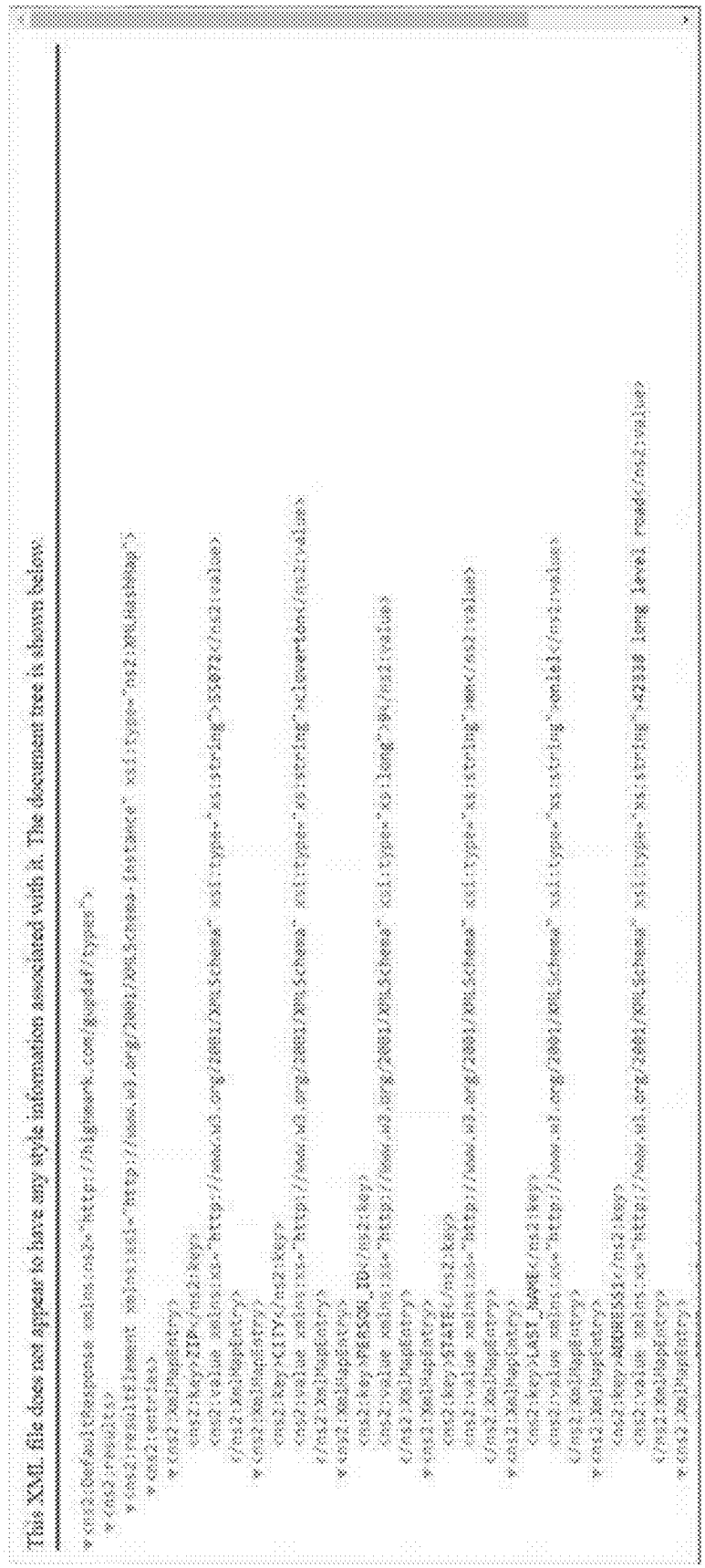
Figure 40:
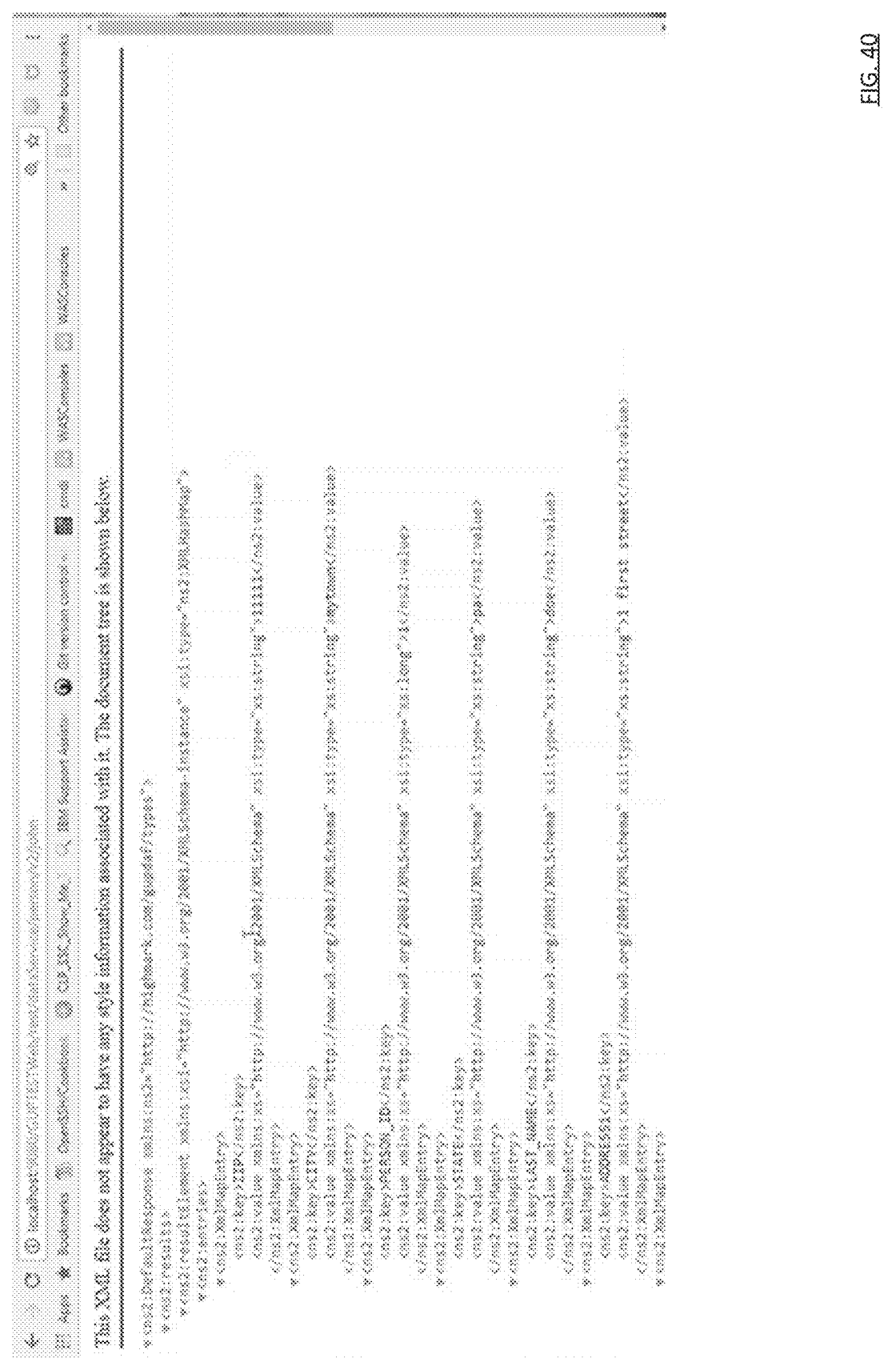
Figure 41:
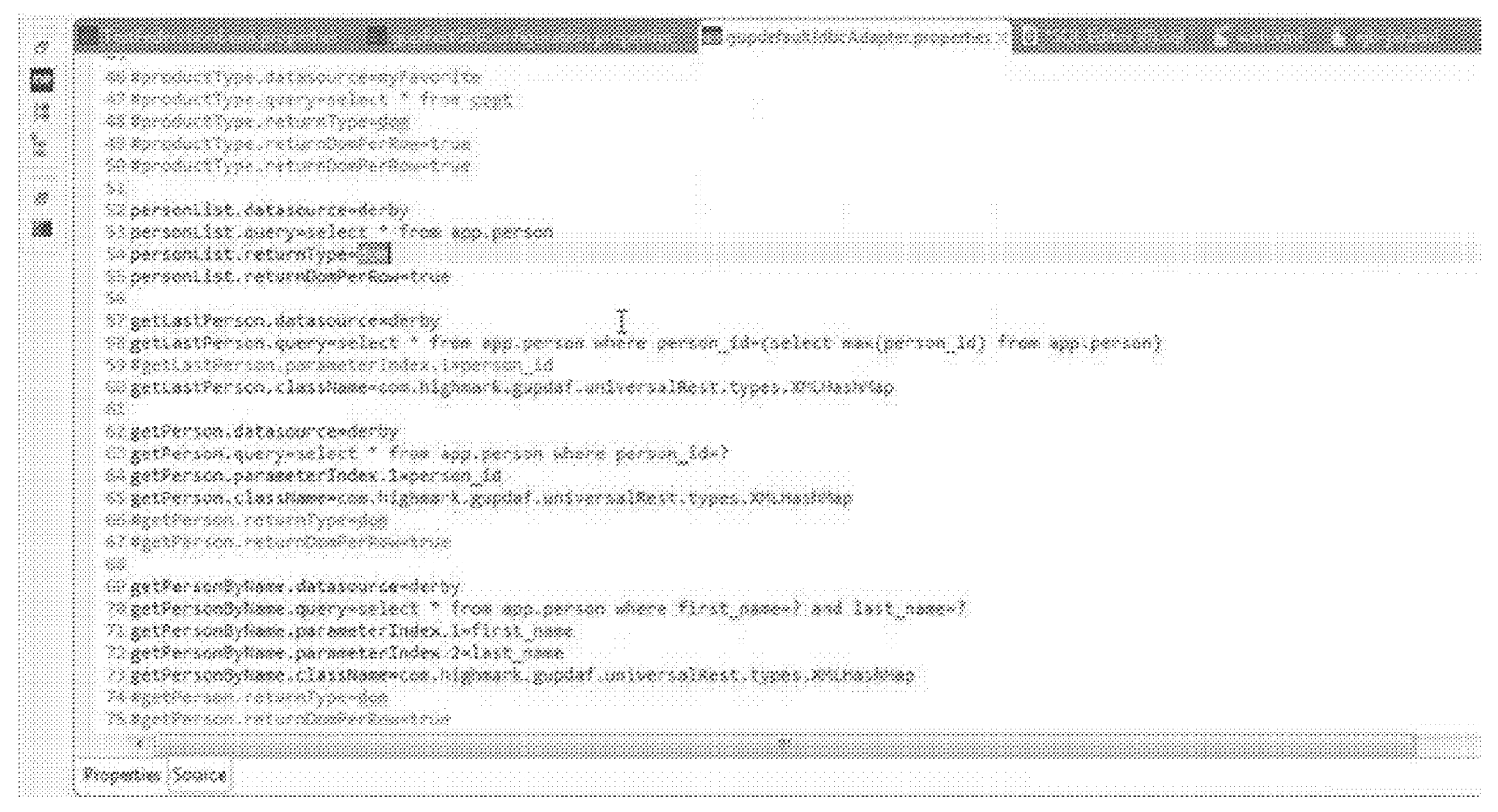
Figure 42:

In other aspects, expansions of services may need a new version because a user may want to be able to search by first name, for example. So the person service can be versioned (see FIG. 36), and then a version two can be added that is programmed to retrieve people data by first name (see FIG. 37). This may involve accessing the configuration manager to adjust RestGetConfiguration properties (see FIG. 38). FIG. 39 demonstrates retrieving data associated with a person having personal identification number "9" using this people service version. In another example, the versioned service that searches by first name can be executed to find and output everyone whose first name is John (see FIG. 40). The user can mine data from various sources, and it does not have to be a database that provides the source of information. FIG. 41 illustrates formatting of the data, such as by using the personList service to format the data into XML. FIG. 42 illustrates the results of changing one configuration parameter for the data map, and then removing comments for the code which controls DOM formatting. It can be seen that the same service can be executed, but with the output data provided in different formats. The data are readily generated by using the tools of the present invention to change configuration parameters efficiently and conveniently, and with no need to create new code for generating the respective data formats.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, device configurations, or process flows described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that a sufficient understanding of the present invention can be gained by the present disclosure, and therefore, a more detailed description of such elements is not provided herein.

Any element expressed herein as a means for performing a specified function is intended to encompass any way of performing that function including, for example, a combination of elements that performs that function. Furthermore, the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, various models or platforms can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as a computer system (non-volatile)memory. Furthermore, some of the processes may be programmed when the computer system is manufactured or via a computer-readable memory storage medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. Memory and/or storage components may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

A "computer," "computer system," "computing apparatus," "component," or "computer processor" maybe, for example and without limitation, a processor, microcomputer, minicomputer, server, mainframe, laptop, personal data assistant (PDA), wireless e-mail device, smart phone, mobile phone, electronic tablet, cellular phone, pager, fax machine, scanner, or any other programmable device or computer apparatus configured to transmit, process, and/or receive data. Computer systems and computer-based devices disclosed herein may include memory and/or storage components for storing certain software applications used in obtaining, processing, and communicating information. It can be appreciated that such memory may be internal or external with respect to operation of the disclosed embodiments. In various embodiments, a "host," "engine," "loader," "filter," "platform," or "component" may include various computers or computer systems, or may include a reasonable combination of software, firmware, and/or hardware. In certain embodiments, a "module" may include software, firmware, hardware, or any reasonable combination thereof.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software maybe stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

Although some embodiments may be illustrated and described as comprising functional components, software, engines, and/or modules performing various operations, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various operations of one or more embodiments. In various embodiments, for example, the article of manufacture may comprise a magnetic disk, optical disk, flash memory or firmware containing computer program instructions suitable for execution by a general-purpose processor or application specific processor. The embodiments, however, are not limited in this context.

Additionally, it is to be appreciated that the embodiments described herein illustrate example implementations, and that the functional elements, logical blocks, modules, and circuits elements may be implemented in various other ways which are consistent with the described embodiments. Furthermore, the operations performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

Certain embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and are comprised within the scope thereof. Furthermore, all examples and conditional language recited herein are principally intended to aid the reader in understanding the principles described in the present disclosure and the concepts contributed to furthering the art, and are to be construed as being without limitation to such specifically recited examples and conditions. Moreover, all statements herein reciting principles, aspects, and embodiments as well as specific examples thereof, are intended to encompass both structural and functional equivalents thereof. Additionally, it is intended that such equivalents comprise both currently known equivalents and equivalents developed in the future, i.e., any elements developed that perform the same function, regardless of structure. The scope of the present disclosure, therefore, is not intended to be limited to the exemplary aspects and aspects shown and described herein.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein.

The flow charts and methods described herein show the functionality and operation of various implementations. If embodied in software, each block, step, or action may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flow charts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Reference to "one embodiment" or "an embodiment" means that a particular feature, structure, or characteristic described in connection with the embodiment is comprised in at least one embodiment. The appearances of the phrase "in one embodiment" or "in one aspect" in the specification are not necessarily all referring to the same embodiment. The terms "a" and "an" and "the" and similar referents used in the context of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as," "in the case," "by way of example," etc.) provided herein is intended merely to better illuminate the disclosed embodiments and does not pose a limitation on the scope otherwise claimed. No language in the specification should be construed as indicating any non-claimed element essential to the practice of the claimed subject matter. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein are not to be construed as limitations. Each group member may be referred to and claimed individually or in any combination with other members of the group or other elements found herein. It is anticipated that one or more members of a group maybe comprised in, or deleted from, a group for reasons of convenience and/or patentability.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as described and claimed herein.

What is claimed is:

1. A computer-based system for executing a computer process associated with processing data or a computer-based event, the computer-based system comprising:
   a computer processor programmed to execute at least one computer-implemented module;
   a module programmed to code the computer process a single time to use a common document object model;
   a module programmed to break down the computer process into multiple functional units;
   a module programmed to extract metadata associated with each functional unit of the multiple functional units;
   a module programmed to represent each functional unit of the multiple functional units by an interface;
   a module programmed to code each functional unit of the multiple functional units with computer-readable instructions which, when executed by the computer processor, direct the functional unit of the multiple functional units to use at least one configuration set defined by at least a portion of the extracted metadata;
   a module programmed to execute at least one functional unit of the multiple functional units in association with at least one configuration set determined in response to at least one computer system operating parameter;
   a module programmed to process at least one event associated with the computer process; and
   a module programmed to use at least one artificially intelligent algorithm to self-configure a processing flow for the at least one event associated with the computer process at runtime based on at least one event attribute of the at least one event associated with the computer process.

2. The computer-based system of claim 1, further comprising a module programmed to execute the computer process without business or commercial context for content associated with the computer process.

3. The computer-based system of claim 2, further comprising a module programmed to execute the computer process with content derived from at least one of a business data source, a manufacturing data source, or a technical operation source.

4. The computer-based system of claim 1, further comprising a module programmed to execute the computer process in a platform comprising a combination of multiple self-contained frameworks and an interface layer.

5. The computer-based system of claim 4, wherein each self-contained framework of the multiple self-contained frameworks is configured to function as a configuration driven data processing framework.

6. The computer-based system of claim 4, further comprising a module programmed to receive data content in the platform through a common path regardless of source or format for the received data content.

7. The computer-based system of claim 6, further comprising a module programmed to validate a format of at least a portion of the received data content.

8. The computer-based system of claim 7, further comprising a module programmed to translate at least a portion of the validated format of at least a portion of the received data content into a common transaction format.

9. The computer-based system of claim 6, further comprising a module programmed to apply at least one business rule with a business rules engine in association with the received data content.

10. The computer-based system of claim 6, further comprising a module programmed to store at least a portion of the received data content in at least one data repository.

11. The computer-based system of claim 4, wherein at least one self-contained framework of the multiple self-contained frameworks comprises a data access framework programmed to facilitate configuration driven data access and enable zero code or near zero code data access object layer for multiple repository types.

12. The computer-based system of claim 4, wherein at least one self-contained framework of the multiple self-contained frameworks comprises a data access framework programmed to provide a single user interface for all data access regardless of source.

13. The computer-based system of claim 4, wherein at least one self-contained framework of the multiple self-contained frameworks comprises a data access framework which is metadata driven in that each request processed by the data access framework includes a reference or an identifier to a set of metadata defining an interaction.

14. The computer-based system of claim 4, wherein at least one self-contained framework of the multiple self-contained frameworks comprises a data access framework programmed as a transaction-based framework allowing creation of a list of requests and facilitating passing the list of requests to a data service for processing.

15. The computer-based system of claim 4, wherein at least one self-contained framework of the multiple self-contained frameworks comprises a data access framework programmed with at least one adapter configured to:
   connect the platform to at least one remote computer system;
   execute a request received by the platform; and
   return a response to the request.

16. The computer-based system of claim 4, wherein at least one self-contained framework of the multiple self-contained frameworks comprises a federation engine programmed without dedicated ties to at least one of a particular source, a particular destination, or a particular data layout, or a combination thereof.

17. The computer-based system of claim 4, wherein at least one self-contained framework of the multiple self-contained frameworks comprises a module programmed with a configuration driven data translation functionality for handling multiple data input types and multiple data output types.

18. The computer-based system of claim 1, wherein the at least one event attribute of the at least one event associated with the computer process comprises data content.

19. The computer-based system of claim 1, wherein the at least one event attribute of the at least one event associated with the computer process comprises an event type.

20. The computer-based system of claim 1, wherein the at least one event attribute of the at least one event associated with the computer process comprises an action.

21. The computer-based system of claim 1, wherein the at least one event attribute of the at least one event associated with the computer process comprises a source domain.

* * * * *